United States Patent
Engelke et al.

(10) Patent No.: US 10,972,604 B2
(45) Date of Patent: Apr. 6, 2021

(54) DEVICE INDEPENDENT TEXT CAPTIONED TELEPHONE SERVICE

(71) Applicant: Ultratec, Inc., Madison, WI (US)

(72) Inventors: Robert M. Engelke, Madison, WI (US); Kevin R. Colwell, Middleton, WI (US); Troy D. Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

(21) Appl. No.: 16/559,172

(22) Filed: Sep. 3, 2019

(65) Prior Publication Data

US 2019/0394329 A1 Dec. 26, 2019

Related U.S. Application Data

(63) Continuation of application No. 14/988,407, filed on Jan. 5, 2016, now Pat. No. 10,469,660, which is a
(Continued)

(51) Int. Cl.
*H04M 3/42* (2006.01)
*H04M 1/247* (2021.01)
(Continued)

(52) U.S. Cl.
CPC ......... *H04M 3/42382* (2013.01); *G10L 15/26* (2013.01); *H04M 1/2473* (2013.01);
(Continued)

(58) Field of Classification Search
CPC ......... H04M 3/42382; H04M 3/42391; H04M 3/42161; H04M 1/2535; H04M 1/2475;
(Continued)

(56) References Cited

U.S. PATENT DOCUMENTS 3,372,246 A 3/1968 Knuepfer
3,507,997 A 4/1970 Weitbrecht
(Continued)

FOREIGN PATENT DOCUMENTS

DE 2647097 A1 4/1978
DE 2749923 A1 5/1979
(Continued)

OTHER PUBLICATIONS

CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
(Continued)

*Primary Examiner* — Stella L. Woo
(74) *Attorney, Agent, or Firm* — Quarles & Brady LLP

(57) ABSTRACT

A communication system and method for displaying text captions corresponding to voice communications between an assisted user's mobile wireless device and a separate hearing user's device includes at least one communication component configured to enable the appliance to communicate with a relay, a display, and a processor operably coupled to the at least one communication component and the display. The processor is configured to enable the assisted user to establish an association between the appliance and the mobile device, receive text originating at the relay, the text corresponding to a transcript of the hearing user's voice signal originating at the hearing user's device, and cause text captions corresponding to the received text to be displayed on the display.

23 Claims, 13 Drawing Sheets

Related U.S. Application Data continuation of application No. 14/553,291, filed on Nov. 25, 2014, now Pat. No. 10,015,311, which is a continuation of application No. 13/790,420, filed on Mar. 8, 2013, now Pat. No. 8,917,821, which is a continuation of application No. 12/102,057, filed on Apr. 14, 2008, now Pat. No. 8,416,925, which is a continuation-in-part of application No. 11/391,141, filed on Mar. 28, 2006, now Pat. No. 7,881,441.

(60) Provisional application No. 60/695,099, filed on Jun. 29, 2005.

(51) Int. Cl.
H04M 1/253 (2006.01)
G10L 15/26 (2006.01)
H04M 3/533 (2006.01)

(52) U.S. Cl.
CPC ....... *H04M 1/2475* (2013.01); *H04M 1/2535* (2013.01); *H04M 3/42161* (2013.01); *H04M 3/42391* (2013.01); *H04M 3/42042* (2013.01); *H04M 3/42195* (2013.01); *H04M 3/533* (2013.01); *H04M 2201/14* (2013.01); *H04M 2201/40* (2013.01); *H04M 2201/60* (2013.01); *H04M 2242/04* (2013.01)

(58) Field of Classification Search
CPC ........... H04M 1/2473; H04M 2242/04; H04M 2201/60; H04M 2201/40; H04M 2201/14; H04M 3/533; H04M 3/42195; H04M 3/42042; G10L 15/26; G10L 15/265
See application file for complete search history.

(56) References Cited

U.S. PATENT DOCUMENTS

| | | |
|---|---|---|
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes |
| 4,307,266 A | 12/1981 | Messina |
| 4,354,252 A | 10/1982 | Lamb et al. |
| 4,415,065 A | 11/1983 | Sandstedt |
| 4,426,555 A | 1/1984 | Underkoffler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin et al. |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan |
| 4,713,808 A | 12/1987 | Gaskill et al. |
| 4,754,474 A | 6/1988 | Feinson |
| D296,894 S | 7/1988 | Chen |
| 4,777,469 A | 10/1988 | Engelke |
| 4,799,254 A | 1/1989 | Dayton et al. |
| 4,815,121 A | 3/1989 | Yoshida |
| 4,817,135 A | 3/1989 | Winebaum |
| 4,839,919 A | 6/1989 | Borges et al. |
| 4,849,750 A | 7/1989 | Andros et al. |
| 4,866,778 A | 9/1989 | Baker |
| 4,868,860 A | 9/1989 | Andros et al. |
| 4,879,738 A | 11/1989 | Petro |
| 4,897,868 A | 1/1990 | Engelke |
| D306,727 S | 3/1990 | Fritzsche |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts |
| 5,033,088 A | 7/1991 | Shipman |
| 5,051,924 A | 9/1991 | Bergeron |
| D322,785 S | 12/1991 | Wu |
| 5,081,673 A | 1/1992 | Engelke |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley |
| 5,192,948 A | 3/1993 | Neustein |
| 5,199,077 A | 3/1993 | Wilcox |
| 5,210,689 A | 5/1993 | Baker |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile |
| 5,294,982 A | 3/1994 | Salomon |
| 5,307,399 A | 4/1994 | Dai et al. |
| 5,311,516 A | 5/1994 | Kuznicki et al. |
| 5,318,340 A | 6/1994 | Henry |
| 5,321,514 A | 6/1994 | Martinez |
| 5,325,417 A | 6/1994 | Engelke |
| 5,327,479 A | 7/1994 | Engelke |
| 5,339,358 A | 8/1994 | Danish et al. |
| 5,343,519 A | 8/1994 | Feldman |
| 5,351,288 A | 9/1994 | Engelke |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore et al. |
| 5,392,343 A | 2/1995 | Davitt et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke |
| 5,459,458 A | 10/1995 | Richardson et al. |
| 5,463,665 A | 10/1995 | Millios |
| D364,865 S | 12/1995 | Engelke et al. |
| 5,475,733 A | 12/1995 | Eisdorfer |
| 5,475,798 A | 12/1995 | Handlos |
| 5,477,274 A | 12/1995 | Akiyoshi et al. |
| 5,487,102 A | 1/1996 | Rothschild |

(56) References Cited

U.S. PATENT DOCUMENTS

| | | |
|---|---|---|
| 5,487,671 A | 1/1996 | Shpiro et al. |
| 5,497,373 A | 3/1996 | Hulen |
| 5,508,754 A | 4/1996 | Orphan |
| 5,517,548 A | 5/1996 | Engelke |
| 5,519,443 A | 5/1996 | Salomon |
| 5,519,808 A | 5/1996 | Benton, Jr. |
| 5,521,960 A | 5/1996 | Aronow |
| 5,522,089 A | 5/1996 | Kikinis et al. |
| 5,537,436 A | 7/1996 | Bottoms |
| 5,559,855 A | 9/1996 | Dowens |
| 5,559,856 A | 9/1996 | Dowens |
| 5,574,776 A | 11/1996 | Leuca |
| 5,574,784 A | 11/1996 | LaPadula |
| 5,581,593 A | 12/1996 | Engelke |
| 5,583,560 A | 12/1996 | Florin et al. |
| 5,604,786 A | 2/1997 | Engelke |
| D379,181 S | 5/1997 | Sawano et al. |
| 5,649,060 A | 7/1997 | Ellozy |
| 5,666,403 A | 9/1997 | Telibasa |
| 5,671,267 A | 9/1997 | August et al. |
| 5,680,443 A | 10/1997 | Kasday |
| 5,687,222 A | 11/1997 | McLaughlin |
| 5,701,338 A | 12/1997 | Leyen |
| 5,710,806 A | 1/1998 | Lee |
| 5,712,901 A | 1/1998 | Meermans |
| 5,724,405 A | 3/1998 | Engelke |
| 5,745,550 A | 4/1998 | Eisdorfer |
| 5,751,338 A | 5/1998 | Ludwig, Jr. |
| 5,766,015 A | 6/1998 | Shpiro |
| 5,787,148 A | 7/1998 | August |
| 5,799,273 A | 8/1998 | Mitchell |
| 5,809,112 A | 9/1998 | Ryan |
| 5,809,425 A | 9/1998 | Colwell |
| 5,815,196 A | 9/1998 | Alshawi |
| 5,826,102 A | 10/1998 | Escobar |
| 5,850,627 A | 12/1998 | Gould |
| D405,793 S | 2/1999 | Engelke et al. |
| 5,870,709 A | 2/1999 | Bernstein |
| 5,893,034 A | 4/1999 | Hikuma |
| 5,899,976 A | 5/1999 | Rozak |
| 5,905,476 A | 5/1999 | McLaughlin |
| 5,909,482 A | 6/1999 | Engelke |
| 5,915,379 A | 6/1999 | Wallace |
| 5,917,888 A | 6/1999 | Giuntoli |
| 5,926,527 A | 7/1999 | Jenkins |
| 5,940,475 A | 8/1999 | Hansen |
| 5,974,116 A | 10/1999 | Engelke |
| 5,978,014 A | 11/1999 | Martin |
| 5,978,654 A | 11/1999 | Colwell et al. |
| 5,982,853 A | 11/1999 | Liebermann |
| 5,982,861 A | 11/1999 | Holloway |
| 5,991,291 A | 11/1999 | Asai |
| 5,991,723 A | 11/1999 | Duffin |
| 5,995,590 A | 11/1999 | Brunet |
| 6,002,749 A | 12/1999 | Hansen |
| 6,067,516 A | 5/2000 | Levay |
| 6,072,860 A | 6/2000 | Kek et al. |
| 6,075,534 A | 6/2000 | VanBuskirk |
| 6,075,841 A | 6/2000 | Engelke |
| 6,075,842 A | 6/2000 | Engelke |
| 6,100,882 A | 8/2000 | Sharman |
| 6,141,341 A | 10/2000 | Jones et al. |
| 6,141,415 A | 10/2000 | Rao |
| 6,173,259 B1 | 1/2001 | Bijl et al. |
| 6,175,819 B1 | 1/2001 | Van Alstine |
| 6,175,820 B1 | 1/2001 | Dietz |
| 6,181,736 B1 | 1/2001 | McLaughlin |
| 6,181,778 B1 | 1/2001 | Ohki et al. |
| 6,188,429 B1 | 2/2001 | Martin |
| 6,233,314 B1 | 5/2001 | Engelke |
| 6,243,684 B1 | 6/2001 | Stuart |
| 6,278,772 B1 | 8/2001 | Bowater |
| 6,298,326 B1 | 10/2001 | Feller |
| 6,307,921 B1 | 10/2001 | Engelke |
| 6,314,396 B1 | 11/2001 | Monkowski |
| 6,317,716 B1 | 11/2001 | Braida et al. |
| 6,324,507 B1 | 11/2001 | Lewis |
| 6,345,251 B1 | 2/2002 | Jansson |
| 6,377,925 B1 | 4/2002 | Greene, Jr. |
| 6,381,472 B1 | 4/2002 | LaMedica, Jr. |
| 6,385,586 B1 | 5/2002 | Dietz |
| 6,389,114 B1 | 5/2002 | Dowens |
| 6,430,270 B1 | 8/2002 | Cannon et al. |
| 6,445,799 B1 | 9/2002 | Taenzer |
| 6,493,426 B2 | 12/2002 | Engelke |
| 6,504,910 B1 | 1/2003 | Engelke |
| 6,507,735 B1 | 1/2003 | Baker |
| 6,510,206 B2 | 1/2003 | Engelke |
| 6,549,611 B2 | 4/2003 | Engelke |
| 6,549,614 B1 | 4/2003 | Zebryk et al. |
| 6,567,503 B2 | 5/2003 | Engelke |
| 6,594,346 B2 | 7/2003 | Engelke |
| 6,603,835 B2 | 8/2003 | Engelke |
| 6,625,259 B1 | 9/2003 | Hollatz |
| 6,661,879 B1 | 12/2003 | Schwartz |
| 6,668,042 B2 | 12/2003 | Michaelis |
| 6,668,044 B1 | 12/2003 | Schwartz |
| 6,701,162 B1 | 3/2004 | Everett |
| 6,748,053 B2 | 6/2004 | Engelke |
| 6,763,089 B2 | 7/2004 | Feigenbaum |
| 6,775,360 B2 | 8/2004 | Davidson |
| 6,778,824 B2 | 8/2004 | Wonak et al. |
| 6,816,468 B1 | 11/2004 | Cruickshank |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto |
| 6,885,731 B2 | 4/2005 | Engelke |
| 6,894,346 B2 | 5/2005 | Onose |
| 6,934,366 B2 | 8/2005 | Engelke |
| 6,934,376 B1 | 8/2005 | McLaughlin |
| 6,948,066 B2 | 9/2005 | Hind |
| 6,950,500 B1 | 9/2005 | Chaturvedi |
| 6,980,953 B1 | 12/2005 | Kanevsky |
| 7,003,082 B2 | 2/2006 | Engelke |
| 7,006,604 B2 | 2/2006 | Engelke |
| 7,016,479 B2 | 3/2006 | Flathers et al. |
| 7,035,383 B2 | 4/2006 | O'Neal |
| 7,042,718 B2 | 5/2006 | Aoki et al. |
| 7,088,832 B1 | 8/2006 | Cooper |
| 7,117,152 B1 | 10/2006 | Mukherji |
| 7,117,438 B2 | 10/2006 | Wallace |
| 7,142,642 B2 | 11/2006 | McClelland |
| 7,142,643 B2 | 11/2006 | Brooksby |
| 7,145,900 B2 | 12/2006 | Nix et al. |
| 7,164,753 B2 | 1/2007 | Engelke |
| 7,199,787 B2 | 4/2007 | Lee et al. |
| 7,221,405 B2 | 5/2007 | Basson |
| 7,233,655 B2 | 6/2007 | Gailey et al. |
| 7,236,580 B2 | 6/2007 | Sarkar et al. |
| 7,287,009 B1 | 10/2007 | Liebermann |
| 7,295,663 B2 | 11/2007 | McLaughlin |
| 7,313,231 B2 | 12/2007 | Reid |
| 7,315,612 B2 | 1/2008 | McClelland |
| 7,319,740 B2 | 1/2008 | Engelke |
| 7,363,006 B2 | 4/2008 | Mooney |
| 7,406,413 B2 | 7/2008 | Geppert |
| 7,430,283 B2 | 9/2008 | Steel, Jr. |
| 7,555,104 B2 | 6/2009 | Engelke |
| 7,573,985 B2 | 8/2009 | McClelland |
| 7,606,718 B2 | 10/2009 | Cloran |
| 7,660,398 B2 | 2/2010 | Engelke |
| 7,747,434 B2 | 6/2010 | Flanagan et al. |
| 7,792,701 B2 | 9/2010 | Basson |
| 7,848,358 B2 | 12/2010 | LaDue |
| 7,881,441 B2 | 2/2011 | Engelke et al. |
| 7,904,113 B2 | 3/2011 | Ozluturk et al. |
| 8,213,578 B2 | 7/2012 | Engleke |
| 8,259,920 B2 | 9/2012 | Abramson et al. |
| 8,369,488 B2 | 2/2013 | Sennett et al. |
| 8,379,801 B2 | 2/2013 | Romriell |
| 8,416,925 B2 | 4/2013 | Engelke et al. |

(56) References Cited

U.S. PATENT DOCUMENTS

| | | |
|---|---|---|
| 8,908,838 B2 | 12/2014 | Engelke et al. |
| 8,917,821 B2 | 12/2014 | Engelke et al. |
| 8,917,922 B2 | 12/2014 | Engelke et al. |
| 9,355,611 B1 | 5/2016 | Wang et al. |
| 9,961,196 B2 | 5/2018 | Engelke et al. |
| 9,967,380 B2 | 5/2018 | Engelke et al. |
| 10,469,660 B2 | 11/2019 | Engelke et al. |
| 10,491,746 B2 | 11/2019 | Engelke et al. |
| 10,587,751 B2 | 3/2020 | Engelke et al. |
| 2001/0005825 A1 | 6/2001 | Engelke et al. |
| 2002/0007275 A1 | 1/2002 | Goto et al. |
| 2002/0085685 A1 | 7/2002 | Engelke et al. |
| 2002/0085703 A1 | 7/2002 | Proctor |
| 2002/0094800 A1 | 7/2002 | Trop et al. |
| 2002/0101537 A1 | 8/2002 | Basson et al. |
| 2002/0103008 A1 | 8/2002 | Rahn et al. |
| 2002/0119800 A1 | 8/2002 | Jaggers et al. |
| 2002/0122550 A1 | 9/2002 | Noplock |
| 2002/0178001 A1 | 11/2002 | Balluff et al. |
| 2002/0193076 A1 | 12/2002 | Rogers et al. |
| 2003/0045329 A1 | 3/2003 | Kinoshita |
| 2003/0063731 A1 | 4/2003 | Woodring |
| 2003/0097262 A1 | 5/2003 | Nelson |
| 2004/0066926 A1 | 4/2004 | Brockbank et al. |
| 2004/0073432 A1* | 4/2004 | Stone ................ G06F 3/0488 704/275 |
| 2004/0083105 A1 | 4/2004 | Jaroker |
| 2004/0143430 A1 | 7/2004 | Said et al. |
| 2005/0025290 A1 | 2/2005 | Doherty et al. |
| 2005/0063520 A1 | 3/2005 | Michaelis |
| 2005/0094776 A1 | 5/2005 | Haldeman et al. |
| 2005/0094777 A1 | 5/2005 | McClelland |
| 2005/0129185 A1 | 6/2005 | McClelland et al. |
| 2005/0144012 A1 | 6/2005 | Afrashteh et al. |
| 2005/0180553 A1 | 8/2005 | Moore |
| 2005/0183109 A1 | 8/2005 | Basson et al. |
| 2005/0225628 A1 | 10/2005 | Antoniou |
| 2005/0226394 A1 | 10/2005 | Engelke et al. |
| 2005/0226398 A1 | 10/2005 | Bojeun |
| 2005/0232169 A1 | 10/2005 | McLaughlin et al. |
| 2005/0277431 A1 | 12/2005 | White |
| 2006/0105712 A1 | 5/2006 | Glass et al. |
| 2006/0133583 A1 | 6/2006 | Brooksby |
| 2006/0140354 A1 | 6/2006 | Engelke |
| 2006/0172720 A1 | 8/2006 | Islam et al. |
| 2006/0285652 A1 | 12/2006 | McClelland et al. |
| 2006/0285662 A1 | 12/2006 | Yin et al. |
| 2007/0024583 A1 | 2/2007 | Gettemy et al. |
| 2007/0036282 A1 | 2/2007 | Engelke et al. |
| 2008/0043936 A1 | 2/2008 | Liebermann |
| 2008/0152093 A1 | 6/2008 | Engleke et al. |
| 2008/0187108 A1 | 8/2008 | Engelke et al. |
| 2010/0063815 A1 | 3/2010 | Cloran et al. |
| 2011/0087491 A1 | 4/2011 | Wittenstein et al. |
| 2011/0123003 A1 | 5/2011 | Romriell et al. |
| 2011/0170672 A1 | 7/2011 | Engelke et al. |
| 2012/0108196 A1 | 5/2012 | Musgrove et al. |
| 2012/0250837 A1 | 10/2012 | Engelke et al. |
| 2013/0017800 A1 | 1/2013 | Gouvia et al. |
| 2013/0171958 A1 | 7/2013 | Goodson et al. |
| 2013/0308763 A1 | 11/2013 | Engelke et al. |
| 2013/0331056 A1 | 12/2013 | McKown et al. |
| 2014/0099909 A1 | 4/2014 | Daly et al. |
| 2014/0341359 A1 | 11/2014 | Engelke et al. |
| 2015/0358461 A1 | 12/2015 | Klaban |
| 2017/0187859 A1 | 6/2017 | Engelke et al. |

FOREIGN PATENT DOCUMENTS

| | | |
|---|---|---|
| DE | 3410619 A1 | 10/1985 |
| DE | 3632233 A1 | 4/1988 |
| DE | 10328884 A1 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| FR | 2403697 A1 | 4/1979 |
| FR | 2432805 A1 | 2/1980 |
| FR | 2538978 A1 | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | S5544283 A | 3/1980 |
| JP | S5755649 A | 4/1982 |
| JP | S58134568 A | 8/1983 |
| JP | S60259058 A | 12/1985 |
| JP | S63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9750222 A1 | 12/1997 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 2000078017 A1 | 12/2000 |
| WO | 2000078018 A1 | 12/2000 |
| WO | 0155914 A1 | 8/2001 |
| WO | 0158165 A2 | 8/2001 |
| WO | 0180079 A2 | 10/2001 |
| WO | 02077971 A1 | 10/2002 |
| WO | 03026265 A1 | 3/2003 |
| WO | 03030018 A1 | 4/2003 |
| WO | 03071774 A1 | 8/2003 |
| WO | 2005081511 A1 | 9/2005 |

OTHER PUBLICATIONS

Declaration of Benedict J. Occhiogrosso, In Re: U.S. Pat. No. 8,908,838, Case IPR2015-00637, In The United States Patent and Trademark Office Before the Patent Trial and Appeal Board, Jan. 28, 2015, 62 pages.

CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.

Declaration of Benedict J. Occhiogrosso, In Re: U.S. Pat. No. 8,917,822, Case IPR2015-00636, In The United States Patent and Trademark Office Before the Patent Trial and Appeal Board, Jan. 28, 2015, 65 pages.

In The United States Patent and Trademark Office Before the Patent Trial and Appeal Board, Decision—Institution of Inter Partes Review, *CaptionCall LLC* v. *Ultratec Inc.*, Case IPR2014-00780, U.S. Pat. No. 6,603,835, Dec. 4, 2014, 14 pages.

In The United States Patent and Trademark Office Before the Patent Trial and Appeal Board, Patent Owner Response Under 37 C.F.R. 42.120, *CaptionCall LLC* v. *Ultratec Inc.*, Case IPR2014-00780, U.S. Pat. No. 6,603,835, Feb. 11, 2015, 68 pages.

Ultratec Inc. and Captel Inc., Amended Complaint for Patent Infringement, *Ultratec, Inc., et al.* v. *Sorenson Communications, Inc., et al.*, Civil Action No. 3:14-cv-847-JDP, United States District Court, Western District of Wisconsin, Dec. 23, 2014, 15 pages.

Sorenson Communications Inc. and Captioncall LLC, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.

In The United States Patent and Trademark Office Before the Patent Trial and Appeal Board, Final Written Decision, *CaptionCall LLC* v. *Ultratec Inc.*, Case IPR2014-00540, U.S. Pat. No. 6,233,314, Mar. 3, 2015, 55 pages.

(56) References Cited

OTHER PUBLICATIONS

In The United States Patent and Trademark Office Before the Patent Trial and Appeal Board, Final Written Decision, *CaptionCall LLC v. Ultratec Inc.*, Case IPR2014-00541, U.S. Pat. No. 5,909,482, Mar. 3, 2015, 77 pages.
In The United States Patent and Trademark Office Before the Patent Trial and Appeal Board, Final Written Decision, *CaptionCall LLC v. Ultratec Inc.*, Case IPR2014-00542, U.S. Pat. No. 7,319,740, Mar. 3, 2015, 31 pages.
In The United States Patent and Trademark Office Before the Patent Trial and Appeal Board, Final Written Decision, *CaptionCall LLC v. Ultratec Inc.*, Case IPR2014-00543, U.S. Pat. No. 7,555,104, Mar. 3, 2015, 29 pages.
In The United States Patent and Trademark Office Before the Patent Trial and Appeal Board, Final Written Decision, *CaptionCall LLC v. Ultratec Inc.*, Case IPR2014-00544, U.S. Pat. No. 8,213,578, Mar. 3, 2015, 56 pages.
In The United States Patent and Trademark Office Before the Patent Trial and Appeal Board, Final Written Decision, *CaptionCall LLC v. Ultratec Inc.*, Case IPR2014-00545, U.S. Pat. No. 6,594,346, Mar. 3, 2015, 41 pages.
In The United States Patent and Trademark Office Before the Patent Trial and Appeal Board, Final Written Decision, *CaptionCall LLC v. Ultratec Inc.*, Case IPR2014-00549, U.S. Pat. No. 6,603,835, Mar. 3, 2015, 35 pages.
In The United States Patent and Trademark Office Before the Patent Trial and Appeal Board, Final Written Decision, *CaptionCall LLC v. Ultratec Inc.*, Case IPR2014-00550, U.S. Pat. No. 7,003,082, Mar. 3, 2015, 25 pages.
Extended European Search Report for application 16150223.2, European Patent Office, dated Apr. 11, 2016, 8 pages.
Petition for Inter Partes Review for U.S. Pat. No. 9,961,196, *CaptionCall LLC v. Ultratec Inc.*, United States Patent and Trademark Office, Nov. 12, 2018, 76 pages.
Declaration of Benedict J. Occhiogrosso for U.S. Pat. No. 9,961,196, *CaptionCall LLC v. Ultratec Inc.*, United States atent and Trademark Office, Nov. 12, 2018, 112 pages.
Petition for Inter Partes Review for U.S. Pat. No. 9,967,380, *CaptionCall LLC v. Ultratec Inc.*, United States Patent and Trademark Office, Nov. 12, 2018, 77 pages.
Declaration of Benedict J. Occhiogrosso for U.S. Pat. No. 9,967,380, *CaptionCall LLC v. Ultratec Inc.*, United States Patent and Trademark Office, Nov. 12, 2018, 148 pages.
Complaint for Patent Infringement, *Ultratec, Inc.*, et al. v. *Sorenson Communications, Inc., et al.*, Civil Action No. 3:15-cv-00563-JDP, United States District Court, Western District of Wisconsin, Sep. 7, 2015.
Amended Complaint for Patent Infringement, *Ultratec, Inc., et al. v. Sorenson Communications, Inc., et al.*, Civil Action No. 3:15-cv-00563-JDP, United States District Court, Western District of Wisconsin, Nov. 12, 2015.
Defendants' Motion to Stay Pending Inter Partes Review, *Ultratec, Inc., et al. v. Sorenson Communications, Inc., et al.*, Civil Action No. 3:15-cv-00563-JDP, United States District Court, Western District of Wisconsin, Dec. 11, 2015.
Defendants' Answer to Plaintiffs' Amended Complaint for Patent Infringement and Counterclaims, *Ultratec, Inc., et al. v. Sorenson Communications, Inc., et al.*, Civil Action No. 3:15-cv-00563-JDP, United States District Court, Western District of Wisconsin, Dec. 11, 2015.
Plaintiffs' Response to Defendants' Motion to Stay Pending Inter Partes Review, *Ultratec, Inc., et al. v. Sorenson Communications, Inc., et al.*, Civil Action No. 3:15-cv-00563-JDP, United States District Court, Western District of Wisconsin, Dec. 18, 2015.
Order Granting Motion to Stay Pending Inter Partes Review, *Ultratec, Inc., et al. v. Sorenson Communications, Inc., et al.*, Civil Action No. 3:15-cv-00563-JDP, United States District Court, Western District of Wisconsin, Dec. 22, 2015.
In The United States Patent and Trademark Office Before the Patent Trial and Appeal Board, Petitioner's Reply to Patent Owner's Response, *CaptionCall LLC v. Ultratec Inc.*, Case IPR2014-00780, U.S. Pat. No. 6,603,835, Apr. 20, 2015, 30 pages.
In The United States Patent and Trademark Office Before the Patent Trial and Appeal Board, Final Written Decision, *CaptionCall LLC v. Ultratec Inc.*, Case IPR2014-00780, U.S. Pat. No. 6,603,835, Dec. 1, 2015, 56 pages.
In The United States Patent and Trademark Office Before the Patent Trial and Appeal Board, Patent Owner's Request for Rehearing by Expanded Panel, *CaptionCall LLC v. Ultratec Inc.*, Case IPR2014-00780, U.S. Pat. No. 6,603,835, Dec. 31, 2015, 20 pages.
In The United States Patent and Trademark Office Before the Patent Trial and Appeal Board, Patent Owner's Request for Rehearing by Expanded Panel, *CaptionCall LLC v. Ultratec Inc.*, Case IPR2013-00540, U.S. Pat. No. 6,233,314, Apr. 2, 2015, 19 pages.
In The United States Patent and Trademark Office Before the Patent Trial and Appeal Board, Decision Denying Patent Owner's Request for Rehearing, *CaptionCall LLC v. Ultratec Inc.*, Case IPR2013-00540, U.S. Pat. No. 6,233,314, Dec. 1, 2015, 18 pages.
In The United States Patent and Trademark Office Before the Patent Trial and Appeal Board, Patent Owner's Notice of Appeal, *CaptionCall LLC v. Ultratec Inc.*, Case IPR2013-00540, U.S. Pat. No. 6,233,314, Feb. 2, 2016, 19 pages.
In The United States Patent and Trademark Office Before the Patent Trial and Appeal Board, Patent Owner's Request for Rehearing by Expanded Panel, *CaptionCall LLC v. Ultratec Inc.*, Case IPR2013-00541, U.S. Pat. No. 5,909,482, Apr. 2, 2015, 19 pages.
In The United States Patent and Trademark Office Before the Patent Trial and Appeal Board, Decision Denying Patent Owner's Request for Rehearing, *CaptionCall LLC v. Ultratec Inc.*, Case IPR2013-00541, U.S. Pat. No. 5,909,482, Dec. 1, 2015, 18 pages.
In The United States Patent and Trademark Office Before the Patent Trial and Appeal Board, Patent Owner's Notice of Appeal, *CaptionCall LLC v. Ultratec Inc.*, Case IPR2013-00541, U.S. Pat. No. 5,909,482, Feb. 2, 2016, 19 pages.
In The United States Patent and Trademark Office Before the Patent Trial and Appeal Board, Patent Owner's Request for Rehearing by Expanded Panel, *CaptionCall LLC v. Ultratec Inc.*, Case IPR2013-00542, U.S. Pat. No. 7,319,470, Apr. 2, 2015, 19 pages.
In The United States Patent and Trademark Office Before the Patent Trial and Appeal Board, Decision Denying Patent Owner's Request for Rehearing, *CaptionCall LLC v. Ultratec Inc.*, Case IPR2013-00542, U.S. Pat. No. 7,319,470, Dec. 1, 2015, 15 pages.
In The United States Patent and Trademark Office Before the Patent Trial and Appeal Board, Patent Owner's Notice of Appeal, *CaptionCall LLC v. Ultratec Inc.*, Case IPR2013-00542, U.S. Pat. No. 7,319,470, Feb. 2, 2016, 12 pages.
In The United States Patent and Trademark Office Before the Patent Trial and Appeal Board, Patent Owner's Request for Rehearing by Expanded Panel, *CaptionCall LLC v. Ultratec Inc.*, Case IPR2013-00543, U.S. Pat. No. 7,555,104, Apr. 2, 2015, 19 pages.
In The United States Patent and Trademark Office Before the Patent Trial and Appeal Board, Decision Denying Patent Owner's Request for Rehearing, *CaptionCall LLC v. Ultratec Inc.*, Case IPR2013-00543, U.S. Pat. No. 7,555,104, Dec. 1, 2015, 15 pages.
In The United States Patent and Trademark Office Before the Patent Trial and Appeal Board, Patent Owner's Notice of Appeal, *CaptionCall LLC v. Ultratec Inc.*, Case IPR2013-00543, U.S. Pat. No. 7,555,104, Feb. 2, 2016, 11 pages.
In The United States Patent and Trademark Office Before the Patent Trial and Appeal Board, Patent Owner's Request for Rehearing by Expanded Panel, *CaptionCall LLC v. Ultratec Inc.*, Case IPR2013-00544, U.S. Pat. No. 8,213,578, Apr. 2, 2015, 19 pages.
In The United States Patent and Trademark Office Before the Patent Trial and Appeal Board, Decision Denying Patent Owner's Request for Rehearing, *CaptionCall LLC v. Ultratec Inc.*, Case IPR2013-00544, U.S. Pat. No. 8,213,578, Dec. 1, 2015, 19 pages.
In The United States Patent and Trademark Office Before the Patent Trial and Appeal Board, Patent Owner's Notice of Appeal, *CaptionCall LLC v. Ultratec Inc.*, Case IPR2013-00544, U.S. Pat. No. 8,213,578, Feb. 2, 2016, 11 pages.
In The United States Patent and Trademark Office Before the Patent Trial and Appeal Board, Patent Owner's Request for Rehearing by

(56) References Cited

OTHER PUBLICATIONS

Expanded Panel, *CaptionCall LLC* v. *Ultratec Inc.*, Case IPR2013-00545, U.S. Pat. No. 6,594,346, Apr. 2, 2015, 16 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00545, U.S. Pat. No. 6,594,346, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00545, U.S. Pat. No. 6,594,346, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00549, U.S. Pat. No. 6,603,835, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00549, U.S. Pat. No. 6,603,835, Dec. 1, 2015, 15 pages.
In The United States Patent and Trademark Office Before the Patent Trial and Appeal Board, Patent Owner's Notice of Appeal, *CaptionCall LLC* v. *Ultratec Inc.*, Case IPR2013-00549, U.S. Pat. No. 6,603,835, Feb. 2, 2016, 11 pages.
In The United States Patent and Trademark Office Before the Patent Trial and Appeal Board, Patent Owner's Request for Rehearing by Expanded Panel, *CaptionCall LLC* v. *Ultratec Inc.*, Case IPR2013-00550, U.S. Pat. No. 7,003,082, Apr. 2, 2015, 19 pages.
In The United States Patent and Trademark Office Before the Patent Trial and Appeal Board, Decision Denying Patent Owner's Request for Rehearing, *CaptionCall LLC* v. *Ultratec Inc.*, Case IPR2013-00550, U.S. Pat. No. 7,003,082, Dec. 1, 2015, 10 pages.
In The United States Patent and Trademark Office Before the Patent Trial and Appeal Board, Patent Owner's Notice of Appeal, *CaptionCall LLC* v. *Ultratec Inc.*, Case IPR2013-00550, U.S. Pat. No. 7,003,082, Feb. 2, 2016, 11 pages.
In The United States Patent and Trademark Office Before the Patent Trial and Appeal Board, Decision Denying Institution of Inter Partes Review, *CaptionCall LLC* v. *Ultratec Inc.*, Case IPR2014-01287, U.S. Pat. No. 7,660,398, Feb. 12, 2015, 15 pages.
In The United States Patent and Trademark Office Before the Patent Trial and Appeal Board, Request for Rehearing, *CaptionCall LLC* v. *Ultratec Inc.*, Case IPR2014-01287, U.S. Pat. No. 7,660,398, Mar. 13, 2015, 18 pages.
In The United States Patent and Trademark Office Before the Patent Trial and Appeal Board, Decision Denying Request for Rehearing, *CaptionCall LLC* v. *Ultratec Inc.*, Case IPR2014-01287, U.S. Pat. No. 7,660,398, Nov. 5, 2015, 7 pages.
In The United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.
In The United States Patent and Trademark Office Before the Patent Trial and Appeal Board, Patent Owner's Preliminary Response, *CaptionCall LLC* v. *Ultratec Inc.*, Case IPR2015-00636, U.S. Pat. No. 8,917,822, Jun. 9, 2015, 66 pages.
In The United States Patent and Trademark Office Before the Patent Trial and Appeal Board, Decision Instituting Review, *CaptionCall LLC* v. *Ultratec Inc.*, Case IPR2015-00636, U.S. Pat. No. 8,917,822, Sep. 8, 2015, 20 pages.
In The United States Patent and Trademark Office Before the Patent Trial and Appeal Board, Patent Owner Response, *CaptionCall LLC* v. *Ultratec Inc.*, Case IPR2015-00636, U.S. Pat. No. 8,917,822, Nov. 23, 2015, 65 pages.
In The United States Patent and Trademark Office Before the Patent Trial and Appeal Board, Patent Owner's Contingent Motion to Amend, *CaptionCall LLC* v. *Ultratec Inc.*, Case IPR2015-00636, U.S. Pat. No. 8,917,822, Nov. 23, 2015, 39 pages.
In The United States Patent and Trademark Office Before the Patent Trial and Appeal Board, Petitioner's Reply to Patent Owner Response, *CaptionCall LLC* v. *Ultratec Inc.*, Case IPR2015-00636, U.S. Pat. No. 8,917,822, Jan. 26, 2016, 29 pages.
In The United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, In The United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In The United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In The United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In The United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In The United States Patent and Trademark Office Before the Patent Trial and Appeal Board, Nov. 23, 2015, 5 pages.
In The United States Patent and Trademark Office Before the Patent Trial and Appeal Board, Petition for Inter Partes Review of Claims 1-30 of U.S. Pat. No. 8,908,838, *CaptionCall LLC* v. *Ultratec Inc.*, Case IPR2015-00637, U.S. Pat. No. 8,908,838, Jan. 29, 2015, 67 pages.
In The United States Patent and Trademark Office Before the Patent Trial and Appeal Board, Patent Owner's Preliminary Response, *CaptionCall LLC* v. *Ultratec Inc.*, Case IPR2015-00637, U.S. Pat. No. 8,908,838, Jun. 9, 2015, 65 pages.
In The United States Patent and Trademark Office Before the Patent Trial and Appeal Board, Decision Instituting Review, *CaptionCall LLC* v. *Ultratec Inc.*, Case IPR2015-00637, U.S. Pat. No. 8,908,838, Sep. 8, 2015, 25 pages.
In The United States Patent and Trademark Office Before the Patent Trial and Appeal Board, Patent Owner Response, *CaptionCall LLC* v. *Ultratec Inc.*, Case IPR2015-00637, U.S. Pat. No. 8,908,838, Nov. 23, 2015, 65 pages.
In The United States Patent and Trademark Office Before the Patent Trial and Appeal Board, Patent Owner's Contingent Motion to Amend, *CaptionCall LLC* v. *Ultratec Inc.*, Case IPR2015-00637, U.S. Pat. No. 8,908,838, Nov. 23, 2015, 38 pages.
In The United States Patent and Trademark Office Before the Patent Trial and Appeal Board, Petitioner's Reply to Patent Owner Response, *CaptionCall LLC* v. *Ultratec Inc.*, Case IPR2015-00637, U.S. Pat. No. 8,908,838, Jan. 26, 2016, 29 pages.
In The United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00637, U.S. Pat. No. 8,908,838, Jan. 26, 2016, 28 pages.
Declaration of Benedict J. Occhiogrosso, In Re: U.S. Pat. No. 8,908,838, Case IPR2015-00637, In The United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In The United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, In The United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-

(56) References Cited

OTHER PUBLICATIONS

00637, In The United States Patent and Trademark Office Before the Patent Trial and 4ppeal Board, Nov. 23, 2015, 37 pages.
Declaration of Brenda Battat Regarding Secondary Considerations of Non-Obviousness, In Re: U.S. Pat. No. 3,908,838, Case IPR2015-00637, In The United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, In The United States Patent and Trademark Office Before the Patent Trial and Appeal Board, Nov. 23, 2015, 5 pages.
In The United States Patent and Trademark Office Before the Patent Trial and Appeal Board, Petition for Inter Partes Review of Claims 1-74 of U.S. Pat. No. 9,131,045, *CaptionCall LLC v. Ultratec Inc.*, Case IPR2015-01889, U.S. Pat. No. 9,131,045, Sep. 9, 2015, 66 pages.
In The United States Patent and Trademark Office Before the Patent Trial and Appeal Board, Patent Owner's Preliminary Response, *CaptionCall LLC v. Ultratec Inc.*, Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, In The United States Patent and Trademark Office Before the Patent Trial and Appeal Board, Sep. 9, 2015, 63 pages.
Defendants' Answer to Plaintiffs' Second Amended Complaint for Patent Infringement and Counterclaims, *Ultratec, Inc., et al. v. Sorenson Communications, Inc., et al.*, Civil Action No. 3:14-cv-00066-BBC, United States District Court, Western District of Wisconsin, May 9, 2014.
Defendants' Notion of Motion and Motion for Summary Judgment Regarding U.S. Pat. No. 7,660,398, *Ultratec, Inc., et al. v. Sorenson Communications, Inc., et al.*, Civil Action No. 3:14-cv-00066-JDP, United States District Court, Western District of Wisconsin, Mar. 27, 2015.
Brief No. 1 in Support of Defendants' Motion for Summary Judgment (Indefiniteness and Claim Construction), *Ultratec, Inc., et al. v. Sorenson Communications, Inc., et al.*, Civil Action No. 3:14-cv-00066-JDP, United States District Court, Western District of Wisconsin, May 11, 2015 (Redacted).
Brief No. 2 in Support of Defendants' Motion for Summary Judgment (Non-Infringement and Invalidity Under 35 USC 102 and 103), *Ultratec, Inc., et al. v. Sorenson Communications, Inc., et al.*, Civil Action No. 3:14-cv-00066-JDP, United States District Court, Western District of Wisconsin, May 11, 2015 (Redacted).
Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al. v. Sorenson Communications, Inc., et al.*, Civil Action No. 3:14-cv-00066-JDP, United States District Court, Western District of Wisconsin, May 11, 2015 (Redacted).
Reply in Support of Brief No. 3 in Support of Defendants' Motion for Summary Judgment (No Injunction, No Willful nfringement, No Indirect Infringement, and No Infringement of Claims 1-3 of the '398 Patent), *Ultratec, Inc., et al. v. Sorenson Communications, Inc., et al.*, Civil Action No. 3:14-cv-00066-JDP, United States District Court, Western District of Wisconsin, Jun. 24, 2015 (Redacted).
Claim Construction and Summary Judgment Opinion and Order, *Ultratec, Inc., et al. v. Sorenson Communications, Inc., et al.*, Civil Action No. 3:14-cv-00066-JDP, United States District Court, Western District of Wisconsin, Sep. 11, 2015.
Final Pretrial Conference and Order, *Ultratec, Inc., et al. v. Sorenson Communications, Inc., et al.*, Civil Action No. 3:14-cv-00066-JDP, United States District Court, Western District of Wisconsin, Sep. 21, 2015.
Order of Plaintiffs' Motion in Limine 16, *Ultratec, Inc., et al. v. Sorenson Communications, Inc., et al.*, Civil Action No. 3:14-cv-00066-JDP, United States District Court, Western District of Wisconsin, Sep. 22, 2015.

Order, *Ultratec, Inc., et al. v. Sorenson Communications, Inc., et al.*, Civil Action No. 3:14-cv-00066-JDP, United States District Court, Western District of Wisconsin, Oct. 6, 2015.
Special Verdict Form—Liability, *Ultratec, Inc., et al. v. Sorenson Communications, Inc., et al.*, Civil Action No. 3:14-cv-00066-JDP, United States District Court, Western District of Wisconsin, Oct. 6, 2015.
Judgment in a Civil Case, *Ultratec, Inc., et al. v. Sorenson Communications, Inc., et al.*, Civil Action No. 3:14-cv-00066-JDP, United States District Court, Western District of Wisconsin, Oct. 15, 2015.
Complaint for Patent Infringement, *Ultratec, Inc., et al. v. Sorenson Communications, Inc., et al.*, Civil Action No. 3:14-cv-00847-BBC, United States District Court, Western District of Wisconsin, Dec. 8, 2014.
Amended Complaint for Patent Infringement, *Ultratec, Inc., et al. v. Sorenson Communications, Inc., et al.*, Civil Action No. 3:14-cv-00847-BBC, United States District Court, Western District of Wisconsin, Dec. 22, 2014.
Defendants' Answer to Plaintiffs' Amended Complaint for Patent Infringement and Counterclaims, *Ultratec, Inc., et al. v. Sorenson Communications, Inc., et al.*, Civil Action No. 3:14-cv-00847-BBC, United States District Court, Western District of Wisconsin, Jan. 30, 2015.
Plaintiffs' Answer to Defendants Counterclaims, *Ultratec, Inc., et al. v. Sorenson Communications, Inc., et al.*, Civil Action No. 3:14-cv-00847-BBC, United States District Court, Western District of Wisconsin, Feb. 20, 2015.
Defendants' First Amended Answer to Plaintiffs' Amended Complaint for Patent Infringement and Counterclaims, *Ultratec, Inc., et al. v. Sorenson Communications, Inc., et al.*, Civil Action No. 3:14-cv-00847-BBC, United States District Court, Western District of Wisconsin, Feb. 20, 2015.
Defendants' Motion to Stay Pending Inter Partes Review, *Ultratec, Inc., et al. v. Sorenson Communications, Inc., et al.*, Civil Action No. 3:14-cv-00847-BBC, United States District Court, Western District of Wisconsin, Apr. 7, 2015.
Parties' Stipulation to a Temporary Stay, *Ultratec, Inc., et al. v. Sorenson Communications, Inc., et al.*, Civil Action No. 3:14-cv-00847-BBC, United States District Court, Western District of Wisconsin, Apr. 24, 2015.
Order Granting Defendants' Motion to Stay Pending Inter Partes Review, *Ultratec, Inc., et al. v. Sorenson Communications, Inc., et al.*, Civil Action No. 3:14-cv-00847-BBC, United States District Court, Western District of Wisconsin, Apr. 30, 2015.
Joint Notice of IPR Institution and Stipulation to Continue the Stay, *Ultratec, Inc., et al. v. Sorenson Communications, Inc., et al.*, Civil Action No. 3:14-cv-00847-BBC, United States District Court, Western District of Wisconsin, Sep. 11, 2015.
Canadian Intellectual Property Office, Examiner's Report, Application No. CA 2,419,150, dated Sep. 17, 2009.
Applicant, Response to Sep. 17, 2009 Official Action, Application No. CA 2,419,150, dated Mar. 12, 2010.
United States Patent and Trademark Office, Office Action Summary and Detailed Action, U.S. Appl. No. 09/938,194 (Now U.S. Pat. No. 6,603,835), dated Jul. 5, 2002.
Applicant, Response (to Jul. 5, 2002 Office Action), U.S. Appl. No. 09/938,194 (now U.S. Pat. No. 6,603,835), dated Jan. 6, 2003.
United States Patent and Trademark Office, Notice of Allowance, U.S. Appl. No. 09/938,194 (now U.S. Pat. No. 5,603,835), dated Mar. 18, 2003.
IP Australia, Examiner's First Report, Application No. AU 2002313798, dated Oct. 27, 2006.
Applicant, Response to Oct. 27, 2006 Examination Report, Application No. AU 2002313798, dated Feb. 9, 2007.
IP Australia, Notice of Acceptance, Application No. AU 2002313798, dated Apr. 2, 2007.
Canadian Intellectual Property Office, Examiner's Report, Application No. CA 2,458,372, dated Oct. 15, 2009.
Applicant, Response to Oct. 15, 2009 Official Action, Application No. CA 2,458,372, dated Apr. 15, 2010.
Canadian Intellectual Property Office, Notice of Allowance, Application No. CA 2,458,372, dated Jul. 27, 2010.

(56) References Cited

OTHER PUBLICATIONS

United Kingdom Patent Office, Examination Report, Application No. GB 0403994.7, dated May 28, 2004.
PCT International Search Report, Application No. PCT/US02/26815, dated Jan. 3, 2003.
PCT Written Opinion, Application No. PCT/US02/26815, dated Apr. 29, 2003.
PCT International Preliminary Examination Report, Application No. PCT/US02/26815, dated Apr. 14, 2004.
United States Patent and Trademark Office, Notice of Allowance and Examiner's Amendment, U.S. Appl. No. 09/956,310 (now U.S. Pat. No. 6,510,206), dated Aug. 19, 2002.
Applicant, Applicants' Comments on Examiner's Reason for Allowance (dated Aug. 19, 2002), U.S. Appl. No. 09/956,310 (now U.S. Pat. No. 6,510,206), dated Nov. 19, 2002.
United Kingdom Patent Office, Combined Search and Examination Report, Application No. GB 0406768.2 (Patent No. GB 2396774), dated Apr. 27, 2004.
PCT International Search Report, Application No. PCT/US01/29130, dated Mar. 1, 2003.
PCT International Preliminary Examination Report, Application No. PCT/US01/29130, dated Mar. 17, 2003.
United Kingdom Patent Office, Examination Report, Application No. GB 0306458.1, dated Sep. 17, 2003.
Applicant, Response to Sep. 17, 2003 Official Letter, Application No. GB 0306458.1, dated Mar. 16, 2004.
United States Patent and Trademark Office, Office Action Summary and Detailed Action, U.S. Appl. No. 09/977,842 (now U.S. Pat. No. 6,549,611), dated Apr. 23, 2002.
Applicant, Response (to Apr. 23, 2002 Office Action), U.S. Appl. No. 09/977,842 (now U.S. Pat. No. 6,549,611), dated Oct. 23, 2002.
Applicant, Terminal Disclaimer, U.S. Appl. No. 09/977,842 (U.S. Pat. No. 6,549,611), Oct. 23, 2002.
United States Patent and Trademark Office, Notice of Allowance, U.S. Appl. No. 09/977,842 (now U.S. Pat. No. 5,549,611), dated Nov. 15, 2002.
United States Patent and Trademark Office, Office Action, U.S. Appl. No. 10/412,118, dated Nov. 3, 2003.
United States Patent and Trademark Office, Office Action Summary and Detailed Action, U.S. Appl. No. 10/316,215 (now U.S. Pat. No. 6,934,366), dated Jul. 13, 2004.
Applicant, Response (to Jul. 13, 2004 Office Action) and Terminal Disclaimer, U.S. Appl. No. 10/316,215 (now U.S. Pat. No. 6,934,366), dated Jan. 13, 2005.
United States Patent and Trademark Office, Notice of Allowance and Detailed Action, U.S. Appl. No. 10/316,215 (now U.S. Pat. No. 6,934,366), dated Apr. 18, 2005.
United States Patent and Trademark Office, Office Action Summary and Detailed Action, U.S. Appl. No. 10/348,466 (now U.S. Pat. No. 6,748,053), dated Jul. 3, 2003.
Applicant, Response (to Jul. 3, 2003 Office Action) and Terminal Disclaimer, U.S. Appl. No. 10/348,466 (now U.S. Pat. No. 6,748,053), dated Jan. 5, 2004.
United States Patent and Trademark Office, Notice of Allowance, U.S. Appl. No. 10/348,466 (now U.S. Pat. No. 3,748,053), dated Jan. 27, 2004.
United States Patent and Trademark Office, Office Action Summary and Detailed Action, U.S. Appl. No. 10/436,650 (now U.S. Pat. No. 7,164,753), dated Jul. 1, 2005.
Applicant, Amendment (Response to Jul. 1, 2005 Office Action), U.S. Appl. No. 10/436,650 (now U.S. Pat. No. 7,164,753), dated Sep. 14, 2005.
United States Patent and Trademark Office, Office Action Summary and Detailed Action, U.S. Appl. No. 10/436,650 (now U.S. Pat. No. 7,164,753), dated Nov. 17, 2005.
Applicant, Response (to Nov. 17, 2005 Office Action), U.S. Appl. No. 10/436,650 (now U.S. Pat. No. 7,164,753), dated Jan. 18, 2006.
United States Patent and Trademark Office, Office Action Summary and Detailed Action, U.S. Appl. No. 10/436,650 (now U.S. Pat. No. 7,164,753), dated Apr. 19, 2006.
Applicant, Response (to Apr. 19, 2006 Office Action), U.S. Appl. No. 10/436,650 (now U.S. Pat. No. 7,164,753), dated Jun. 13, 2006.
United States Patent and Trademark Office, Notice of Allowance and Detailed Action, U.S. Appl. No. 10/436,650 (now U.S. Pat. No. 7,164,753), dated Sep. 15, 2006.
IP Australia, Examiners First Report, Application No. AU 2004239790, dated May 14, 2009.
Applicant, Response (to May 14, 2009 Examination Report), Application No. AU 2004239790, dated May 21, 2010.
Government of India The Patent Office, First Examination Report, Application No. dated Apr. 29, 2008.
Applicant, Response to Apr. 29, 2008 Official Letter, Application No. 2262/KOLNP/2005, dated May 5, 2008.
Applicant, Response to Apr. 29, 2008 First Examination Report, Application No. 2262/KOLNP/2005, dated Oct. 23, 2008.
PCT International Preliminary Report on Patentability, Application No. PCT/US2004/014991, dated Dec. 1, 2005.
PCT International Search Report and Written Opinion, Application No. PCT/US2004/014991, dated Dec. 29, 2004.
PCT International Search Report, Application No. PCT/US93/04753, dated Aug. 20, 1993.
European Patent Office, Supplementary European Search Report, Application No. EP 93911360 (Patent No. EP 0596078), dated Mar. 27, 1995.
European Patent Office, Communication, Application No. EP 93911360.1 (Patent No. EP 0596078), dated Jul. 10, 1998.
Applicant, Response to Jul. 10, 1998 Communication, Application No. EP 93911360.1 (Patent No. EP 0596078), dated Jan. 20, 1999.
European Patent Office, Communication, Application No. EP 93911360.1 (Patent No. EP 0596078), dated Jun. 16, 1999.
United States Patent and Trademark Office, Notice of Allowance, Examiner's Amendment, Examiner Interview Summary Record, U.S. Appl. No. 08/129,894 (now U.S. Pat. No. 5,432,837), dated Dec. 29, 1994.
United States Patent and Trademark Office, Examiner's Action, U.S. Appl. No. 08/155,061 (now U.S. Pat. No. 5,517,548), dated Dec. 22, 1994.
Applicant, Amendment (Response to Dec. 22, 1994 Office Action), U.S. Appl. No. 08/155,061 (now U.S. Pat. No. 5,517,548), dated Jun. 22, 1995.
United States Patent and Trademark Office, Notice of Allowance, U.S. Appl. No. 08/155,061 (now U.S. Pat. No. 5,517,548), dated Aug. 8, 1995.
European Patent Office, Supplementary European Search Report, Application No. EP 93911361.9 (Patent No. EP 0596079), dated Mar. 27, 1995.
European Patent Office, Communication, Application No. EP 93911361.9 (Patent No. EP 0596079), dated Jul. 10, 1998.
Applicant, Response to Jul. 10, 1998 Communication, Application No. EP 93911361.9 (Patent No. EP 0596079), dated Jan. 20, 1999.
PCT International Search Report, Application No. PCT/US93/04760, dated Aug. 13, 1993.
United States Patent and Trademark Office, Communication, U.S. Appl. No. 07/886,552, dated May 21, 1993.
United States Patent and Trademark Office, Office Action Summary and Detailed Action, U.S. Appl. No. 08/802,053, dated Sep. 30, 1997.
Applicant, Response to Sep. 30, 1997 First Office Action, U.S. Appl. No. 08/802,053, dated Oct. 20, 1997.
United States Patent and Trademark Office, Office Action Summary and Detailed Action, U.S. Appl. No. 08/802,053, dated Jan. 5, 1998.
Applicant, Amendment After Final (Jan. 5, 1998 Office Action), U.S. Appl. No. 08/802,053, dated Feb. 6, 1998.
United States Patent and Trademark Office, Advisory Action, U.S. Appl. No. 08/802,053, dated Feb. 20, 1998.
Applicant, Appellant's Brief on Appeal, U.S. Appl. No. 08/802,053, May 29, 1998.
United States Patent and Trademark Office, Examiner's Answer, U.S. Appl. No. 08/802,053, dated Aug. 18, 1998.
United States Patent and Trademark Office, Decision on Appeal, U.S. Appl. No. 08/802,053, Oct. 19, 2001.

(56) References Cited

OTHER PUBLICATIONS

United States Patent and Trademark Office, Examiner's Action, U.S. Appl. No. 08/258,044 (now U.S. Pat. No. 5,604,786), dated Jun. 21, 1995.
Applicant, First Amendment (Response to Jun. 21, 1995 Office Action), U.S. Appl. No. 08/258,044 (now U.S. Pat. No. 5,604,786), dated Sep. 8, 1995.
United States Patent and Trademark Office, Communication, U.S. Appl. No. 08/258,044 (now U.S. Pat. No. 5,604,786), dated Dec. 14, 1995.
Applicant, Second Amendment, U.S. Appl. No. 08/258,044 (now U.S. Pat. No. 5,604,786), dated Jun. 14, 1996.
Applicant, Third Amendment, U.S. Appl. No. 08/258,044 (now U.S. Pat. No. 5,604,786), dated Jul. 31, 1996.
United States Patent and Trademark Office, Notice of Allowance, U.S. Appl. No. 08/258,044 (now U.S. Pat. No. 5,604,786), dated Aug. 7, 1996.
United States Patent and Trademark Office, Supplemental Notice of Allowability and Examiner's Amendment, U.S. Appl. No. 08/258,044 (now U.S. Pat. No. 5,604,786), dated Nov. 18, 1996.
United States Patent and Trademark Office, Communication, U.S. Appl. No. 08/369,205 (now U.S. Pat. No. 5,581,593), dated Nov. 2, 1995.
Applicant, Amendment (Response to Nov. 2, 1995 Office Action), U.S. Appl. No. 08/369,205 (now U.S. Pat. No. 5,581,593), dated Feb. 5, 1996.
United States Patent and Trademark Office, Notice of Allowance, Interview Summary, and Examiner's Amendment, U.S. Appl. No. 08/369,205 (now U.S. Pat. No. 5,581,593), dated May 15, 1996.
PCT International Search Report, Application No. PCT/US96/00282, dated Apr. 9, 1996.
United States Patent and Trademark Office, Office Action Summary and Detailed Action, U.S. Appl. No. 08/481,852 (now U.S. Pat. No. 5,978,654), dated Sep. 5, 1996.
Applicant, Amendment (Response to Sep. 5, 1996 Office Action), U.S. Appl. No. 08/481,852 (now U.S. Pat. No. 5,978,654), dated Nov. 26, 1997.
United States Patent and Trademark Office, Office Action Summary and Detailed Action, U.S. Appl. No. 08/481,852 (now U.S. Pat. No. 5,978,654), dated Oct. 16, 1998.
Applicant, Response (to Oct. 16, 1998 Office Action), U.S. Appl. No. 08/481,852 (now U.S. Pat. No. 5,978,654), dated Apr. 16, 1999.
United States Patent and Trademark Office, Notice of Allowance, U.S. Appl. No. 08/481,852 (now U.S. Pat. No. 5,978,654), dated May 5, 1999.
PCT International Search Report, Application No. PCT/US96/09391, dated Aug. 27, 1996.
United States Patent and Trademark Office, Office Action Summary and Detailed Action, U.S. Appl. No. 09/288,420 (now U.S. Pat. No. 6,233,314), dated Feb. 25, 2000.
Applicant, Amendment (Response to Feb. 25, 2000 Office Action) and Terminal Disclaimer, U.S. Appl. No. 09/288,420 (now U.S. Pat. No. 6,233,314), dated Aug. 25, 2000.
United States Patent and Trademark Office, Notice of Allowance, U.S. Appl. No. 09/288,420 (now U.S. Pat. No. 6,233,314), dated Dec. 5, 2000.
United States Patent and Trademark Office, Office Action Summary and Detailed Action, U.S. Appl. No. 09/783,337 (now U.S. Pat. No. 6,493,426), dated Dec. 14, 2001.
Applicant, Response to Dec. 14, 2001 Office Action and Terminal Disclaimer, U.S. Appl. No. 09/783,337 (now U.S. Pat. No. 6,493,426), dated Jun. 14, 2002.
United States Patent and Trademark Office, Notice of Allowance and Examiner's Statement of Reasons for Allowance, U.S. Appl. No. 09/783,337 (now U.S. Pat. No. 6,493,426), dated Jul. 25, 2002.
United Kingdom Patent Office, Examination Report, Application No. GB 0319142.6 (Patent No. GB 2389993), dated Jan. 13, 2004.
Canadian Intellectual Property Office, Examiner's Report, Application No. CA 2,438,412, dated May 20, 2009.
Applicant, Response to May 20, 2009 Official Action, Application No. CA 2,438,412, dated Nov. 18, 2009.
Canadian Intellectual Property Office, Notice of Allowance, Application No. CA 2,438,412, dated Apr. 30, 2010.
United States Patent and Trademark Office, Notice of Allowance, Examiner's Amendment, Examiner Interview Summary Record, U.S. Appl. No. 07/074,625 (now U.S. Pat. No. 4,777,469), dated May 20, 1988.
Canadian Patent Office, Notice of Allowance, Application No. CA 571,452 (Patent No. 1,301,388), dated Jan. 29, 1991.
Applicant, Restoration and Amendment, Application No. CA 571,452 (Patent No. 1,301,388), dated Aug. 8, 1991.
United States Patent and Trademark Office, Communication, U.S. Appl. No. 07/224,118 (now U.S. Pat. No. 1,897,868), dated Jun. 8, 1989.
Applicant, Amendment (Response to Jun. 8, 1989 Office Action) and Terminal Disclaimer, U.S. Appl. No. 07/224,118 (now U.S. Pat. No. 4,897,868), dated Jun. 19, 1989.
United States Patent and Trademark Office, Notice of Allowance, U.S. Appl. No. 07/224,118 (now U.S. Pat. No. 4,897,868), dated Aug. 29, 1989.
United States Patent and Trademark Office, Communication, U.S. Appl. No. 07/334,003 (now U.S. Pat. No. 4,959,847), dated Oct. 10, 1989.
Applicant, Amendment (Response to Oct. 10, 1989 Office Action), U.S. Appl. No. 07/334,003 (now U.S. Pat. No. 4,959,847), dated Jan. 10, 1990.
United States Patent and Trademark Office, Notice of Allowance, U.S. Appl. No. 07/334,003 (now U.S. Pat. No. 4,959,847), dated Mar. 27, 1990.
United Kingdom Patent Office, Examiner's Search Report, Application No. GB 9006994.9 (Patent No. GB 2,231,468), dated Jul. 12, 1990.
United Kingdom Patent Office, Examiner's Report, Application No. GB 9006994.9 (Patent No. GB 2,231,468), dated Dec. 16, 1992.
Applicant, Response to Dec. 16, 1992 Official Letter, Application No. GB 9006994.9 (Patent No. GB 2,231,468), dated Jun. 11, 1993.
Canadian Intellectual Property Office, Examination Report, Application No. CA 2,013,617, dated Jul. 28, 2000.
Applicant, Response to Jul. 28, 2000 Official Action, Application No. CA 2,013,617, dated Nov. 28, 2000.
Applicant, Information Letter, Application No. CA 2,013,617, dated Feb. 1, 2001.
Canadian Intellectual Property Office, Notice of Allowance, Application No. CA 2,013,617, dated Mar. 23, 2001.
United States Patent and Trademark Office, Communication, U.S. Appl. No. 07/842,943 (now U.S. Pat. No. 5,351,288), dated Oct. 22, 1993.
Applicant, Amendment (Response to Oct. 22, 1993 Office Action) and Terminal Disclaimer, U.S. Appl. No. 07/842,943 (now U.S. Pat. No. 5,351,288), dated Jan. 13, 1994.
United States Patent and Trademark Office, Communication, U.S. Appl. No. 07/842,943 (now U.S. Pat. No. 5,351,288), dated Mar. 30, 1994.
Applicant, Response to Mar. 30, 1994 Final Rejection, U.S. Appl. No. 07/842,943 (now U.S. Pat. No. 5,351,288), dated Apr. 12, 1994.
Applicant, Supplemental Response to Final Rejection and Terminal Disclaimer, U.S. Appl. No. 07/842,943 (now U.S. Pat. No. 5,351,288), dated Apr. 28, 1994.
United States Patent and Trademark Office, Notice of Allowance, U.S. Appl. No. 07/842,943 (now U.S. Pat. No. 5,351,288), dated Jun. 6, 1994.
United States Patent and Trademark Office, Communication, U.S. Appl. No. 07/255,357, dated May 3, 1989.
Applicant, Amendment (Response to May 3, 1989 Office Action), U.S. Appl. No. 07/255,357, dated Aug. 3, 1989.
United States Patent and Trademark Office, Communication, U.S. Appl. No. 07/255,357, dated Oct. 16, 1989.
Applicant, Amendment (Response to Oct. 16, 1989 Office Action), U.S. Appl. No. 07/255,357, dated Apr. 16, 1990.
United States Patent and Trademark Office, Communication, U.S. Appl. No. 07/255,357, dated Jul. 16, 1990.

(56) References Cited

OTHER PUBLICATIONS

Applicant, Response After Final, U.S. Appl. No. 07/255,357, Oct. 16, 1990.
United States Patent and Trademark Office, Advisory Action, U.S. Appl. No. 07/255,357, dated Nov. 6, 1990.
United States Patent and Trademark Office, Examiner's Action, U.S. Appl. No. 07/886,553 (now U.S. Pat. No. 5,325,417), dated May 21, 1993.
Applicant, First Amendment (Response to May 21, 1993 Office Action), U.S. Appl. No. 07/886,553 (now U.S. Pat. No. 5,325,417), dated Oct. 21, 1993.
United States Patent and Trademark Office, Notice of Allowance, U.S. Appl. No. 07/886,553 (now U.S. Pat. No. 5,325,417), dated Jan. 4, 1994.
European Patent Office, Communication, Application No. EP 93911359.3 (Patent No. EP 0608389), dated Jul. 10, 1998.
Applicant, Response to Jul. 10, 1998 Communication, Application No. EP 93911359.3 (Patent No. EP 0608389), dated Jan. 19, 1999.
Canadian Intellectual Property Office, Notice of Allowance, Application No. CA 2,113,841, dated Jun. 10, 2002.
PCT International Search Report, Application No. PCT/US93/04751, dated Aug. 18, 1993.
United States Patent and Trademark Office, Examiner's Action, U.S. Appl. No. 29/024,266 (now U.S. Pat. No. D. 364,865), dated Mar. 30, 1995.
Applicant, Response to First Office Action, U.S. Appl. No. 29/024,266 (now U.S. Pat. No. D. 364,865), dated May 16, 1995.
United States Patent and Trademark Office, Notice of Allowance, U.S. Appl. No. 29/024,266 (now U.S. Pat. No. D. 364,865), dated Jun. 7, 1995.
United States Patent and Trademark Office, Office Action Summary and Detailed Action, U.S. Appl. No. 29/076,383 (now U.S. Pat. No. D. 405,793), dated Apr. 14, 1998.
Applicant, First Amendment (Response to Apr. 14, 1998 Office Action), U.S. Appl. No. 29/076,383 (now U.S. Pat. No. D. 405,793), dated Jul. 14, 1998.
United States Patent and Trademark Office, Notice of Allowance and Examiner's Amendment, U.S. Appl. No. 29/076,383 (now U.S. Pat. No. D. 405,793), dated Aug. 10, 1998.
Applicant, Preliminary Response to United States Patent and Trademark Office, U.S. Appl. No. 07/616,720 (now U.S. Pat. No. 5,081,673), dated Dec. 31, 1990.
United States Patent and Trademark Office, Notice of Allowance, U.S. Appl. No. 07/616,720 (now U.S. Pat. No. 5,081,673), dated Mar. 7, 1991.
Canadian Intellectual Property Office, Notice of Allowance, Patent No. CA 1320602, dated Oct. 27, 1992.
United States Patent and Trademark Office, Examiner's Action, U.S. Appl. No. 07/886,642 (now U.S. Pat. No. 5,327,479), dated May 19, 1993.
Applicant, First Amendment (Response to May 19, 1993 Office Action), U.S. Appl. No. 07/886,642 (now U.S. Pat. No. 5,327,479), dated Oct. 19, 1993.
United States Patent and Trademark Office, Notice of Allowance and Examiner Interview Summary Record, U.S. Appl. No. 07/886,642 (now U.S. Pat. No. 5,327,479), dated Jan. 5, 1994.
Canadian Intellectual Property Office, Notice of Allowance, Application No. CA 2,113,839, dated Jun. 18, 2002.
Opinion and Order, *Ultratec, Inc., et al. v. Sorenson Communications, Inc., et al.*, Civil Action No. 13-CV-346-BBC, United States District Court, Western District of Wisconsin, Aug. 28, 2014.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of U.S. Pat. No. 7,660,398, 489 pages.
Vaseghi, Chapter 14: Echo Cancellation, Advanced Digital Signal Processing and Noise Reduction, Second Edition, John Wiley & Sons, Ltd., 2000, pp. 396-415.

Ultratec, Inc. and CapTel, Inc. Complaint for Patent Infringement, *Ultratec, Inc. and CapTel Inc. v. Sorenson communications, Inc. and CaptionCall, LLC*, Civil Action No. 14-CV-66, Feb. 3, 2014, 9 pages.
Plaintiffs, Ultratec, Inc. and CapTel, Inc.'s Infringement Contentions, *Ultratec, Inc. and CapTel Inc. v. Sorenson communications, Inc. and CaptionCall, LLC*, Civil Action No. 14-CV-66, Mar. 28, 2014, 9 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
United States Patent and Trademark Office, Office Action Summary and Detailed Action, U.S. Appl. No. 13/486,221, dated Jan. 28, 2015, 8 pages.
United States Patent and Trademark Office, Office Action Summary and Detailed Action, U.S. Appl. No. 14/506,080, dated Feb. 27, 2015, 7 pages.
United States Patent and Trademark Office, Office Action Summary and Detailed Action, U.S. Appl. No. 14/299,531, dated Sep. 19, 2014, 8 pages.
Applicant, Amendment (Response to Sep. 19, 2014, Office Action), U.S. Appl. No. 14/299,531, dated Sep. 24, 2014, 12 pages.
United States Patent and Trademark Office, Office Action Summary and Detailed Action, U.S. Appl. No. 14/299,531, dated Oct. 10, 2014, 6 pages.
Applicant, Response (Response to Oct. 10, 2014, Office Action), U.S. Appl. No. 14/299,531, dated Oct. 17, 2014, 3 pages.
United States Patent and Trademark Office, Office Action Summary and Detailed Action, U.S. Appl. No. 14/299,651, dated Oct. 16, 2014, 5 pages.
Applicant, Response (Response to Oct. 16, 2014, Office Action), U.S. Appl. No. 14/299,651, dated Oct. 17, 2014 3 pages.
United States Patent and Trademark Office, Office Action Summary and Detailed Action, U.S. Appl. No. 13/950,860, dated Sep. 3, 2014, 9 pages.
Applicant, Amendment (Response to Sep. 3, 2014, Office Action), U.S. Appl. No. 13/950,860, dated Mar. 3, 2015, 11 pages.
United States Patent and Trademark Office, Office Action Summary and Detailed Action, U.S. Appl. No. 13/950,860, dated Apr. 2, 2015, 8 pages.
United States Patent and Trademark Office, Office Action Summary and Detailed Action, U.S. Appl. No. 15/010,179, dated Jul. 9, 2019, 12 pages.
Applicant, First Amendment (in Response to United States Patent and Trademark Office Nov. 8, 2012 Office Action), U.S. Appl. No. 12/686,688, dated Feb. 7, 2013.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 Pages.
Canadian Intellectual Property Office, Examiner's Report, Application No. CA 2,613,363, dated Oct. 1, 2012.
Applicant, Response to Examiner's Report, Application No. CA 2,613,363, dated Mar. 7, 2013.
Canadian Intellectual Property Office, Notice of Allowance, Application No. CA 2,613,363, dated Oct. 18, 2013.
Government of India Patent Office, First Examination Report, Application No. IN 4970/KOLNP/2007, dated Feb. 26, 2014.
Canadian Intellectual Property Office, Examiner's Report, Application No. CA 2,556,933, dated Apr. 10, 2012.
Applicant, Response to Official Action, Application No. C 2,556,933, dated Jul. 12, 2012.
Canadian Intellectual Property Office, Notice of Allowance, Application No. CA 2,556,933, dated Feb. 14, 2013.
PCT International Search Report and Written Opinion, PCT/US2009/040523, dated Nov. 11, 2009.
Canadian Intellectual Property Office, Examiner's Report, Application No. CA 2,761,343, dated Mar. 8, 2012.
Applicant, Response to Official Action, Application No. CA 2,761,343, dated Mar. 30, 2012.
Canadian Intellectual Property Office, Notice of Allowance, Application No. CA 2,761,343, dated Jul. 24, 2012.

(56) References Cited

OTHER PUBLICATIONS

Applicant, Amendment Submitted with a Request for Continued Examination and Terminal Disclaimers, U.S. Appl. No. 11/955,476, dated Oct. 19, 2011.
United States Patent and Trademark Office, Notice of Allowance, U.S. Appl. No. 11/955,476, dated Mar. 2, 2012.
United States Patent and Trademark Office, Office Action Summary and Detailed Action, U.S. Appl. No. 13/486,221, dated Sep. 13, 2013.
Applicant, Amendment (Response to Sep. 13, 2013, Office Action), U.S. Appl. No. 13/486,221, dated Mar. 11, 2014.
United States Patent and Trademark Office, Office Action Summary and Detailed Action, U.S. Appl. No. 13/486,221, dated Mar. 26, 2014.
Applicant, Terminal Disclaimers and Remarks, U.S. Appl. No. 13/486,221, Apr. 30, 2014.
United States Patent and Trademark Office, Office Action Summary and Detailed Action, U.S. Appl. No. 13/486,221, dated Jun. 25, 2014.
United States Patent and Trademark Office, Office Action Summary and Detailed Action, U.S. Appl. No. 13/950,860, dated Jan. 9, 2014.
Applicant, Amendment (Response to Jan. 9, 2014, Office Action), U.S. Appl. No. 13/950,860, dated Jun. 30, 2014.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.
Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 6,594,346, Case IPR2013-00545, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, In The United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, In The United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, In The United States Patent and Trademark Office Before the Patent Trial and Appeal Board, May 30, 2014.
Declaration of Brenda Battat, In Re: U.S. Pat. No. 8,231,578, Case IPR2013-00544, In The United States Patent and Trademark Office Before the Patent Trial and Appeal Board, May 8, 2014.
Declaration of Constance Phelps, In Re: U.S. Pat. No. 6,233,314, Case IPR2013-00540, In The United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.
Intellectual Property Philippines, Official Action, Application No. PH 12005502024, dated Aug. 10, 2007.
Applicant, Response to Aug. 10, 2007 Official Action, Application No. PH 12005502024, dated Oct. 3, 2007.
Intellectual Property Philippines, Official Action, Application No. PH 12005502024, dated Oct. 17, 2007.
Applicant, Response to Oct. 17, 2007 Official Action, Application No. PH 12005502024, dated Dec. 11, 2007.
United States Patent and Trademark Office, Office Action Summary and Detailed Action, U.S. Appl. No. 10/619,040 (now U.S. Pat. No. 7,006,604), dated Dec. 2, 2004.
Applicant, Response (to Dec. 2, 2004 Office Action) and Terminal Disclaimer, U.S. Appl. No. 10/619,040 (now U.S. Pat. No. 7,006,604), dated Jun. 2, 2005.
United States Patent and Trademark Office, Notice of Allowance, U.S. Appl. No. 10/619,040 (now U.S. Pat. No. 7,006,604), dated Sep. 16, 2005.
United States Patent and Trademark Office, Supplemental Notice of Allowability, Examiner's Amendment and Interview Summary, U.S. Appl. No. 10/628,193 (now U.S. Pat. No. 6,885,731), dated Jan. 31, 2005.
United States Patent and Trademark Office, Office Action Summary and Detailed Action, U.S. Appl. No. 10/634,965 (now U.S. Pat. No. 7,003,082), dated Jul. 16, 2004.
Applicant, Response (to Jul. 16, 2004 Office Action) and Terminal Disclaimer, U.S. Appl. No. 10/634,965 (now U.S. Pat. No. 7,003,082), dated Jan. 14, 2005.
United States Patent and Trademark Office, Supplemental Notice of Allowability, U.S. Appl. No. 10/634,965 (now U.S. Pat. No. 7,003,082), dated Nov. 9, 2005.
United States Patent and Trademark Office, Office Action Summary and Detailed Action, U.S. Appl. No. 11/061,682 (now U.S. Pat. No. 7,660,398), dated Apr. 1, 2008.
Applicant, Amendment (Response to Apr. 1, 2008 Office Action), U.S. Appl. No. 11/061,682 (now U.S. Pat. No. 7,660,398), dated Jul. 1, 2008.

(56) References Cited

OTHER PUBLICATIONS

United States Patent and Trademark Office, Office Action Summary and Detailed Action, U.S. Appl. No. 11/061,682 (now U.S. Pat. No. 7,660,398), dated Nov. 4, 2008.
Applicant, Request for Continued Examination and Interview Summary, U.S. Appl. No. 11/061,682 (now U.S. Pat. No. 7,660,398), dated Jan. 22, 2009.
United States Patent and Trademark Office, Office Action Summary and Detailed Action, U.S. Appl. No. 11/061,682 (now U.S. Pat. No. 7,660,398), dated Mar. 25, 2009.
Applicant, Amendment, U.S. Appl. No. 11/061,682 (now U.S. Pat. No. 7,660,398), dated Jun. 22, 2009.
United States Patent and Trademark Office, Notice of Allowance, U.S. Appl. No. 11/061,682 (now U.S. Pat. No. 7,660,398), dated Sep. 25, 2009.
Applicant, Request for Recalculation of Patent Term Adjustment in View of Wyeth, U.S. Pat. No. 7,660,398, (U.S. Appl. No. 11/061,682), Feb. 25, 2010.
United States Patent and Trademark Office, Decision on Request for Recalculation of Patent Term Adjustment in View of Wyeth and Notice of Intent to Issue Certificate of Correction, U.S. Pat. No. 7,660,398 (U.S. Appl. No. 11/061,682), Apr. 20, 2010.
United States Patent and Trademark Office, Certificate of Correction, U.S. Pat. No. 7,660,398 (U.S. Appl. No. 11/061,682), Nov. 30, 2010.
PCT International Search Report and Written Opinion, Application No. PCT/US2005/005149, dated May 24, 2005.
PCT International Preliminary Report on Patentability, Application No. PCT/US2005/005149, dated Aug. 31, 2006.
UK Intellectual Property Office, Examination Report, Application No. GB 0617585.5, dated Jan. 23, 2008.
Applicant, Response to Jan. 23, 2008 Official Letter, Application No. GB 0617585.5, dated Jul. 22, 2008.
UK Intellectual Property Office, Combined Search and Examination Report, Application No. GB 0617585.5, dated Aug. 15, 2008.
Applicant, Response to Aug. 15, 2008 Official Letter, Application No. GB 0617585.5, dated Dec. 9, 2008.
UK Intellectual Property Office, Combined Search and Examination Report, Application No. GB 0813502.2, dated Aug. 15, 2008.
Applicant, Response to Aug. 15, 2008 Official Letter, Application No. GB 0813502.2, dated Dec. 9, 2008.
United States Patent and Trademark Office, Office Action Summary and Detailed Action, U.S. Appl. No. 11/257,703 (now U.S. Pat. No. 7,319,740), dated May 3, 2007.
Applicant, Amendment and Terminal Disclaimers (Response to May 3, 2007 Office Action), U.S. Appl. No. 11/257,703 (now U.S. Pat. No. 7,319,740), dated Jul. 26, 2007.
United States Patent and Trademark Office, Notice of Allowance, U.S. Appl. No. 11/257,703 (now U.S. Pat. No. 7,319,740), dated Aug. 23, 2007.
United States Patent and Trademark Office, Office Action Summary and Detailed Action, U.S. Appl. No. 88/217,518 (now U.S. Pat. No. 5,724,405), dated Jul. 20, 1995.
Applicant, Amendment (Response to Jul. 20, 1995 Office Action), U.S. Appl. No. 08/217,518 (now U.S. Pat. No. 5,724,405), dated Jan. 22, 1996.
United States Patent and Trademark Office, Office Action Summary and Detailed Action, U.S. Appl. No. 08/217,518 (now U.S. Pat. No. 5,724,405), dated Apr. 16, 1996.
Applicant, Amendment (Response to Apr. 16, 1996 Office Action) and Terminal Disclaimer, U.S. Appl. No. 08/217,518 (now U.S. Pat. No. 5,724,405), dated Oct. 16, 1996.
United States Patent and Trademark Office, Office Action Summary and Detailed Action, U.S. Appl. No. 08/217,518 (now U.S. Pat. No. 5,724,405), dated Jan. 15, 1997.
Applicant, Response After Final (Response to Jan. 15, 1997 Office Action) and Terminal Disclaimer, U.S. Appl. No. 08/217,518 (now U.S. Pat. No. 5,724,405), dated Jul. 15, 1997.
United States Patent and Trademark Office, Notice of Allowability, U.S. Appl. No. 08/217,518 (now U.S. Pat. No. 5,724,405), dated Aug. 19, 1997.
United Kingdom Patent Office, Search Report, Application No. GB 9804556.0 (Patent No. GB 2335109), dated Aug. 12, 1998.
United Kingdom Patent Office, Examination Report, Application No. GB 9804556.0 (Patent No. GB 2335109), dated Sep. 27, 2002.
Applicant, Response to United Kingdom Patent Office Sep. 27, 2002 Examination Report, Application No. GB M04556.0 (Patent No. GB 2335109), dated Mar. 26, 2003.
United States Patent and Trademark Office, Notice of Allowability, U.S. Appl. No. 08/925,558 (now U.S. Pat. No. 5,909,482), dated Oct. 27, 1998.
United Kingdom Patent Office, Examination Report, Application No. GB 9908312.3 (Patent No. GB 2334177), dated Apr. 15, 2002.
Applicant, Response to United Kingdom Patent Office Apr. 15, 2002 Examination Report, Application No. GB 9908312.3 (Patent No. GB 2334177), dated Oct. 14, 2002.
PCT International Search Report, Application No. PCT/US98/18650, dated Nov. 6, 1998.
Canadian Intellectual Property Office, Examination Report, Application No. CA 2,268,582, dated Feb. 22, 2007.
Applicant, Amendment/Remarks Following Feb. 22, 2007 Examiner's Report, Application No. CA 2,268,582, dated Aug. 22, 2007.
Declaration of Paul W. Ludwick, In Re: U.S. Pat. No. 6,594,346, Case IPR2013-00545, In The United States Patent and Trademark Office Before the Patent Trial and Appeal Board, May 11, 2014.
Declaration of Paul W. Ludwick, In Re: U.S. Pat. No. 7,555,104, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, In The United States Patent and Trademark Office Before the Patent Trial and Appeal Board, May 12, 2014.
Declaration of Paul W. Ludwick, In Re: U.S. Pat. No. 6,233,314, Case IPR2013-00540, In The United States Patent and Trademark Office Before the Patent Trial and Appeal Board, May 30, 2014.
Declaration of Paul W. Ludwick, In Re: U.S. Pat. No. 5,909,482, Case IPR2013-00541, In The United States Patent and Trademark Office Before the Patent Trial and Appeal Board, May 30, 2014.
Declaration of Paul W. Ludwick, In Re: U.S. Pat. No. 8,213,578, Case IPR2013-00544, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, In The United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, In The United States Patent and Trademark Office Before the Patent Trial and 4ppeal Board, May 12, 2014.
Declaration of Paul W. Ludwick Regarding Secondary Considerations of Non-Obviousness, In Re: U.S. Pat. No. 6,233,314, Case IPR2013-00540, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, In The United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In The United States Patent and Trademark Office Before the Patent Trial and Appeal Board, May 30, 2014.

(56) References Cited

OTHER PUBLICATIONS

Declaration of Kelby Brick, Esq., CDI, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In The United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In The United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In The United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In The United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, In The United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In The United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In The United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, In The United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, In The United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In The United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Expert Report of Mr. Benedict J. Occhiogrosso Regarding Invalidity of Asserted Claims of U.S. Pat. Nos. 5,909,482; 6,233,314; 6,594,346; 6,603,835; 7,003,082; 7,319,740; 7,555,104; and 8,213,578, *Ultratec, Inc., et al.* v. *Sorenson Communications, Inc., et al.*, Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Pat. Nos. 5,909,482; 6,233,314; 6,594,346; and 8,213,578, *Ultratec, Inc., et al.* v. *Sorenson Communications, Inc., et al.*, Civil Action No. 3:13-CV-346-BBC, United States District Court, Western District of Wisconsin, Apr. 22, 2014 [Redacted].
Validity Report of James A. Steel, Jr. Regarding U.S. Pat. No. 6,603,835; 7,003,082; 7,319,740; and 7,555,104, in Response to Expert Report of Benedict Occhiogrosso and Non-Infringement Report Regarding U.S. Pat. No. 8,379,801, *Ultratec, Inc., et al.* v. *Sorenson Communications, Inc., et al.*, Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al.* v. *Sorenson Communications, Inc., et al.*, Civil Action No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al.* v. *Sorenson Communications, Inc., et al.*, Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al.* v. *Sorenson Communications, Inc., et al.*, Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al.* v. *Sorenson Com-*

(56) References Cited

OTHER PUBLICATIONS

*munications, Inc., et al.*, Civil Action No. 14-CV-66-BBC, United States District Court, Western District of Wisconsin, Jul. 16, 2014.
Sorenson Communications, Inc. and CaptionCall, LLC's Invalidity Contentions and Exhibits, *Ultratec, Inc., et al. v. Sorenson Communications, Inc., et al.*, Civil Action No. 14-CV-66-BBC, United States District Court, Western District of Wisconsin, May 16, 2014.
United States Patent and Trademark Office, Office Action Summary and Detailed Action, U.S. Appl. No. 08/946,538 (now U.S. Pat. No. 6,075,841), dated Sep. 18, 1998.
Applicant, First Amendment (Response to Sep. 18, 1998 Office Action), U.S. Appl. No. 08/946,538 (now U.S. Pat. No. 6,075,841), dated Jan. 15, 1999.
United States Patent and Trademark Office, Office Action Summary and Detailed Action, U.S. Appl. No. 08/946,538 (now U.S. Pat. No. 6,075,841), dated Mar. 26, 1999.
Applicant, Response to Mar. 26, 1999 Office Action and Terminal Disclaimer, U.S. Appl. No. 08/946,538 (now U.S. Pat. No. 6,075,841), dated Jul. 20, 1999.
United States Patent and Trademark Office, Notice of Allowability and Examiner's Amendment and Statement of Reasons for Allowance, U.S. Appl. No. 08/946,538 (now U.S. Pat. No. 6,075,841), dated Aug. 16, 1999.
United States Patent and Trademark Office, Office Action Summary and Detailed Action, U.S. Appl. No. 09/034,076 (now U.S. Pat. No. 6,075,842), dated Apr. 6, 1999.
Applicant, Response to Apr. 6, 1999 Office Action and Terminal Disclaimer, U.S. Appl. No. 09/034,076 (now U.S. Pat. No. 5,075,842), dated Jul. 21, 1999.
United States Patent and Trademark Office, Notice of Allowability, U.S. Appl. No. 09/034,076 (now U.S. Pat. No. 6,075,842), dated Jan. 7, 2000.
United States Patent and Trademark Office, Notice of Allowability and Examiner's Statement of Reasons for Allowance, U.S. Appl. No. 09/108,790 (now U.S. Pat. No. 5,974,116), dated May 11, 1999.
Canadian Intellectual Property Office, Examination Report, Application No. CA 2,268,383, dated May 10, 2007.
Applicant, Response to May 10, 2007 Office Action, Application No. CA 2,268,383, dated Nov. 9, 2007.
United Kingdom Patent Office, Examination Report, Application No. GB 9908310.7 (Patent No. GB 2339363), dated Jan. 25, 2003.
Applicant, Response to United Kingdom Patent Office Jan. 25, 2003 Report, Application No. GB 9908310.7 (Patent No. GB 2339363), dated Aug. 26, 2003.
United Kingdom Patent Office, Examination Report, Application No. GB 9908310.7 (Patent No. GB 2339363), dated Sep. 23, 2003.
Applicant, Response to United Kingdom Patent Office Sep. 23, 2003 Report, Application No. GB 9908310.7 (Patent No. GB 2339363), dated Nov. 17, 2003.
United Kingdom Patent Office, Examination Report, Application No. GB 9908310.7 (Patent No. GB 2339363), dated Dec. 16, 2003.
Applicant, Response to United Kingdom Patent Office Dec. 16, 2003 Report, Application No. GB 9908310.7 (Patent No. GB 2339363), dated Dec. 30, 2003.
United States Patent and Trademark Office, Office Action Summary and Detailed Action, U.S. Appl. No. 09/572,819 (now U.S. Pat. No. 6,307,921), dated Oct. 25, 2000.
Applicant, Response (to Oct. 25, 2000 Office Action) and Terminal Disclaimers, U.S. Appl. No. 09/572,819 (now U.S. Pat. No. 6,307,921), dated Apr. 25, 2001.
United States Patent and Trademark Office, Notice of Allowability, U.S. Appl. No. 09/572,819 (now U.S. Pat. No. 6,307,921), dated Jun. 4, 2001.
United States Patent and Trademark Office, Office Action Summary and Detailed Action, U.S. Appl. No. 08/481,856 (now U.S. Pat. No. 5,809,425), dated Aug. 28, 1996.
Applicant, Amendment (Response to Aug. 18, 1996 Office Action), U.S. Appl. No. 08/481,856 (now U.S. Pat. No. 5,809,425), dated Feb. 28, 1997.
United States Patent and Trademark Office, Office Action Summary and Detailed Action, U.S. Appl. No. 08/481,856 (now U.S. Pat. No. 5,809,425), dated May 28, 1997.
Applicant, Amendment (Response to May 28, 1997 Office Action), U.S. Appl. No. 08/481,856 (now U.S. Pat. No. 5,809,425), dated Nov. 26, 1997.
United States Patent and Trademark Office, Notice of Allowance and Statement of Reasons for Allowance, U.S. Appl. No. 08/481,856 (now U.S. Pat. No. 5,809,425), dated Dec. 23, 1997.
PCT International Search Report, Application No. PCT/US96/09492, dated Sep. 4, 1996.
United States Patent and Trademark Office, Office Action Summary and Detailed Action, U.S. Appl. No. 08/367,563, dated Aug. 2, 1996.
United States Patent and Trademark Office, Office Action Summary and Detailed Action, U.S. Appl. No. 09/153,771, dated Aug. 3, 1999.
United States Patent and Trademark Office, Office Action Summary and Detailed Action, U.S. Appl. No. 11/955,476, dated Jan. 24, 2011.
Applicant, Amendment (Response to Jan. 24, 2011 Office Action) and Terminal Disclaimers, U.S. Appl. No. 11/955,476, dated May 23, 2011.
United States Patent and Trademark Office, Office Action Summary and Detailed Action, U.S. Appl. No. 11/955,476, dated Jun. 23, 2011.
Canadian Intellectual Property Office, Examiner's Report, Application No. CA 2,458,372, dated May 16, 2011.
Intellectual Property Philippines, Official Action, Application No. PH 12007502940, dated Jun. 6, 2011.
Applicant, Response to Jun. 6, 2011 Office Action, Application No. PH 12007502940, dated Aug. 4, 2011.
UK Intellectual Property Office, Examination Report, Application No. GB 0617585.5, dated Aug. 15, 2008.
UK Intellectual Property Office, Examination Report, Application No. GB 0617585.5, dated Dec. 17, 2008.
Applicant, Response to Dec. 17, 2008 Official Letter, Application No. GB 0617585.5, dated Feb. 16, 2009.
European Patent Office, Communication, Application No. EP 04761001.9, dated Jun. 30, 2011.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.
Gopalakrishnan, et al., Effective Set-Up for Performing Phone Conversations by the Hearing Impaired, IBM Technical Disclosure Bulletin, Dec. 1991, 34(7B):423-426.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.

(56) References Cited

OTHER PUBLICATIONS

Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Appl. No. 08/396,554, Telephone for the Deaf and Method of Using Same, filed Mar. 1, 1995.
U.S. Appl. No. 09/599,347, filed Jun. 22, 2000.
U.S. Appl. No. 10/099,824, Graphic User Interface for a Patient Ventilator, filed Mar. 15, 2002.
U.S. Appl. No. 60/041,458, TTY Modem System, filed Mar. 25, 1997.
The Patent Office, Examination Report, dated Apr. 15, 2002, Application No. GB 9908312.3, 2 pages.
Applicant, Response to Apr. 15, 2002 Examination Report, dated Oct. 14, 2002, Application No. GB 9908312.3, 2 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office Before the Patent Trial and Appeal Board, Decision—Institution of Inter Partes Review, *CaptionCall LLC* v. *Ultratec Inc.*, Case IPR2013-00550, U.S. Pat. No. 7,003,082 B2, Mar. 5, 2014, 13 pages.
United States Patent and Trademark Office Before the Patent Trial and Appeal Board, Decision—Institution of Inter Partes Review, *CaptionCall LLC* v. *Ultratec Inc.*, Case IPR2013-00543, U.S. Pat. No. 7,555,104, Mar. 5, 2014, 16 pages.
United States Patent and Trademark Office Before the Patent Trial and Appeal Board, Decision—Institution of Inter Partes Review, *CaptionCall LLC* v. *Ultratec Inc.*, Case IPR2013-00540, U.S. Pat. No. 6,233,314, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00545, U.S. Pat. No. 6,594,346, Mar. 5, 2014, 21 pages.
United States Patent and Trademark Office Before the Patent Trial and Appeal Board, Decision—Institution of Inter Partes Review, *CaptionCall LLC* v. *Ultratec Inc.*, Case IPR2013-00541, U.S. Pat. No. 5,909,482, Mar. 5, 2014, 32 pages.
United States Patent and Trademark Office Before the Patent Trial and Appeal Board, Decision—Institution of Inter Partes Review, *CaptionCall LLC* v. *Ultratec Inc.*, Case IPR2013-00544, U.S. Pat. No. 8,213,578, Mar. 5, 2014, 22 pages.
United States Patent and Trademark Office Before the Patent Trial and Appeal Board, Decision—Institution of Inter Partes Review, *CaptionCall LLC* v. *Ultratec Inc.*, Case IPR2013-00542, U.S. Pat. No. 7,319,740, Mar. 5, 2014, 17 pages.
United States Patent and Trademark Office Before the Patent Trial and Appeal Board, Decision—Institution of Inter Partes Review, *CaptionCall LLC* v. *Ultratec Inc.*, Case IPR2013-00549, U.S. Pat. No. 6,603,835 B2, Mar. 5, 2014, 26 pages.
Ultratec Inc. and CapTel Inc., Complaint for Patent Infringement, *Ultratec Inc. and CapTel Inc.* v. *Sorenson Communications Inc. and CaptionCall LLC*, Civil Action No. 13-346, May 17, 2013, 13 pages.
United States Patent and Trademark Office, Office Action Summary and Detailed Action, U.S. Appl. No. 09/783,679 (now U.S. Pat. No. 6,594,346), dated Jun. 5, 2002.
Applicant, Response (to Jun. 5, 2002 Office Action), U.S. Appl. No. 09/783,679 (now U.S. Pat. No. 6,594,346), dated Dec. 4, 2002.
United States Patent and Trademark Office, Notice of Allowance, U.S. Appl. No. 09/783,679 (now U.S. Pat. No. 6,594,346), dated Feb. 19, 2003.
United States Patent and Trademark Office, Office Action Summary and Detailed Action, U.S. Appl. No. 09/789,120 (now U.S. Pat. No. 6,567,503), dated Jun. 17, 2002.
Applicant, Amendment (Response to Jun. 17, 2002 Office Action), U.S. Appl. No. 09/789,120 (now U.S. Pat. No. 6,567,503), dated Oct. 19, 2002.
United States Patent and Trademark Office, Notice of Allowance, U.S. Appl. No. 09/789,120 (now U.S. Pat. No. 6,567,503), dated Dec. 30, 2002.
Canadian Intellectual Property Office, Examiner's Report, Application No. CA 2,372,061, dated Apr. 26, 2004.
Applicant, Response to Apr. 26, 2004 Official Action, Application No. CA 2,372,061, dated Oct. 26, 2004.
Canadian Intellectual Property Office, Notice of Allowance, Application No. CA 2,372,061, dated May 26, 2005.
Canadian Intellectual Property Office, Examiner's Report, Application No. CA 2,520,594, dated Mar. 7, 2006.

(56) References Cited

OTHER PUBLICATIONS

Applicant, Response to Mar. 7, 2006 Office Action, Application No. CA 2,520,594, dated Sep. 6, 2006.
Canadian Intellectual Property Office, Examiner's Report, Application No. CA 2,520,594, dated Nov. 27, 2006.
Applicant, Response to Nov. 27, 2006 Office Action, Application No. CA 2,520,594, dated May 25, 2007.
United Kingdom Patent Office, Combined Search and Examination Report, Application No. GB 0203898.2, dated Aug. 30, 2002.
Applicant, Response to Aug. 30, 2002 Official Letter, Application No. GB 0203898.2, dated Oct. 28, 2002.
United Kingdom Patent Office, Examination Report, Application No. GB 0203898.2, dated Jan. 21, 2003.
Applicant, Response to Jan. 21, 2003 Official Letter, Application No. GB 0203898.2, dated Jul. 15, 2003.
United Kingdom Patent Office, Combined Search and Examination Report, Application No. GB 0225275.7, dated Jan. 20, 2003.
Applicant, Response to Jan. 20, 2003 Letter, Application No. GB 0225275.7, dated Jul. 14, 2003.
United States Patent and Trademark Office, Office Action Summary and Detailed Action, U.S. Appl. No. 09/790,413 (now U.S. Pat. No. 6,882,707), dated Mar. 23, 2004.
Applicant, Response to Restriction Requirement, U.S. Appl. No. 09/790,413 (now U.S. Pat. No. 6,882,707), dated Apr. 9, 2004.
United States Patent and Trademark Office, Office Action Summary and Detailed Action, U.S. Appl. No. 09/790,413 (now U.S. Pat. No. 6,882,707), dated May 7, 2004.
Applicant, Response to May 7, 2004 Office Action, U.S. Appl. No. 09/790,413 (now U.S. Pat. No. 6,882,707), dated Aug. 9, 2004.
United States Patent and Trademark Office, Notice of Allowance, Examiner's Amendment and Interview Summary, U.S. Appl. No. 09/790,413 (now U.S. Pat. No. 6,882,707), dated Dec. 10, 2004.
United States Patent and Trademark Office, Office Action Summary and Detailed Action, U.S. Appl. No. 10/336,950, dated Jun. 2, 2003.
United States Patent and Trademark Office, Office Action Summary and Detailed Action, U.S. Appl. No. 11/391,141 (now U.S. Pat. No. 7,881,441), dated Mar. 9, 2010.
Applicant, First Amendment, U.S. Appl. No. 11/391,141 (now U.S. Pat. No. 7,881,441), dated Jun. 9, 2010.
United States Patent and Trademark Office, Notice of Allowance, U.S. Appl. No. 11/391,141 (now U.S. Pat. No. 7,881,441), dated Sep. 21, 2010.
United States Patent and Trademark Office, Supplemental Notice of Allowability, U.S. Appl. No. 11/391,141 (now U.S. Pat. No. 7,881,441), dated Dec. 7, 2010.
European Patent Office, Communication, Application No. EP 06785768.0, dated Feb. 7, 2008.
Applicant, Reply to Feb. 7, 2008 Communication, Application No. EP 06785768.0, dated Mar. 12, 2008.
European Patent Office, Examination Report, Application No. EP 06785768.0, dated Aug. 9, 2010.
Applicant, Response to Aug. 9, 2010 Communication, Application No. EP 06785768.0, dated Dec. 20, 2010.
PCT International Search Report and Written Opinion, Application No. PCT/US2006/025236, dated Oct. 2, 2006.
PCT International Preliminary Report on Patentability, Application No. PCT/US2006/025236, dated Jan. 9, 2008.
Republic of the Philippines Intellectual Property Office, Findings/Action of Examiner, Application No. PH 1-2007-502940, dated Oct. 29, 2010.
Applicant, Response to Oct. 29, 2010 Office Action, Application No. PH 1-2007-502940, dated Dec. 29, 2010.
IP Australia, Examiner's First Report, Application No. AU 2006263680, dated Jun. 29, 2009.
Applicant, Response to Jun. 29, 2009 Examination Report, Application No. AU 2006263680, dated Jun. 17, 2010.
IP Australia, Examiner's Report No. 2, Application No. AU 2006263680, Jun. 22, 2010.
Applicant, Response to Jun. 22, 2010 Examination Report, Application No. AU 2006263680, dated Jul. 16, 2010.
United States Patent and Trademark Office, Office Action Summary and Detailed Action, U.S. Appl. No. 11/361,114 (now U.S. Pat. No. 7,555,104), dated May 21, 2007.
Applicant, Terminal Disclaimer, U.S. Appl. No. 11/361,114 (now U.S. Pat. No. 7,555,104), dated Jul. 23, 2007.
United States Patent and Trademark Office, Notice of Allowance and Examiner's Statement of Reasons for Allowance, U.S. Appl. No. 11/361,114 (now U.S. Pat. No. 7,555,104), dated Sep. 15, 2008.
Applicant, Request for Continued Examination and Submission of Supplemental Information Disclosure Statement, U.S. Appl. No. 11/361,114 (now U.S. Pat. No. 7,555,104), dated Dec. 15, 2008.
United States Patent and Trademark Office, Notice of Allowance, U.S. Appl. No. 11/361,114 (now U.S. Pat. No. 7,555,104), dated Feb. 25, 2009.
United States Patent and Trademark Office, Notice of Allowance and Examiner's Statement of Reasons for Allowance, U.S. Appl. No. 09/876,340 (now U.S. Pat. No. 6,504,910), dated Aug. 13, 2002.
PCT International Search Report, Application No. PCT/US02/18156, dated Oct. 29, 2002.
In The United States Patent and Trademark Office Before the Patent Trial and Appeal Board, Petition for Inter Partes Review of Claims 1-18 of U.S. Pat. No. 5,974,116, *CaptionCall LLC v. Ultratec Inc.*, Case IPR2015-01355, U.S. Pat. No. 5,974,116, Jun. 8, 2015, 65 pages.
In The United States Patent and Trademark Office Before the Patent Trial and Appeal Board, Patent Owner's Preliminary Response, *CaptionCall LLC v. Ultratec Inc.*, Case IPR2015-01355, U.S. Pat. No. 5,974,116, Sep. 18, 2015, 43 pages.
In The United States Patent and Trademark Office Before the Patent Trial and Appeal Board, Decision Instituting Review, *CaptionCall LLC v. Ultratec Inc.*, Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, In The United States Patent and Trademark Office Before the Patent Trial and Appeal Board, Jun. 8, 2015, 45 pages.
In The United States Patent and Trademark Office Before the Patent Trial and Appeal Board, Petition for Inter Partes Review of Claim 1 of U.S. Pat. No. 6,934,366, *CaptionCall LLC v. Ultratec Inc.*, Case IPR2015-01357, U.S. Pat. No. 6,934,366, Jun. 8, 2015, 65 pages.
In The United States Patent and Trademark Office Before the Patent Trial and Appeal Board, Patent Owner's Preliminary Response, *CaptionCall LLC v. Ultratec Inc.*, Case IPR2015-01357, U.S. Pat. No. 6,934,366, Sep. 22, 2015, 37 pages.
In The United States Patent and Trademark Office Before the Patent Trial and Appeal Board, Decision Instituting Review, *CaptionCall LLC v. Ultratec Inc.*, Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, In The United States Patent and Trademark Office Before the Patent Trial and Appeal Board, Jun. 8, 2015, 46 pages.
In The United States Patent and Trademark Office Before the Patent Trial and Appeal Board, Petition for Inter Partes Review of Claim 1 of U.S. Pat. No. 7,006,604, *CaptionCall LLC v. Ultratec Inc.*, Case IPR2015-01358, U.S. Pat. No. 7,006,604, Jun. 8, 2015, 65 pages.
In The United States Patent and Trademark Office Before the Patent Trial and Appeal Board, Patent Owner's Preliminary Response, *CaptionCall LLC v. Ultratec Inc.*, Case IPR2015-01358, U.S. Pat. No. 7,006,604, Sep. 22, 2015, 34 pages.
In The United States Patent and Trademark Office Before the Patent Trial and Appeal Board, Decision Instituting Review, *CaptionCall LLC v. Ultratec Inc.*, Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, In The United States Patent and Trademark Office Before the Patent Trial and Appeal Board, Jun. 8, 2015, 45 pages.
In The United States Patent and Trademark Office Before the Patent Trial and Appeal Board, Petition for Inter Partes Review of Claims

(56) References Cited

OTHER PUBLICATIONS 1-3 and 5-7 of U.S. Pat. No. 6,493,426, *CaptionCall LLC* v. *Ultratec Inc.*, Case IPR2015-01359, U.S. Pat. No. 6,493,426, Jun. 8, 2015, 65 pages.
In The United States Patent and Trademark Office Before the Patent Trial and Appeal Board, Patent Owner's Preliminary Response, *CaptionCall LLC* v. *Ultratec Inc.*, Case IPR2015-01359, U.S. Pat. No. 6,493,426, Sep. 22, 2015, 40 pages.
In The United States Patent and Trademark Office Before the Patent Trial and Appeal Board, Decision Instituting Review, *CaptionCall LLC* v. *Ultratec Inc.*, Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, In The United States Patent and Trademark Office Before the Patent Trial and Appeal Board, Jun. 8, 2015, 47 pages.
In The United States Patent and Trademark Office Before the Patent Trial and Appeal Board, Petition for Inter Partes Review of Claims 1-4 of U.S. Pat. No. 8,515,024, *CaptionCall LLC* v. *Ultratec Inc.*, Case IPR2015-01885, U.S. Pat. No. 8,515,024, Sep. 8, 2015, 35 pages.
In. The United States Patent and Trademark Office Before the Patent Trial and Appeal Board, Patent Owner's Preliminary Response, *CaptionCall LLC* v. *Ultratec Inc.*, Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, In The United States Patent and Trademark Office Before the Patent Trial and Appeal Board, Sep. 8, 2015, 23 pages.
In The United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC* v. *Ultratec Inc.*, Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, In The United States Patent and Trademark Office Before the Patent Trial and Appeal Board, Sep. 8, 2015, 29 pages.
Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Additional Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Opinion and Order Regarding Claim Construction, Daubert, Motions in Limine, and Secondary Considerations of Nonobviousness, *Ultratec, Inc., et al.* v. *Sorenson Communications, Inc., et al.*, Civil Action No. 3:13-cv-00346-BBC, United States District Court, Western District of Wisconsin, Sep. 29, 2014.
Opinion and Order Regarding Motions in Limine and Correcting Errors in Summary Judgment Order, *Ultratec, Inc., et al.* v. *Sorenson Communications, Inc., et al.*, Civil Action No. 3:13-cv-00346-BBC, United States District Court, Western District of Wisconsin, Oct. 1, 2014.
Opinion and Order Regarding Induced Infringement, *Ultratec, Inc., et al.* v. *Sorenson Communications, Inc., et al.*, Civil Action No. 3:13-cv-00346-BBC, United States District Court, Western District of Wisconsin, Oct. 1, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 3, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 8, 2014.
Opinion and Order Regarding Daubert Motions of Secondary Considerations, *Ultratec, Inc., et al.* v. *Sorenson Communications,*

*Inc., et al.*, Civil Action No. 3:13-cv-00346-BBC, United States District Court, Western District of Wisconsin, Oct. 10, 2014.
Joint Stipulation of Dismissal With Prejudice of Claims and Counterclaims Relating to Claims 1-6 of the '835 Patent and Claim 10 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Stipulation Regarding Infringement of Claim 11 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Opinion and Order Regarding Motion for Claims Construction, *Ultratec, Inc., et al.* v. *Sorenson Communications, Inc., et al.*, Civil Action No. 3:13-cv-00346-BBC, United States District Court, Western District of Wisconsin, Oct. 21, 2014.
Special Verdict Regarding Liability, *Ultratec, Inc., et al.* v. *Sorenson Communications, Inc., et al.*, Civil Action No. 3:13-cv-00346-BBC, United States District Court, Western District of Wisconsin, Oct. 23, 2014.
Judgment, *Ultratec, Inc., et al.* v. *Sorenson Communications, Inc., et al.*, Civil Action No. 3:13-cv-00346-BBC, United States District Court, Western District of Wisconsin, Nov. 3, 2014.
Defendants' Rule 50(b) Motion for Judgment of Non-Infringement as a Matter of Law and Rule 59 Motion for New Trial, *Ultratec, Inc., et al.* v. *Sorenson Communications, Inc., et al.*, Civil Action No. 3:13-cv-00346-BBC, United States District Court, Western District of Wisconsin, Nov. 26, 2014.
Defendants' Rule 50(b) Motion for Judgment of Invalidity (Anticipation) and Alternative Rule 59 Motion for New Trial on Anticipation and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 59 Motion for New Trial and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 50(b) Motion for Judgment of Invalidity Obviousness and Alternative Rule 59 Motion for New Trial on Obviousness and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014 (Redacted).
Opinion and Order Regarding Stay of Litigation, *Ultratec, Inc., et al.* v. *Sorenson Communications, Inc., et al.*, Civil Action No. 3:13-cv-00346-BBC, United States District Court, Western District of Wisconsin, May 13, 2015.
Ultratec Inc. and CapTel Inc., Amended Complaint for Patent Infringement and Declaratory Judgment, *Ultratec Inc. and CapTel Inc.* v. *Sorenson Communications Inc. and CaptionCall LLC*, Civil Action No. 13-346, Jul. 31, 2013, 16 pages.
Sorenson Communications Inc. and CaptionCall LLC, Defendants' Amended Answer to Plaintiffs' Amended Complaint for Patent Infringement and Declaratory Judgment and Counterclaims, *Ultratec Inc. and CapTel Inc.* v. *Sorenson Communications Inc. and CaptionCall LLC*, Civil Action No. 13-346, Aug. 14, 2013, 71 pages.
Ultratec Inc. and CapTel Inc., Plaintiffs' Answer to Defendants' Amended Counterclaims, *Ultratec Inc. and CapTel Inc.* v. *Sorenson Communications Inc. and CaptionCall LLC*, Civil Action No. 13-346, Aug. 28, 2013, 26 pages.
Sorenson Communications Inc. and CaptionCall LLC, Invalidity Contentions, *Ultratec Inc. and CapTel Inc.* v. *Sorenson Communications Inc. and CaptionCall LLC*, Civil Action No. 13-346, Sep. 23, 2013, 31 pages.
Sorenson Communications Inc. and CaptionCall LLC, Exhibits to Invalidity Contentions, *Ultratec Inc. and CapTel Inc.* v. *Sorenson Communications Inc. and CaptionCall LLC*, Civil Action No. 13-346, Sep. 23, 2013, 587 pages.
Sorenson Communications Inc. and CaptionCall LLC, Defendants' Answer to Plaintiffs' Original Complaint for Patent Infringement and Counterclaims, *Ultratec Inc. and CapTel Inc.* v. *Sorenson Communications Inc. and CaptionCall LLC*, Civil Action No. 14-66, Feb. 24, 2014, 41 pages.

(56) References Cited

OTHER PUBLICATIONS

Ultratec Inc. and CapTel Inc., Plaintiffs' Answer to Defendants' Counterclaims, *Ultratec Inc. and CapTel Inc. v. Sorenson Communications Inc. and CaptionCall LLC*, Civil Action No. 14-CV-66, Mar. 17, 2014, 14 pages.
Ultratec Inc. and CapTel Inc., Amended Complaint for Patent Infringement, *Ultratec Inc. and CapTel Inc. v. Sorenson Communications Inc. and CaptionCall LLC*, Civil Action No. 3-14-CV-66-BBC, Mar. 26, 2014, 11 pages.
PCT International Search Report, PCT/US2006/025236, dated Oct. 2, 2006.
PCT International Preliminary Report on Patentability, PCT/US2006/025236, dated Jan. 17, 2008.
PCT International Search Report and Written Opinion, PCT/US2009/040523, dated Nov. 4, 2009.
Cooper, Break Feature for Half Duplex Modem, IBM Technical Disclosure Bulletin, Jan. 1975, vol. 17, No. 8, pp. 2386-2387.
Moskowitz, Telocator Alphanumeric Protocol, Version 1.8, Feb. 4, 1997.
Smith, ASCII to Baudot, Radio Electronics, Mar. 1976, pp. 51-58.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
Australian Government IP Australia, Examiner's First Report, Application No. 2006263680, dated Jun. 29, 2009.
Applicant, Response to Jun. 29, 2009 Examiner's First Report, Application No. 2006263680, dated Jun. 17, 2010.
European Patent Office, Examination Report, Application No. 06785768.0, dated Aug. 9, 2010.
Applicant, Response to Aug. 9, 2010 Examination Report, Application No. 06785768.0, dated Dec. 20, 2010.
Applicant, Response to Apr. 20, 2012, Official Action, Application No. 2,556,933 in the Canadian Intellectual Property Office, dated Jul. 12, 2012.
United States Patent and Trademark Office, Office Action Summary and Detailed Action, U.S. Appl. No. 12/686,688, dated Nov. 8, 2012.
Petition for Inter Partes Review for U.S. Pat. No. 10,469,660, *CaptionCall, LLC v. Ultratec, Inc.*, United States Patent and Trademark Office Before the Patent Trial and Appeal Board, Jul. 1, 2020, 68 pages.
Declaration of Benedict J. Occhiogrosso for U.S. Pat. No. 10,469,660, *CaptionCall, LLC v. Ultratec, Inc.*, United States Patent and Trademark Office Before the Patent Trial and Appeal Board, Jun. 23, 2020, 113 pages.
U.S. Appl. No. 60/562,795 Provisional Application to McLaughlin et al., filed Apr. 16, 2004, 126 pages.
BlackBerry, RIM Introduces New Color BlackBerry Handheld for CDMA2000 1X Wireless Networks, BlackBerry Press Release, Mar. 22, 2004, 2 pages.
BlackBerry Wireless Handheld User Guide, 7750, Mar. 16, 2004, 144 pages.
Federal Communications Commission, Telecommunication Relay Services and Speech-to-Speech Services for Individuals With Hearing and Speech Disabilities, 68 Fed. Reg. 50973-50978 (Aug. 25, 2003).
PhoneDB, RIM BlackBerry 7750 Device Specs, Copyright 2006-2020 PhoneDB, 6 pages.
PhonesData, Nokia 6620 Specs, Review, Opinions, Comparisons, Copyright 2020, 9 pages.
Sundgot, Nokia Unveils the 6600, InfoSync World, Jun. 16, 2003, 2 pages.
Wokipedia, Dell Axim, https://en.wikipedia.org/wiki/Dell_Axim, Last Edited on Feb. 23, 2020, 4 pages.
Wikipedia, Palm Tungsten, https://en.wikipedia.org/wiki/Palm_Tungsten, Last Edited on Oct. 6, 2019, 10 pages.
Final Written Decision, U.S. Pat. No. 9,131,045, Case IPR2015-01889, *CaptionCall, LLC v. Ultratec, Inc.*, United States Patent and Trademark Office Before the Patent Trial and Appeal Board, Apr. 11, 2017, 118 pages.
Judgment, U.S. Pat. No. 7,881,441, Case IPR2015-01886, *CaptionCall, LLC v. Ultratec, Inc.*, United States Patent and Trademark Office Before the Patent Trial and Appeal Board, Jun. 9, 2016, 4 pages.
Petition for Inter Partes Review for U.S. Pat. No. 10,491,746, *CaptionCall, LLC v. Ultratec, Inc.*, United States Patent and Trademark Office Before the Patent Trial and Appeal Board, Jul. 1, 2020, 61 pages.
Declaration of Benedict J. Occhiogrosso for U.S. Pat. No. 10,491,746, *CaptionCall, LLC v. Ultratec, Inc.*, United States Patent and Trademark Office Before the Patent Trial and Appeal Board, Jun. 23, 2020, 79 pages.
Arlinger, Negative Consequences of Uncorrected Hearing Loss—A Review, International Journal of Audiology, 2003, 42:2S17-2S20.
Petition for Inter Partes Review for U.S. Pat. No. 10,587,751, *CaptionCall, LLC v. Ultratec, Inc.*, United States Patent and Trademark Office Before the Patent Trial and Appeal Board, Jul. 1, 2020, 64 pages.
Declaration of Benedict J. Occhiogrosso for U.S. Pat. No. 10,587,751, *CaptionCall, LLC v. Ultratec, Inc.*, United States Patent and Trademark Office Before the Patent Trial and Appeal Board, Jun. 23, 2020, 106 pages.
Curtis et al., Doctor-Patient Communication on the Telephone, Can Earn Physician, 1989, 35:123-128.
United States Patent and Trademark Office Before the Patent Trial and Appeal Board, Decision Denying Institution of Inter Partes Review, *CaptionCall LLC v. Ultratec Inc.*, Case IPR2020-01215, U.S. Pat. No. 10,469,660, Jan. 27, 2021, 24 pages.
United States Patent and Trademark Office Before the Patent Trial and Appeal Board, Petitioner's Request for Rehearing Pursuant to 37 C.F.R. 42.71(d), *CaptionCall LLC v. Ultratec Inc.*, Case IPR2020-01215, U.S. Pat. No. 10,469,660, Feb. 18, 2021, 19 pages.

\* cited by examiner

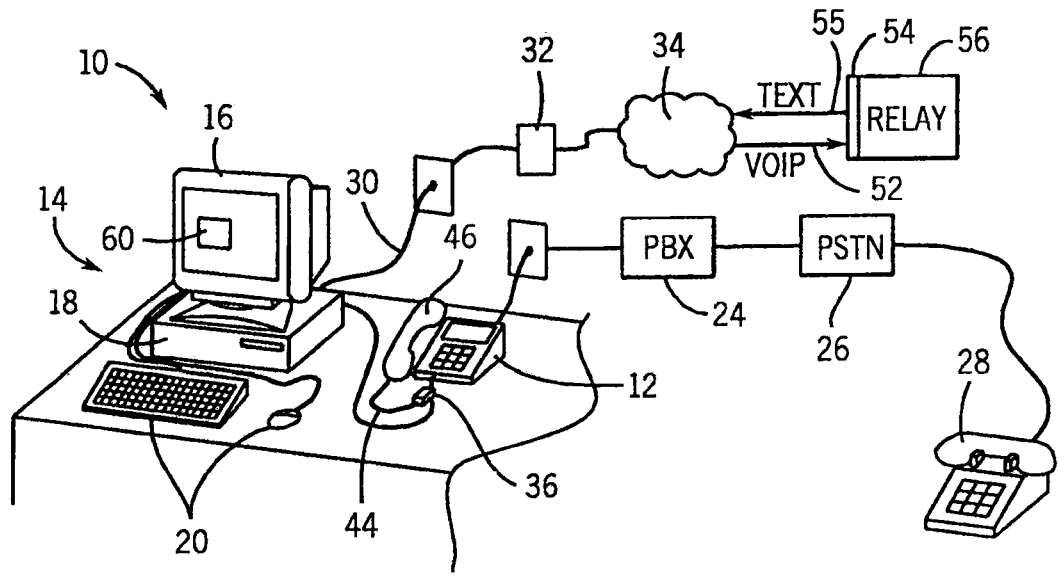
FIG. 1
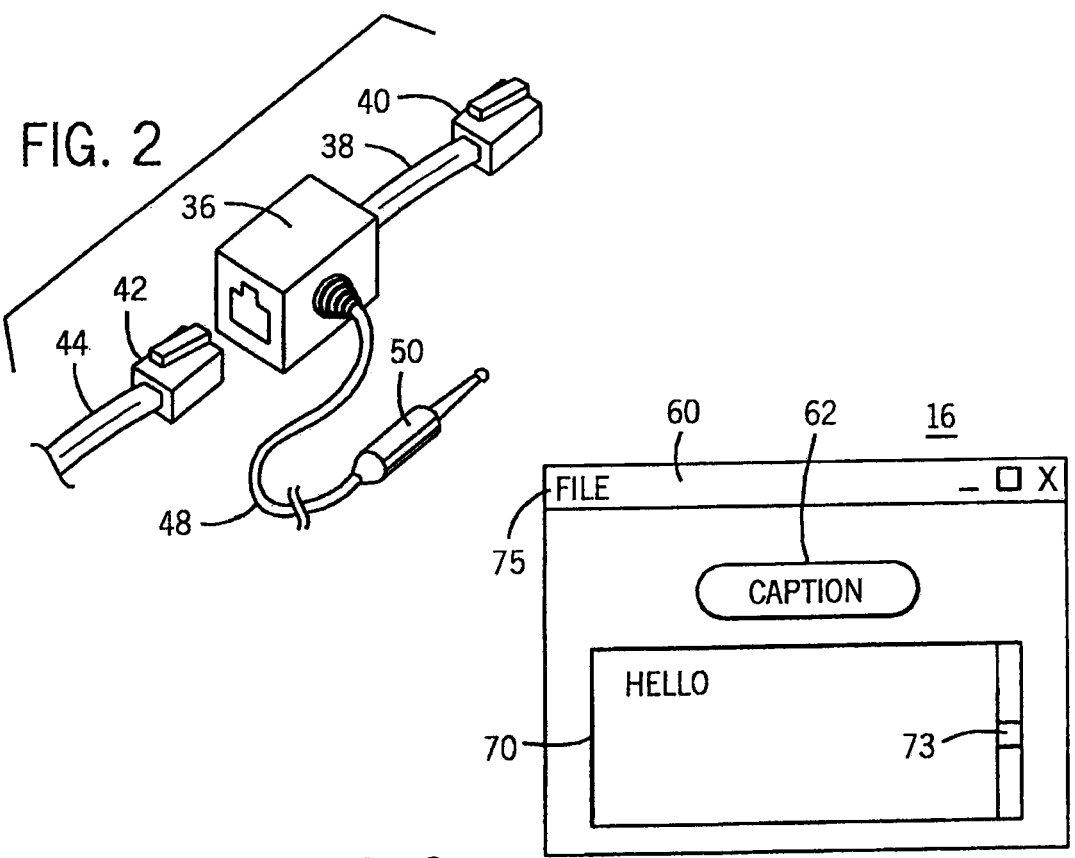
FIG. 2
FIG. 3

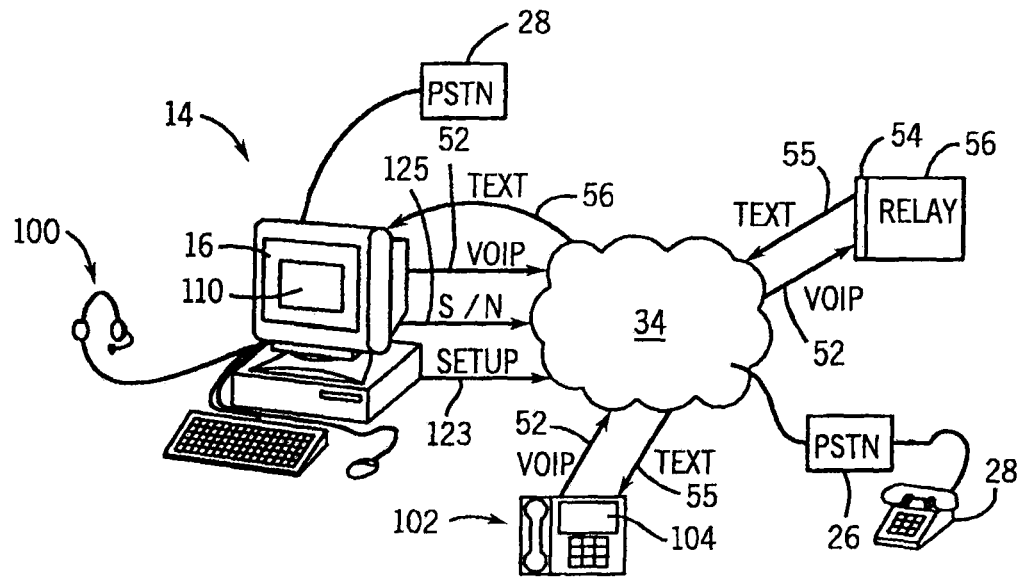
FIG. 8
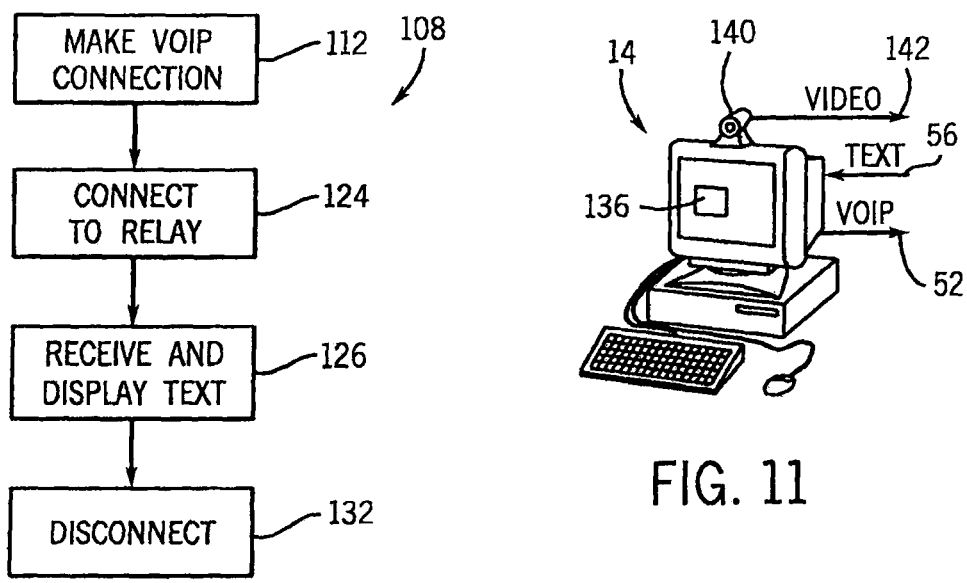
FIG. 10
FIG. 11

DEVICE INDEPENDENT TEXT CAPTIONED TELEPHONE SERVICE

CROSS-REFERENCE TO RELATED APPLICATIONS

This application is a continuation of U.S. patent application Ser. No. 14/988,407, filed Jan. 5, 2016, which is a continuation of U.S. patent application Ser. No. 14/553,291, filed Nov. 25, 2014, and issued as U.S. Pat. No. 10,015,311 on Jul. 3, 2018, which is a continuation of U.S. patent application Ser. No. 13/790,420, filed Mar. 8, 2013, and issued as U.S. Pat. No. 8,917,821 on Dec. 23, 2014, which is a continuation of U.S. patent application Ser. No. 12/102,057, filed Apr. 14, 2008, and issued as U.S. Pat. No. 8,416,925 on Apr. 9, 2013, which is a continuation-in-part of U.S. patent application Ser. No. 11/391,141, filed Mar. 28, 2006, and issued as U.S. Pat. No. 7,881,441 on Feb. 1, 2011, which in turn claimed the benefit of priority to U.S. Provisional Application No. 60/695,099, filed Jun. 29, 2005, all of which are hereby incorporated by reference as if fully set forth herein.

STATEMENT REGARDING FEDERALLY SPONSORED RESEARCH OR DEVELOPMENT

Not Applicable.

BACKGROUND OF THE INVENTION

The present application relates generally to telephone systems and specifically to telephone systems that provide for real-time text captioning for the hard of hearing.

Modern telecommunication services provide features to assist those who are deaf or hard of hearing. One such feature is the text telephone (TTY) also known as a telecommunication device for the deaf (TDD). TTYs allow for text communication through the telephone system by generating tones that may be transmitted by analog telephone lines in response to a user typing letters on a keyboard.

Hearing users may communicate with deaf users who have TTY devices through so-called "relays." A relay is a service funded by telephone communication surcharges that provides a "call assistant" who intermediates between a deaf user and a hearing user. The call assistant communicates with the deaf user using a TTY and communicates with the hearing user by voice over a standard telephone line.

A relay service may also be used to help those who are not deaf, but hard of hearing, by providing a captioned telephone. With a captioned telephone, a user who is hard of hearing may carry on a normal telephone conversation with a hearing user while a text transcription of the words spoken by the hearing user is displayed on the telephone. The text transcription allows the hard of hearing user to confirm his or her understanding of the spoken words. Unlike with a conventional relay service, captioned telephone requires extremely fast text transcription using a computer executed voice recognition system (typically with revoicing by a trained operator) so that the text captioning is as nearly as possible contemporaneous with the spoken words.

Text captioned telephones of this type are marketed under the service mark CAPTEL and described in U.S. Pat. Nos. 6,307,921 and 6,075,842 assigned to the assignee of the present invention and hereby incorporated by reference.

A text captioned telephone system employs a relay service in a mode where the relay transmits both the voice of the hearing user and a text stream of the spoken words by that user. A telephone or display device of the receiving hard of hearing user provides a text display for displaying the captions.

In a single-line text captioned telephone, text and voice signals may be received over a single telephone line and separated electronically. The text captioned telephone includes software that automatically dials the relay, and providing the relay with the telephone number of the ultimate destination of the call. For incoming telephone calls, the hard of hearing user must normally hang up and redial the caller through the relay.

In a two-line text captioned telephone, a first telephone line communicates with the caller, and a second telephone line communicates exclusively with the relay. The two-line system allows text captioning to be easily used on incoming calls by allowing the text captioned telephone to dial out to the relay when the call is received and forward the necessary voice signal.

Many users of text-captioned telephony have jobs requiring significant use of the telephone as made possible by text-captioning. These users face a significant problem when they need to make use of telephone systems outside of their normal work environment where text captioning telephones may not be available or equipment such as cellular telephones that does not support text captioning must be used. Many workplaces use proprietary private branch exchange (PBX) telephone lines that do not support analog text captioning telephones, the latter which require standard telephone connections.

Other problems with existing telephony systems include an inability to confirm that a communication has been initiated by a person at a call back telephone number, system users that allow others to use their accounts to share or avoid costs, lack of options for terminating calls to persons that use relay systems, inability for a relay user to identify that an incoming call is a relay call and the identity of the caller and how to present information to an emergency call center that can be used by the call center to call back or establish communication with a relay user.

SUMMARY OF THE INVENTION

At least some embodiments include a method of commencing a caption assisted telephone call using a combination of a first party telephone terminal and a first party Network appliance, the method comprising the steps of (a) connecting the first party Network appliance to a relay, (b) using the first party Network appliance to specify a first party call back telephone number, (c) using the relay to dial the first party call back telephone number, (d) specifying a confirmation activity that must be performed via the first party telephone terminal in order to continue a telephone call process, (e) when the first party telephone terminal is answered, monitoring activities via the first party telephone terminal and (f) when the confirming activity occurs, continuing the telephone call process.

In some embodiments the step of specifying a confirmation activity includes presenting instruction via the first party Network appliance specifying confirming information to be entered via the first party telephone terminal, the step of monitoring including monitoring information input via the first party telephone terminal. In some cases the method further includes the step of also presenting information via the first party telephone terminal indicating that the call is a caption assisted telephone call.

In some cases the confirming instruction instructs the first party to press at least one specific dual-tone multi frequency (DTMF) button on the first party telephone terminal. In some cases the first party Network appliance includes a display screen and wherein the step of presenting a confirmation instruction includes presenting instructions via the display screen.

In some cases the step of monitoring for the confirming activity continues until one of the confirming activity occurs and a time out period expires and, when the time out period expires prior to the confirming activity occurring, the method further includes the step of disconnecting from the first party telephone terminal. In some cases the confirming activity includes the first party speaking a specific phrase into the first party telephone terminal.

Some embodiments further include the step of using the first party Network appliance to specify a second party target telephone number, the step of continuing the telephone call process including calling the second party target telephone number. In some cases the confirming activity requires the first party to enter a second party target telephone number via at least one of the first party Network appliance and the first party telephone terminal.

In some cases the step of using the first party Network appliance to specify a second party target telephone number includes specifying the second party target telephone number prior to using the relay to dial the first party call back telephone number. In some cases the Network appliance is a wireless device. In some cases the wireless device includes the telephone associated with the first party call back telephone number.

Some embodiments include a method of commencing a caption assisted telephone call using a combination of a first party telephone terminal and a first party Network appliance, the method comprising the steps of (a) connecting the first party Network appliance to a relay, (b) using the first party Network appliance to specify a first party call back telephone number and a second party target telephone number, (c) using the relay to dial the first party call back telephone number, (d) presenting a confirmation instruction to the first party via the first party Network appliance instructing the first party to enter confirming information via the first party telephone terminal, (e) monitoring information input via the first party telephone terminal and (f) when the confirming information is entered, continuing the telephone call process.

Some embodiments further include the step of also presenting instruction via the first party telephone terminal indicating that the call is a caption assisted telephone call. In some cases the confirming instruction instructs the first party to press at least one specific dual-tone multi frequency (DTMF) button on the first party telephone terminal. In some cases the step of monitoring information continues until one of the confirming activity occurs and a time out period expires and, when the time out period expires prior to the confirming activity occurring, the method further includes the step of disconnecting from the first party telephone terminal.

Some embodiments include a system for commencing a caption assisted telephone call using a combination of a first party telephone terminal and a first party Network appliance, the system comprising a first party telephone terminal, a second party telephone terminal, a first party Network appliance and a relay linkable to the first and second party telephone terminals and to the Network appliance, wherein, when the first party Network appliance communicates with the relay and provides a first party call back telephone number to commence a telephone call process, the relay dials the first party call back telephone number, monitors activities performed via the first party telephone terminal and only continues the telephone call process when a confirming activity occurs.

In some cases the relay further presents confirmation instructions via the first party Network appliance indicating a confirmation process that should be performed via the first party telephone terminal. In some cases the relay also presents instruction via the first party telephone terminal indicating that the call is a caption assisted telephone call. In some cases the confirming instruction instructs the first party to press at least one specific dual-tone multi frequency (DTMF) button on the first party telephone terminal. In some cases the first party Network appliance includes a display screen and wherein the confirming instructions are presented via the display screen. In some cases the relay monitors for confirming activity until one of the confirming activity occurs and a time out period expires and, when the time out period expires prior to the confirming activity occurring, the relay disconnects the first party telephone terminal.

In some cases the first party Network appliance is a wireless device. In some cases the wireless device includes the first party telephone terminal. In some cases the first party telephone terminal and the first party network appliance form parts of a single communication device.

A system for presenting caller ID information related to a caption assisted telephone call, the system comprising at least a first party Network appliance that includes a Network appliance display, (b) a first party telephone service, (b) a relay linkable to the first party Network appliance via the Internet, the relay including a processor and programmed to notify the first party that a second party is attempting to communicate with the first party by, when a second party links to the relay to commence a communication with the first party via the first party telephone service and the first party Network appliance, presenting both relay service identifying information and second party identifying information to the first party via at least one of the first party network appliance and the first party telephone service.

In some cases the relay presents the service identifying information via the telephone service and presents the second party identifying information via the first party Network appliance. In some cases the first party is associated with a first party telephone terminal that includes a telephone display that is separate from the first party Network appliance display, the relay presenting the service identifying information via the first party telephone terminal display. In some cases the first party Network appliance is also used by the first party as a first party telephone terminal and wherein the relay presents the second party identifying information and also presents the service identifying information via the Network appliance display.

Some embodiments include a system for presenting caller ID information related to a caption assisted telephone call, the system comprising (a) at least a first party Network appliance that includes a Network appliance display, (b) a first party telephone terminal including a telephone terminal display, (c) a relay linkable to the first party Network appliance via the Internet, the relay including a processor and programmed to notify the first party that a second party is attempting to communicate with the first party by, when a second party links to the relay to commence a communication with the first party via the first party telephone terminal and the first party Network appliance, presenting service identifying information and second party identifying information to the first party via the telephone terminal display and the Network appliance display, respectively.

Some embodiments include a method for presenting caller ID information related to a caption assisted telephone call, the method for use with a first party Network appliance that includes a Network appliance display, a first party telephone service and a relay linkable to the first party Network appliance via the Internet, the relay including a processor, the method comprising the steps of, when a second party links to the relay to commence a communication with the first party via the first party telephone service and the first party Network appliance, (i) presenting relay service identifying information to the first party via at least one of the first party network appliance and the first party telephone service and (ii) presenting second party identifying information to the first party via at least one of the first party network appliance and the first party telephone service.

In some cases the step of presenting relay service identifying information to the first party includes presenting the relay service identifying information via the telephone service and the step of present second party identifying information includes presenting the second party identifying information via the first party Network appliance display screen. In some cases the first party is associated with a first party telephone terminal that includes a telephone display that is separate from the first party Network appliance display, the relay presenting the service identifying information via the first party telephone terminal display.

In some cases the first party Network appliance is also used by the first party as a first party telephone terminal and wherein the relay presents the second party identifying information and also presents the service identifying information via the Network appliance display.

Some embodiments include a method for facilitating an emergency voice call using a first party Network appliance that communicates via an Internet protocol (IP) and that has an IP address, the method comprising the steps of (a) connecting the first party Network appliance to a relay, (b) using the first party Network appliance to specify a target telephone number, (c) recognizing the target telephone number as an emergency telephone number, (d) assigning a temporary telephone number to the first party where calls to the temporary telephone number are routed to the relay and (e) storing the temporary telephone number with the IP address of the first party Network appliance in a database accessible by the relay.

Some embodiments further include the steps of using the emergency telephone number to establish a first communication with an emergency service provider and presenting the temporary telephone number to the emergency service provider. Some embodiments further include the steps of, subsequent to the first communication, the emergency service provider using the temporary telephone number to link to the relay and commence a second communication, when the service provider links to the relay, the relay using the temporary telephone number to identify the IP address of the first party Network appliance and establishing communication with the first party via the first party Network appliance. In some cases the step of storing further includes storing a call back telephone number that is associated with the first party with the temporary telephone number and the IP address of the first party Network appliance.

In some cases, when the service provider links to the relay, the relay further uses the temporary telephone number to identify the call back number associated with the first party and further establishes communication with the first party via the call back telephone number. In some cases the temporary telephone number is unassigned to the first party after expiration of a preset period. Some embodiments further include the step of, subsequent to expiration of the preset period, assigning the temporary telephone number to second party that uses a second party Network appliance to specify an emergency telephone number.

Some embodiments include a method for facilitating an emergency voice call using a first party Network appliance that communicates via an Internet protocol (IP) and that has an IP address, the method comprising the steps of (a) connecting the first party Network appliance to a relay (b) using the first party Network appliance to specify a target telephone number, (c) recognizing the target telephone number as an emergency telephone number, (d) assigning a temporary telephone number to the first party where calls to the temporary telephone number are routed to the relay, (e) storing the temporary telephone number with the IP address of the first party Network appliance and a first party call back number usable to place a telephone call to the first party in a database accessible by the relay, (f) using the emergency telephone number to establish a first communication with an emergency service provider and presenting the temporary telephone number to the emergency service provider.

Some embodiments further include the steps of, subsequent to the first communication, the emergency service provider using the temporary telephone number to link to the relay and commence a second communication, when the service provider links to the relay, the relay using the temporary telephone number to identify the IP address of the first party Network appliance and the first party call back number and establishing communication with the first party via the first party Network appliance and the first party call back telephone number.

Some embodiments include a method for facilitating a voice call using a first party Network appliance that communicates via an Internet protocol (IP) and that has an IP address, the method comprising the steps of (a) connecting the first party Network appliance to a relay, (b) using the first party Network appliance to specify a target telephone number, (c) assigning a temporary telephone number to the first party where calls to the temporary telephone number are routed to the relay and (e) storing the temporary telephone number with the IP address of the first party Network appliance in a database accessible by the relay.

Some embodiments further include the steps of using the telephone number to establish a first communication with a second party and presenting the temporary telephone number to the second party. Some embodiments further include the step of, subsequent to the first communication, the second party using the temporary telephone number to link to the relay and commence a second communication, when the second party links to the relay, the relay using the temporary telephone number to identify the IP address of the first party Network appliance and establishing communication with the first party via the first party Network appliance. In some cases the step of storing further includes storing a call back telephone number that is associated with the first party with the temporary telephone number and the IP address of the first party Network appliance.

In some cases, when the second party links to the relay, the relay further uses the temporary telephone number to identify the call back number associated with the first party and further establishes communication with the first party via the call back telephone number. In some cases the temporary telephone number is unassigned to the first party after expiration of a preset period. Some embodiments further include the step of determining that the target telephone number corresponds to an emergency service provider and wherein the step of assigning a temporary telephone number to the first party includes assigning a temporary telephone number only when the target telephone number corresponds to the an emergency service provider.

Some embodiments include a telephone call captioning system comprising a first party Network appliance linked to a network for communicating via an Internet protocol (IP) and having a first party IP address, a first party telephone associated with a first party call back telephone number, a second party telephone associated with a second party telephone number, a database, a relay linked to the Network and the database, the relay including a processor and programmed to perform the steps of, when the first party Network appliance is linked to the relay to commence a communication with a second party (i) receiving a target telephone number associated with a second party, (ii) assigning a temporary telephone number to the first party where calls to the temporary telephone number are routed to the relay and storing the temporary telephone number with the IP address of the first party Network appliance and the first party telephone number in the database for subsequent access by the relay.

In some cases the relay processor is further programmed to perform the steps of using the emergency telephone number to establish a first communication with a second party and presenting the temporary telephone number to the second party. Some embodiments further include the steps of, subsequent to the first communication, the second party using the temporary telephone number to link to the relay and commence a second communication, when the second party links to the relay, the relay using the temporary telephone number to identify the IP address of the first party Network appliance and the first party call back number and establishing communication with the first party via the first party Network appliance and the call back number. In some cases the relay processor unassigns the temporary telephone number from the first party after expiration of a preset period.

Some embodiments include a method for use with an Internet appliance that is linkable to a call assist relay via the Internet to facilitate communication with a first party via the Internet appliance, the Internet appliance communicating via an Internet protocol (IP), the method for facilitating an activity when a communication is attempted with the Internet appliance and the Internet appliance is de-linked from the relay, the method comprising the steps of providing a database that is accessible to the relay, the database including instructions regarding activities to be performed when a communication is attempted with the Internet appliance and the Internet appliance is de-linked from the relay, monitoring communications at the relay and, when a second party attempts to communicate with the Internet appliance (i) determining that the Internet appliance is de-linked from the relay and (ii) commencing a terminating action related to the communication.

In some cases the step of commencing a terminating activity includes presenting an audible message to the second party indicating that the communication cannot be completed. In some cases the step of commencing a terminating activity further includes receiving a spoken message from the second party and commencing transcription of the spoken message into a text message. Some embodiments further include the step of, at a time subsequent to the transcription when the first party links to the relay, presenting an indication that a transcribed message exists for the first party and allowing the first party to view the text message. In some cases the first party is also associated with a first party call back telephone number, the database also storing the first party call back telephone number, the step of commencing a terminating action including accessing the first party call back telephone number in the database, calling the first party call back telephone number and presenting information to the first party via a first party telephone indicating that a communication has been attempted.

Some embodiments further include the steps of, when the first party telephone remains unanswered for a time out period, receiving a spoken message from the second party and commencing transcription of the spoken message into a text message. In some cases the step of providing a database includes the steps of, via the Internet appliance, providing an interface screen to the first user including a plurality of different possible terminating activities, receiving at least one terminating activity selection via the interface screen and storing the terminating activity selection for subsequent use. In some cases the first party is also associated with additional contact information for electronically communicating with the first party, the database also storing the additional contact information associated with the first party, the step of commencing a terminating action including accessing the additional contact information associated with the first party in the database, attempting to link to the first party via the additional contact information and presenting information to the first party indicating that a communication has been attempted via the first party Internet appliance.

Still other embodiments include a method of controlling use of a caption assisted telephone call relay by a first party, the first party using a combination of a first party telephone terminal and a first party Network appliance to facilitate communication, the first party Network appliance communicating via an Internet protocol (IP) and having an IP address, the method comprising the steps of (a) prescribing a single first party call back number for the first party to communicate via the relay, (b) storing the first party call back number and the first party Network appliance IP address in a database accessible to the relay, (c) connecting the first party Network appliance to the relay, (d) specifying a target telephone number associated with a second party, (e) via the relay (i) identifying the first party Network appliance IP address, (ii) accessing the database and identifying the first party call back number and (iii) using the first party call back number to establish a communication link between the first and second parties.

Other embodiments include a system for facilitating an activity when a communication is attempted and unsuccessful in a call assist environment, the system comprising a first party Network appliance linked to a network to communicate via an Internet protocol (IP) and having an IP address, a relay linked to the network and usable to commence a communication with the first party Network appliance, the relay including a processor that runs a program to perform the steps of providing an interface to a first party via the first party Network appliance enabling the first party to select one of a plurality of different options for activities to be performed when a communication is attempted with the first party Network appliance when the first party Network appliance is de-linked from the relay, accepting the first party selection and storing the selection in the database as instructions regarding activities to be performed when a communication is attempted with the Network appliance and the Network appliance is de-linked from the relay, monitoring communications at the relay and, when a second party attempts to communicate with the first party Network appliance (i) determining that the Network appliance is de-linked from the relay and (ii) accessing the database and identifying the first party selection and (iii) commencing the first party selection to terminate the communication.

In some cases the first party selection includes presenting an audible message to the second party indicating that the communication cannot be completed. In some cases the first party selection includes receiving a spoken message from the second party and commencing transcription of the spoken message into a text message. In some cases the processor further runs the program to perform the step of, at a time subsequent to the transcription when the first party links to the relay, presenting an indication that a transcribed message exists for the first party and allowing the first party to view the text message. In some cases the first party is also associated with a first party call back telephone number, the database also storing the first party call back telephone number, the first party selection including commencing a terminating action by accessing the first party call back telephone number in the database, calling the first party call back telephone number and presenting information to the first party via a first party telephone indicating that a communication has been attempted.

In some cases the processor further performs the steps of, when the first party telephone remains unanswered for a time out period, receiving a spoken message from the second party and commencing transcription of the spoken message into a text message. In some cases the first party is also associated with additional contact information for electronically communicating with the first party, the database also storing the additional contact information associated with the first party, the first party selection including commencing a terminating action by accessing the additional contact information associated with the first party in the database, attempting to link to the first party via the additional contact information and presenting information to the first party indicating that a communication has been attempted via the first party Internet appliance.

Other embodiments include a method of commencing a caption assisted telephone call using a combination of a first party telephone terminal and a first party Network appliance, the method comprising the steps of (a) connecting the first party Network appliance to a relay, (b) using the first party Network appliance to specify a first party call back telephone number, (c) using the relay to dial the first party call back telephone number, (d) using at least one of the first party telephone and the first party Network appliance to specify a confirmation activity that must be performed in order to continue a telephone call process, where the first party telephone is used to specify the confirmation activity, the confirmation activity having to be performed using at least one of the first party telephone terminal and the first party Network appliance and where the first party Network appliance is used to specify the confirmation activity, the confirmation activity having to be performed using at least the first party telephone, (e) when the first party telephone terminal is answered, monitoring activities via at least one of the first party telephone terminal and the first party Network appliance and (f) when the confirming activity occurs, continuing the telephone call process.

BRIEF DESCRIPTION OF THE DRAWINGS

FIG. 1 is a representation of a first embodiment of the invention providing text-captioned telephony using a PBX office telephone and Internet-connected computer;

FIG. 2 is a perspective view of a voice-tap connecting the PBX telephone of FIG. 1 to the computer to allow transfer of voice signals over the Internet to a relay;

FIG. 3 is a caller interface window as may be displayed on the computer of FIG. 1 allowing on-demand captioning of the telephone call;

FIG. 8 is a figure similar to that of FIGS. 1 and 5 showing implementation of a text-captioning using VOIP transmissions;

FIG. 10 is a flowchart of the principal steps executed by the computer in implementing the text-captioned telephony using VOIP telephones;

FIG. 11 is a fragmentary view of the computer of FIG. 8 showing the addition of a video camera so that voice and video may be transmitted to the other caller;

DETAILED DESCRIPTION OF THE PREFERRED EMBODIMENT

Figure 4:
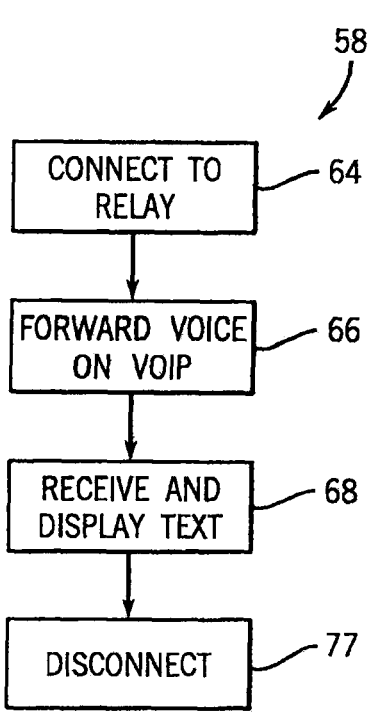
FIG. 4 is a flowchart of the principle steps of a program executed on the computer of FIG. 1 when captioning is demanded by the caller.

Referring to FIG. 1, in a first embodiment of the invention, a text captioned telephone system 10 may be implemented within a typical office having a PBX telephone terminal 12 and a desk top computer 14. The desk top computer 14 includes a display screen 16, a base unit 18

(including a processor, memory, disk drives and importantly a sound card) and a keyboard or other entry device 20.

As is understood in the art, the PBX telephone terminal 12 may be connected through an office wall jack 22 (not labeled in FIG. 1) to a PBX network 24 using a proprietary communication protocol. The PBX network 24 communicates with a public switched telephone network 26 that allows the PBX telephone terminal 12 to connect to an external telephone terminal 28 to originate a call to the external telephone terminal 28 or to receive a call from the external telephone terminal 28.

The computer 14 may connect through an Ethernet card to an Ethernet network 30, passing to a local router 32 to connect to the Internet 34 or may use one of a number of well known wireless standards to connect to the local router 32.

Referring now also to FIG. 2, a voice signal tap 36 has a short cable stub 38 terminating in an RJ-12 jack 40 that may be received in the handset jack for the main body of the PBX telephone terminal 12. The tap 36 also provides a receiving socket for the RJ-12 jack 42 associated with the handset cord 44 so that the tap 36 may be simply interposed between the handset 46 and the main body of the PBX telephone terminal 12 to conduct voice signals as analog audio signals there through.

A tap line 48 extending from the tap 36 terminates in a subminiature phone jack 50 that may be received by audio input of the sound card of the base unit 18. The tap line conducts a portion of the voice signals from the handset 46 to the sound card of the base unit 18.

The voice signals received by the computer 14 may be processed by an internal program of a type well known in the art to encode the voice signals as VOIP signals 52 that may be sent over the Internet to a server 54 associated with a relay service 56. Programs for transmitting VOIP signal are commercially available from Skype of Luxembourg and Vonage of New Jersey, USA. At the relay service 56, the encoded voice signals may be converted back to an audio signal for transcription by a call assistant who produces corresponding captioning text 57 that may be relayed through conventional Internet transfer protocols back to the computer 14 where the text may be displayed.

In an alternative embodiment, a headset microphone and earpiece (not shown) may communicate separately with left and right sound card channels. This, along with echo canceling software in the computer 14 allows the relay service 56 to separate the voice of the caption user from the other party for improved transcription and anonymity.

The relay service 56 may provide for human operators working with speech recognition engines to rapidly translate voice signals into text streams. The operation of such a relay is described in more detail in U.S. Pat. No. 6,567,503, assigned to the same assignee as the present invention and hereby incorporated by reference.

By placing the tap 36 in the path of the handset 46, analog audio signals may be obtained, greatly simplifying the acquisition of the audio signal without the need to contend with the PBX standard or the need or awkward or unfamiliar computer associated microphones.

Referring now to FIG. 3, an office user wishing to avail themselves of text captioning may start a text-captioning program 58 on the computer 14 to provide a caller interface window 60 on the display screen 16. The caller interface window 60 may provide simple mouse or keyboard operated controls including a caption button 62 that may be actuated by the caller to begin the program's operation.

Referring to FIG. 4, upon pressing of the caption button 62, as indicated by process block 64, the computer 14 may initiate an Internet connection to the relay service 56 by invoking a stored URL of the relay server 54. At this time, the computer 14 may provide some information to the relay including a serial number of the caller to validate the caller's location for the purpose of identifying the particular public authority responsible for the relay call. The caller can be required to register the program with a relay service database and the serial number can be used to authorize their use of the service, thus limiting fraudulent use of the relay service and allowing for local 911 service by providing information about the geographic location of the user.

As indicated by process block 66, the program 58 may then forward the tapped voice signals as VOIP signals to the relay server 54, and receive text as indicated by process block 68 which may be displayed in text box 70 of the caller interface window 60. The text box 70 includes conventional scroll-type controls 73 allowing text to be reviewed after it has been received. The program 58 may also provide for normal file operations 75 including saving of text files, e-mailing text files, and the like.

Upon completion of the call, the caller may press the caption button 62 again to disconnect the call as indicated by process block 71. The caption button 62 may include an animation visually indicating its state as being depressed or released or may change its label from "caption" to "end caption" indicating its changing function.

Importantly, this system allows for convenient and intuitive voice communication between a PBX telephone terminal 12 and telephone terminal 28, either for making outgoing calls or ingoing calls, while allowing either type of call to be captioned on demand without interruption of the telephone call or the need for specialized telephone equipment. This system will also work without a PBX exchange and can work for a variety of different telephone types not intended for text captioning.

Figure 5:
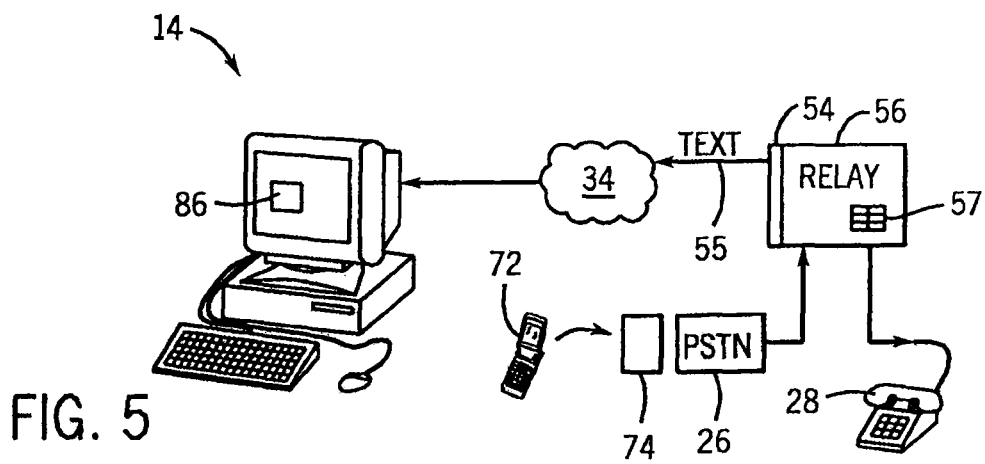
FIG. 5 is a figure similar to that of FIG. 1, showing an alternative embodiment in which the voice signal is routed through a standard telephone line to the relay and the text is returned to the computer.

Referring now to FIG. 5, in a second embodiment, a standard desk top computer 14 may work in conjunction with a standard telephone (i.e., not text captioned), in this case a cell telephone 72, the latter of which communicates through a cellular service 74 with the public switched telephone network 26, without a direct connection between the cell telephone 72 and the computer 14.

Figure 6:
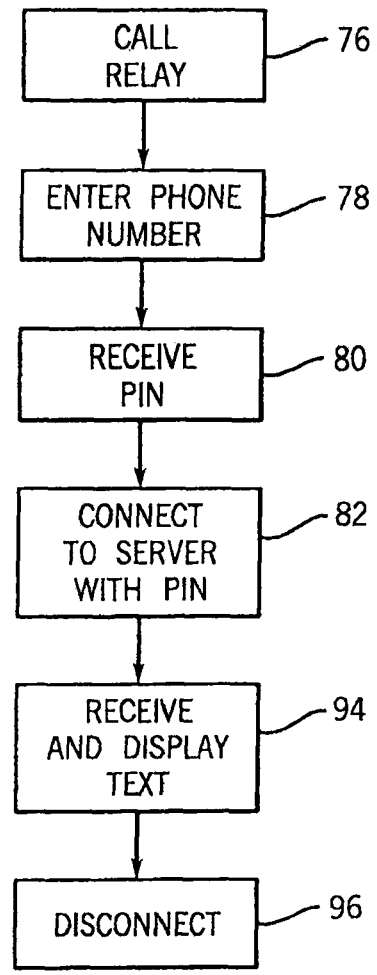
FIG. 6 is a figure similar to that of FIG. 4 showing the flowchart for the embodiment of FIG. 5.

In this embodiment, the caller using the cell telephone 72 first calls the relay service 56 as indicated by process block 76 of FIG. 6. The relay service 56, per standard practice, receives telephone calls over the public switched telephone network 26. The relay service 56 may provide an automated answering system that requests a telephone number from the caller of the ultimate destination of the telephone call, in this case, telephone terminal 28. As indicated by process block 78 of FIG. 6, the caller may enter the requested telephone number by using the caller's keypad on the cell telephone 72.

In the case where the relay service remains anonymous, in the sense that the call assistant does not speak directly with the caller, the answering system may provide the caller with a personal identification number (PIN) as indicated in process block 80. The relay service 56 links the caller's particular incoming line to the PIN in an internal database 57.

The caller, using a conventional browser on the desk top computer 14, then enters the URL of the server 54 of the relay service 56, as indicated by process block 82 of FIG. 6. This may also be done before initiating the call to the relay service 56.

Figure 7:
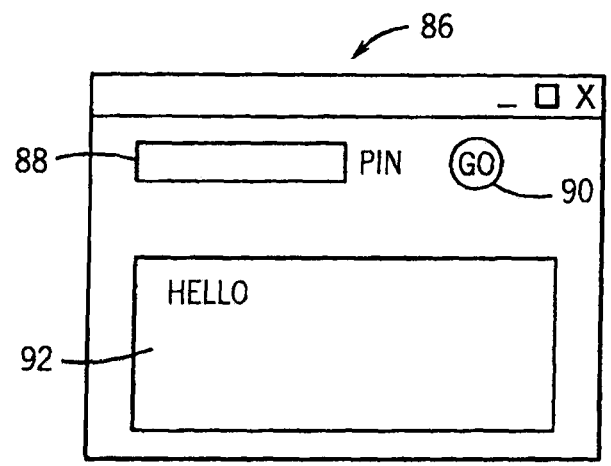
FIG. 7 is a figure similar to that of FIG. 3 showing a caller interface window for entering a PIN number to link captioning text to a particular call.

As shown in FIG. 7, the relay server 54 provides the caller with webpage 86 offering a text box 88 allowing entry of the PIN received at process block 80. The caller, by entering that PIN and press a captioning initiation button 90, causes the relay service 56 to complete the call by connecting the incoming audio from the cell telephone 72 to the telephone terminal 28. The relay service 56 then forwards captioning text 55 over the Internet 34 to the caller through a text box 92 as indicated by process block 94. The text box 92 may use, for example, a browser plug-in or instant messaging program to provide for a consistent updating of the text as it is received, but otherwise requires no specialized software on computer 14.

Alternatively and preferably, the caller may first contact the webpage 86 using the computer 14 to provide the relay server 54 with both the number the caller wishes to dial and also the caller's own telephone number. The relay server 54 then calls the caller over the cell phone 72. Once a connection is established with captions, the relay server 54 dials to the other party. This automatically links the IP address to the telephone connections without the need for PIN. The phone number of the caller may be entered on the webpage 86 in a text box (not illustrated) and the destination phone number may be entered in another text box (not illustrated) similar to those described for the PIN.

The use of a web page and browser plug in to avoid the need for specialized software to be on the desktop computer 14 is also applicable to the earlier embodiment of FIG. 1.

At the end of the call as indicated by process block 96, the caller may press the captioning initiation button 90 again to terminate the call. The captioning initiation button 90 may reflect this new purpose, of terminating the captioning, by changing its label.

Again, in this embodiment, no specialized text captioning equipment is required, but the system makes use of commonly available office and telephone equipment to provide for text captioning that is not limited to a particular location, but which may be used in any location where Internet and telephone access may be had. In this regard, computer 14 may, for example, be any Internet appliance, for example, a wireless mobile laptop or the like. Thus a caller may work from a hot spot using a cell telephone and a wireless laptop to obtain competent text captioning.

In a variation on this embodiment, set-up of the call (e.g. providing the relay service 56 with the destination phone number) may be accomplished using the desktop computer 14 rather than via telephone 72. When the caller calls the relay service 56, the caller enters a pin number to connect the call to the captioning or the connection may be made by linking the callers phone number with a number previously entered on the computer 14.

In this embodiment, identification of the particular governmental entity responsible for reimbursement for the captioning can be obtained from the information of the public switched telephone network 26 per standard practice.

In a variation on this embodiment, new 3G cellular services allow the use of both cellular voice and data connections simultaneously using a cellular phone. In this case, the browser on a desktop computer 14 may be replaced with a browser on the cell phone which provides a telephone and Internet appliance, all in one.

Referring now to FIG. 8 in a third embodiment, a single advanced Internet appliance may be used to replace the need for a telephone. That Internet appliance, for example, may be a standard computer 14 equipped with a microphone and headphone assembly 100 for making VOIP calls or a VOIP telephone 102 providing for display capabilities on screen 104. Many PBX systems now allow for the connection of VOIP phones.

Figure 9:
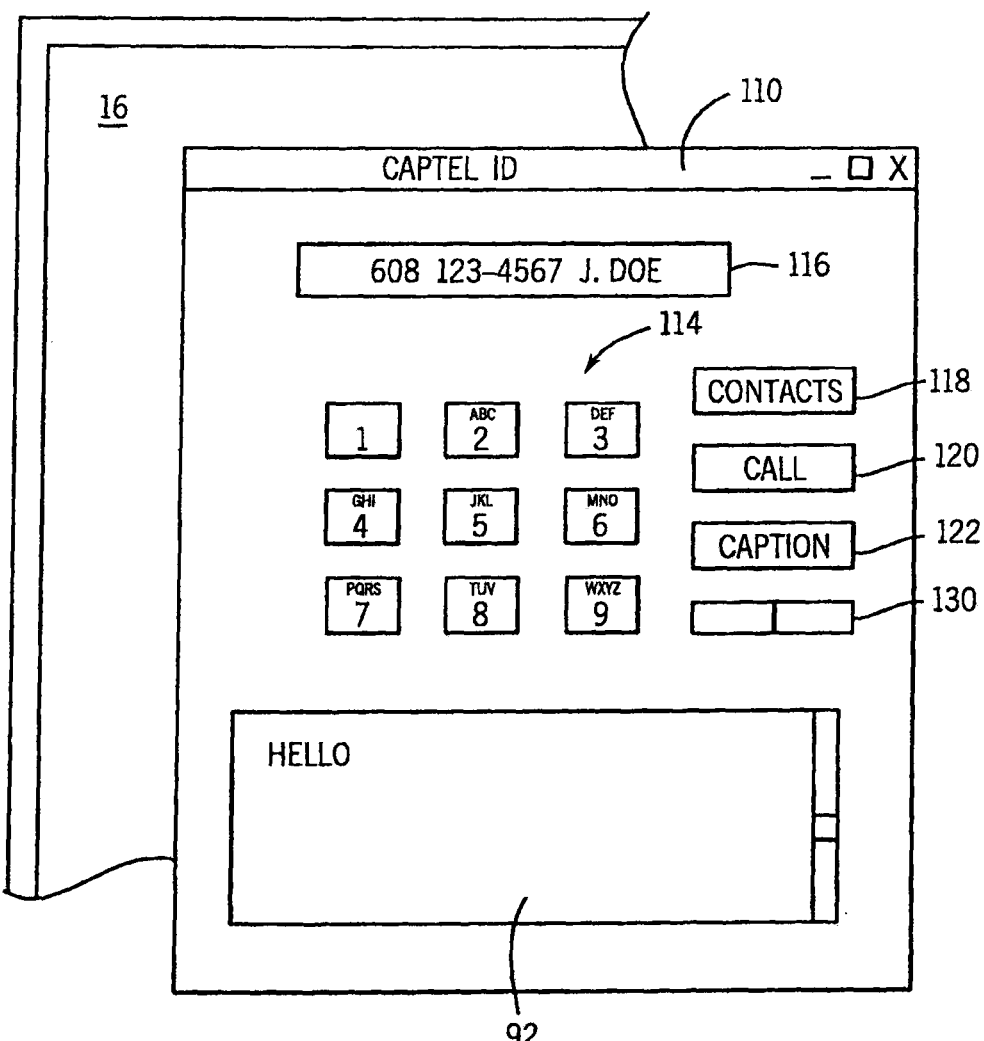
FIG. 9 is a figure similar to that of FIGS. 7 and 3 showing a caller interface window for a VOIP telephone implemented on a standard computer.

Referring also to FIGS. 9 and 10, in a first variation on this embodiment, a program 108 executed by the computer 14 provides a caller interface window 110 on the display screen 16 of the computer allowing the initiation of a VOIP connection as indicated by process block 112 of FIG. 10. The caller interface window 110 provides a standard virtual telephone keypad 114 by which a telephone number of a telephone terminal 28 on the public switched telephone network 26 may be entered and displayed in text box 116. Pressing of a call button 120 initiates a VOIP telephone call. The basic process of initiating a VOIP call is well understood in the art.

In the present invention, however, at any time, a captioning initiation button 122 may be pressed, causing initiation of a second VOIP telephone call directly to the relay service 56 through the relay server 54 as indicated by process block 124. At this time, the VOIP signals 52 exchanged between the computer 14 and telephone terminal 28 (optionally via the public switched telephone network 26) may be multicast to the server 54 to be interpreted as voice signals by the relay service 56. The server 54 may also receive a serial number 125 identifying the caller and assisting in allocation of relay service fees among governmental entities. The relay service 56 returns captioning text 56 transcribing the VOIP signals 52 back to the computer 14 to be displayed in text box 92 as indicated by process block 126.

The caller interface window 110 may also provide a volume meter 130 aiding the caller in speaking to obtain sufficient signal strength for transmission to telephone 28.

Alternatively, the call may be initiated as a captioned call by pressing the captioning initiation button 122, then dialing the telephone number, in which case, setup information (e.g., the destination telephone number) together with a serial number, are forwarded to the relay service 56 which may then initiate the VOIP call to the telephone terminal 28 patching through signals received from computer 14 to the telephone terminal 28.

As indicated by process block 132, the call may be terminated by pressing the call button 120 and/or captioning may be terminated by pressing the captioning initiation button 122.

When the computer 14 is used, a connection to the public switched telephone network 26 may also be provided for interception of emergency calls, for example, to 911, routing those through the publicly-switched telephone network rather than through the Internet so as to provide for the benefits of rapid identification of geographic location of the caller inherent in calls made through the publicly-switched telephone network and not always provided currently with the VOIP services.

Referring again to FIG. 8, the identical steps may be accomplished by a specially programmed VOIP telephone 102, which requires only a modification in software to implement the same functions as those described above. The captioning initiation button in this case can be implemented in software keystroke combinations without the need for additional switches with the standard screen 104 on the VOIP telephone serving as the text display and optional volume meter.

Figure 12:
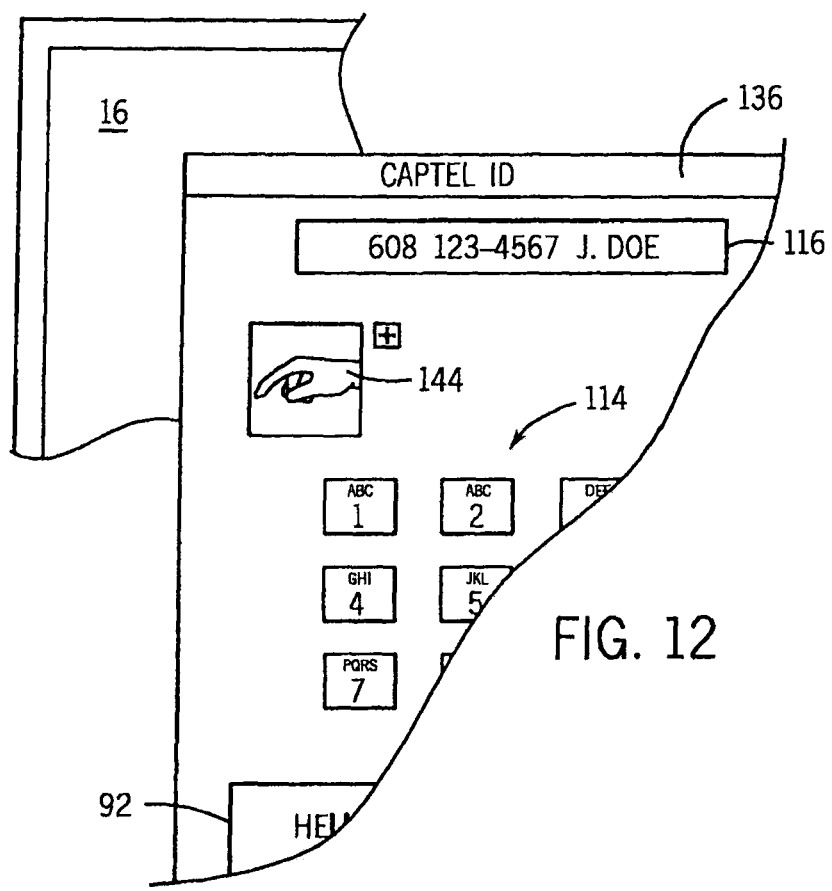
FIG. 12 is a fragmentary view of the caller interface window of FIG. 9 showing a video inset possible with the configuration of FIG. 11.

General purpose Internet appliances such as computer 14 make it possible to expand the previous embodiments to the addition of a video camera 140 providing video signals 142 to the Internet as well as the VOIP signals 52 and the receipt of captioning text 55. Referring to FIG. 12, the addition of video signals allows a video inset box 144 to be added to the caller interface window 136, allowing viewing of the other party to the conversation or the relay operator also having an Internet appliance such as a computer 14. This embodiment allows face-to-face conversations, but also may allow, for example, the use of American Sign Language or lip reading between users together with the captioning provided by the text box 92. In other respects, the caller interface window 136 may be identical to caller interface window 110 described above.

In a variation on this embodiment, a standard videophone may be used as may be connected over a broadband Internet connection (or corporate LAN) to provide video and voice. Videophones are popular with both hearing people and deaf people that use sign language and provide a built in camera and display screen for the picture of the other party.

In this embodiment, the videophone user or video conference system user can connect with the captioning service website and the service can send the captions not as IP text but as an IP video signal formatted to be compatible with the videophone. The captions are transmitted instead of the image of the caller, as video images of letters using standard captioning software that converts text to a video signals or as overlaid on the image of one caller using a video merging technique. In the case where a videophone provides a separate text display, this can alternatively be used for the captioning, as described above with the Internet phone, with the text being transmitted as IP text, that is, character data such as ASCII. Alternatively, IP text may be converted at the videophone into image data to be displayed on a video screen as a caption. When IP text is received, the videophone may elect how the text is to be displayed, either as captions on a video image or as text with no other image. The IP text may be uniquely marked to identify it to the videophone.

Additional Features

In addition to the various embodiments and aspects described above, additional features and aspects of the relay assisted systems described above are contemplated. A first additional feature is referred to generally herein as a call confirmation process. To this end, as described above, in at least some embodiments, when placing a relay assisted call, a hearing impaired user first opens her browser and links to the relay server, logs into a service provider web page (see 86 in FIG. 7) and provides the relay server 54 (see FIG. 5) with both the number the caller wishes to dial and also the callers own telephone number. The relay server then calls the hearing impaired user giving the user a prompt on her browser screen to answer the user's phone. When the user answers the arriving call, the relay server automatically places the call to the second party (i.e., to the caller that the user wishes to dial). The relay 54 then conferences the two telephone connections together and the call begins. At this point the relay service transcribes words spoken by the second party and the text captions are sent to the hearing impaired user's browser screen.

In this type system, there is a concern that someone could abuse the system in the following way. An unscrupulous third party could log into a web page provided by a relay server 54, enter a call back telephone number that is not associated with the third party (i.e., a number associated with some other unsuspecting party), enter the second phone number that does not belong to the third party and cause the relay to connect two unsuspecting parties. In this case, the relay server 54 would dial the first telephone number and when an unsuspecting person answers that call, the server 54 would make the call to the second telephone number and hence to the second unsuspecting party. When the second telephone is answered, at least one and potentially both of the people connected by the call would believe that the other person called them when in fact neither party placed the call.

The inventive call confirmation process has been developed to prevent unscrupulous third parties from linking unsuspecting other parties using a relay server 54 as described above. To this end, in general, the inventive call confirmation process proceeds as follows. After a hearing impaired user contacts a web page to commence a call activity and provides the callers own telephone number, the relay server 54 dials the callers own telephone number and, generally simultaneously therewith, displays a message on the user's browser screen instructing the user to answer the user's telephone and, thereafter, to perform some confirmation activity to indicate that the user in fact intended to commence the associated communication. For example, exemplary confirmation activities may include pressing one or a specific series of dual-tone multi-frequency (DTMF) buttons on their telephone. As another example, the confirmation activity may require the user to speak a word or a specific phrase into the user's telephone receiver. Here, the relay server 54 would be programmed so that it would not dial a second party unless the instructed confirmation activity is performed using the telephone associated with the call back telephone number. Thus, for example, if the party answering the first telephone (i.e., the telephone associated with the call back telephone number) does not have the captioning screen in front of her, she will not know what confirmation activity is required to continue the call and the relay server can terminate the call to eliminate the possibility of connecting two unsuspecting parties.

Figure 13:
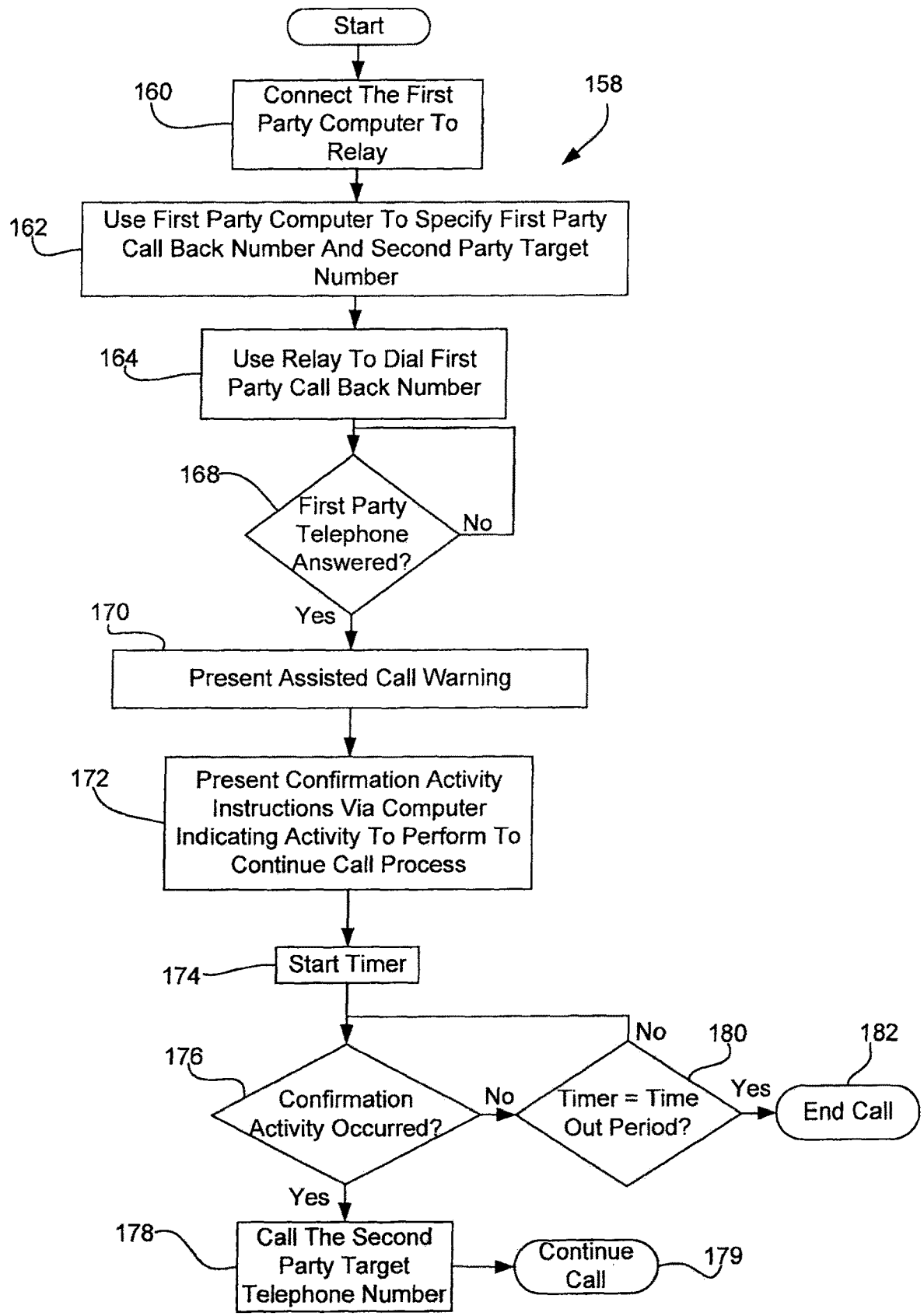
FIG. 13 is a flow chart illustrating an exemplary call confirmation process that is consistent with at least some aspects of the present invention.

Referring now to FIG. 13, an exemplary call confirmation process 158 is shown in flow chart form. Referring also to the exemplary system shown in FIG. 5, at block 160, a first party (e.g., a hearing impaired system user) uses a network appliance 14 to link via network 34 to a relay 54 server. Here, the network appliance may be any type of computer capable of running a browser or the like for providing web pages including a personal computer, a laptop computer, a palm type computing device, a telephone, etc. Hereinafter, although many types of network appliances are contemplated, the term computer will be used generally to simplify this explanation unless indicated otherwise.

Referring still to FIGS. 5 and 13, at block 162, the first party uses the computer to specify a first party call back telephone number as well as a second party target telephone number (e.g., the telephone number associated with a second party that the first party wishes to dial). At block 164, relay server 54 dials the first party call back number. In the example of FIG. 5, the first party call back number corresponds to telephone 72. At block 168, relay 54 monitors first telephone activity to determine when the telephone 72 is answered. Once the first party telephone 72 is answered control passes to block 170.

In at least some embodiments, at block 170, when telephone 72 is answered, relay 54 presents information via telephone 72 indicating that the current call is an assisted call. This assisted call warning is provided to help an unsuspecting person that did not intend to commence the communication to recognize that the communication was in error and should be terminated. For example, the assisted call warning may indicate "This is an assisted call. If you did not commence this call activity please hang up your telephone now."

Figure 14:
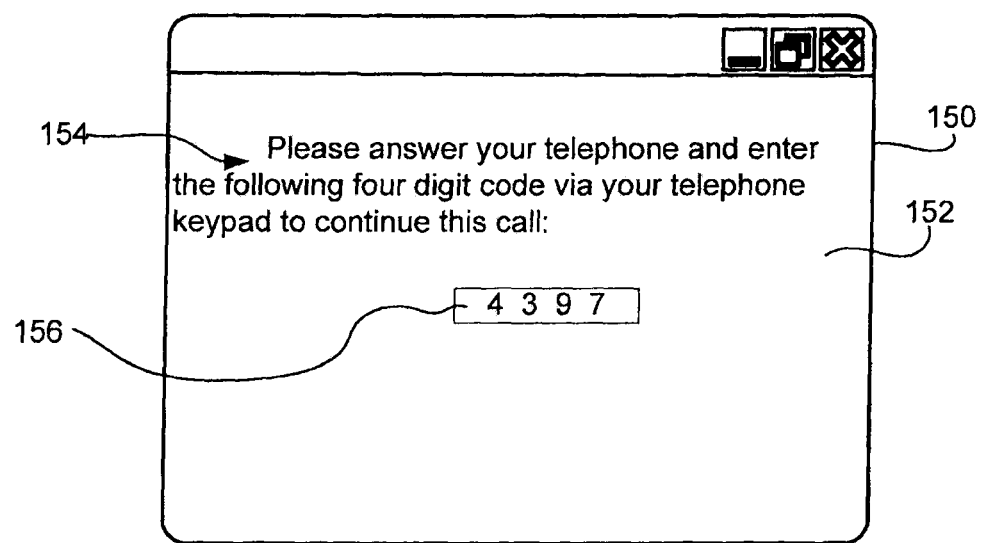
FIG. 14 is a schematic illustrating an exemplary browser page that may be presented during the process shown in FIG. 13.

Next, at block 172, relay 54 presents confirmation activity instructions via a web page presented on the first party's computer 14 indicating confirmation activity that must be performed via the first party's telephone 72 to continue the call process. Referring also to FIG. 14, an exemplary web page 150 for presenting confirmation activity instructions is shown. Web page 150 includes instructions 154 and a code field 156. Exemplary instructions 154 instruct the user to "Please answer your telephone and enter the following 4-digit code via you telephone keypad to continue this call:". A randomly generated 4-digit code is presented in field 156 which is to be entered, in this example, to continue the call.

Referring yet again to FIGS. 5 and 13, at block 174, after the first party's telephone 72 is answered, in at least some embodiments, relay 54 may start a timer. Here, the relay timer is intended to time-out a period during which it is expected that the first party would be able to complete the confirmation activity required to continue the call. For instance, the time-out period may, in some cases, be 30 seconds. Here, where an unsuspecting user is confused by the call activity and does not terminate a call, it is contemplated that the relay 54 would terminate the call automatically at the end of the time-out period.

At block 176, relay 54 monitors activities performed by the first party's telephone 72 to identify when the confirmation activity has occurred. In the present example, consistent with FIG. 14, the relay 54 would monitor to determine when the 4-digit code in field 156 has been entered via the first party's telephone 72. Where the confirmation activity has not occurred, control passes to block 180 where relay 54 determines whether or not the relay timer period is equal to the time-out period. Where the relay timer period does not equal the time-out period, control passes back up to block 176 where monitoring continue for the confirmation activity. Once the timer period equals the time-out period at block 180, control passes to block 182 where relay 54 terminates the call.

Referring once again to block 176, where the confirmation activity occurs, control passes to block 178 where relay 54 calls a second party target telephone number and the call continues at block 179.

In at least some embodiments it is contemplated that all relay users may be assigned a unique pass code or PIN number. Where a user has a PIN number, referring again to FIG. 13, at block 172 the relay 54 may provide instructions for the user to simply enter the user's PIN number via the telephone keypad and, subsequently entry of the PIN number would be used as confirmation activity at block 176.

In still other embodiments the confirmation activity instructions may be presented via the first party's telephone 72 (i.e., the call back telephone) and may require the first party to perform some confirmation activity using the first party's computer 14. For example, the confirmation activity instructions delivered via telephone 72 may instruct the user to "Enter the following 4-digit code via your browser to continue this call, 4397." In this case, relay 54 would provide a code entry field via computer 14 and would monitor the code entered therein for confirmation activity. In this case, where an unsuspecting user receives a call via telephone 72, the user would recognize that the communication is in error and would not participate by entering the confirmation code via the computer 14. Here, after the time-out period the communication would be automatically terminated. Note that where a user cannot hear (e.g., in most cases a captioned telephone user is hearing impaired), a voice prompt on the telephone may not be usable to cause the user to enter something on their browser screen and this embodiment would not work well.

In yet other embodiments, the confirmation activity may require entry of a second party's target telephone number to continue a communication. To this end, referring again to FIG. 13, at block 162 the first party may simply enter the first party's call back telephone number and may not be required to enter the second party's target telephone number. Then, at block 172, relay 54 may simply require that the first party enter the second party's target telephone number. Here, presumably, if the first party called back on telephone 72 is an unsuspecting party, when requested to enter a target telephone number to be called, the first party will recognize that the communication is in error and would terminate the call. However, where the first party answering telephone 72 initiated the communication, the first party would be ready to enter the second party's target telephone number. In this case, referring still to FIG. 13, at block 176, instead of monitoring for confirmation activity, relay 54 would simply monitor for an entered second party target telephone number. Where the second party's telephone number is entered, control passes to block 178 and then to block 179 to continue the telephone call.

In still other embodiments, confirmation activity instructions may be provided via a first party telephone that require activity using the first party's telephone where the instructions are provided along with an assisted call warning. Here, when a first party answers telephone 72 (see again FIG. 5) the assisted call warning should be sufficient for the first party to recognize whether or not the communication is in error and, where the communication is in error, the first party could terminate the call and not complete the confirmation activity. Where the first party initiated the communication, the first party could complete the confirmation activity via the first party telephone and continue the communication.

Thus, it should be appreciated that many different confirmation activities are contemplated and ways of facilitating completion of confirmation activities are contemplated where a system user receives confirmation instructions via at least one of the user's computer or telephone and is required to carry out confirmation activities via at least one of the user's computer or telephone where at least one of the devices used to give the confirmation activity instructions and the device used to perform the confirmation activity is controlled by the call back party.

One additional feature aspect of a browser type relay assisted call system is referred to as flexible caller ID. In this regard, for traditional telephone relay service (TRS) services, a relay user connects to a relay service provider. The service provider then dials to a called party on another line. To provide functional equivalence of a regular telephone call, the relay service equipment forwards the identity information of the in-bound caller on to the out-bound connection. The result is that when the dialed party looks at a caller ID display on their telephone, the dialed party sees that they are receiving a call from the in-bound caller, not the relay service. This is referred to as "True Caller ID". Here, the network caller ID system is not designed to show more than a single identity. Therefore, the caller ID service is limited to showing that a call is from an in-bound caller or showing that the call is from a relay service but not both.

The browser type relay assisted call system described above is different than a traditional relay system. To this end, as described above, in a browser type relay assisted call system, a system user receives notice on their computer/browser screen (see again 14 in FIG. 5) that they are receiving a call. The relay server 54 dials the user on a call back telephone line for the voice part of a call. While a user's telephone caller ID is limited to showing a single identity, the inventive system actually has two displays including the caller ID display and the browser screen. As a result, it has been recognized that additional information can be provided to a system user when the user receives a call that can help the user respond to the call in an appropriate fashion.

In one advantageous embodiment, at web page or browser screen can be provided by relay server 54 that shows the identity of a caller when an incoming call is received. Here, the caller identity would be, in at least some embodiments, the same information that would be displayed on a local caller ID box if that identity were presented via the user's telephone. Since the browser screen is connected to the relay server 54, it is implied that the call is via the relay service and is an assisted call type. In addition, the relay server 54 may be programmed to not forward the identity of the caller on to the caller ID display of the caption user's telephone but instead to show the call is coming from the relay service provider. Here, by viewing the caller ID display of the telephone and recognizing that a call is coming through the relay service provider, the user can make a better informed decision as to how to respond to the incoming call. Thus, the user can see on her telephone caller ID display that the call is coming through the relay service provider which lets her know that she should look at or open the user's browser to get captions for the call. Once the browser is open, the user can see who is calling the user.

Should a user receive a call on the user's telephone where the caller ID display does not show that the call is through the relay service provider, she could elect not to answer the call if she does not have access to the browser and she believes that she will need the caption function. In this case, she may opt to allow the call to go to voice mail so that a message can be obtained. Thereafter, when she has better access to the browser, she may call back the caller via the relay service provider.

Here, while the flexible caller ID concept is described generally in context of a browser, the caller identification feature may be implemented using an instant messenger client or some other custom application.

Figure 15:
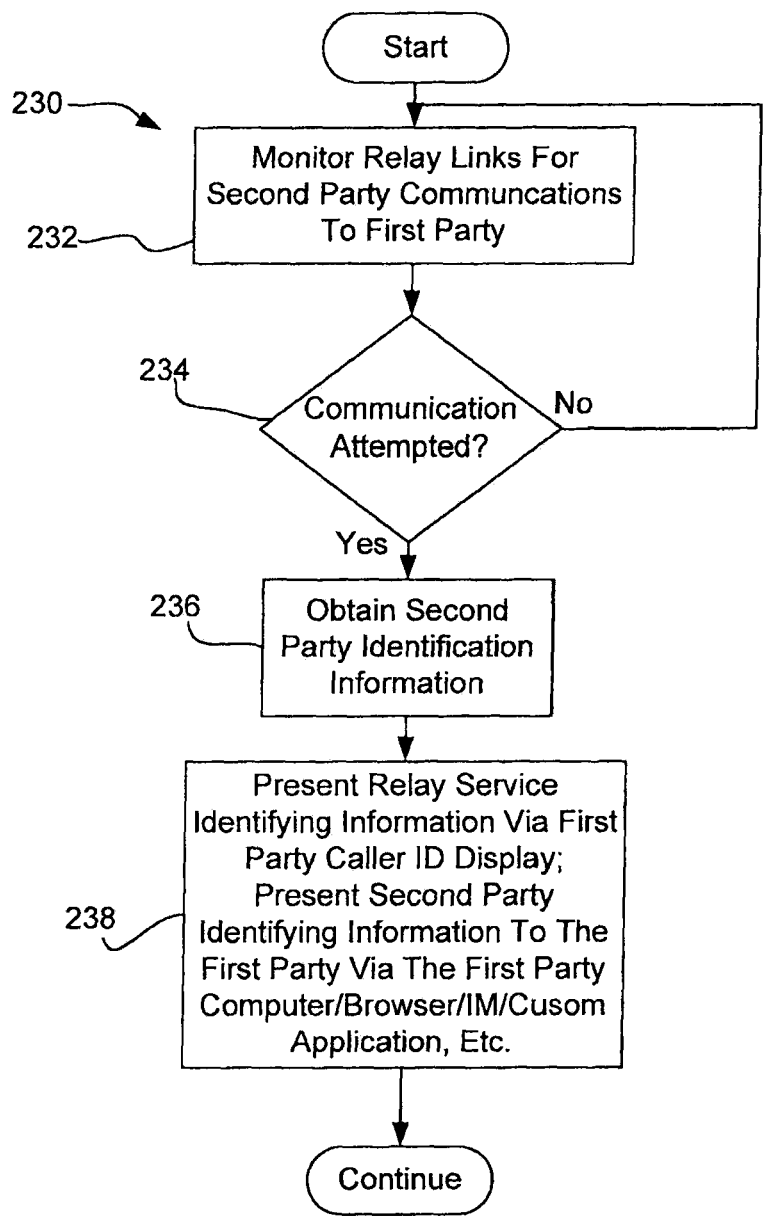
FIG. 15 is a flow chart illustrating a flexible caller ID feature that is consistent with at least some embodiments of the present invention.

Referring now to FIG. 15, an exemplary method 230 that is consistent with the flexible caller ID concept is illustrated. Referring also to FIG. 5, at block 232, relay server 54 monitors relay links for second party calls to the first party. At block 234, where communication is attempted, control passes to block 236 where the relay 54 obtains the second party identification information. At block 238, relay 54 presents relay service provider identifying information via the first party's telephone caller ID display. In addition, simultaneously, relay 54 presents second party identifying information via the first party computer/browser/IM/custom application, etc. After block 238, the call activity continues.

Figure 16:
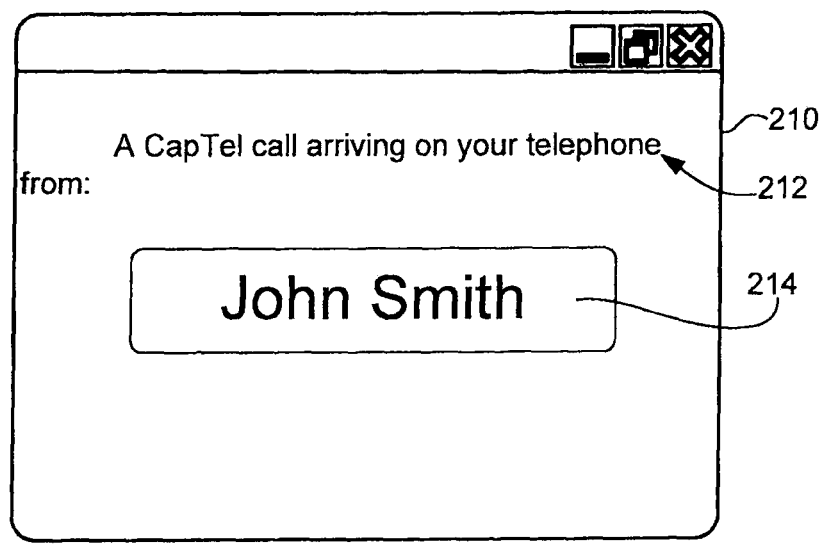
FIG. 16 is a schematic illustrating a browser page that may be presented during one of the process steps shown in FIG. 15.
Figure 17:
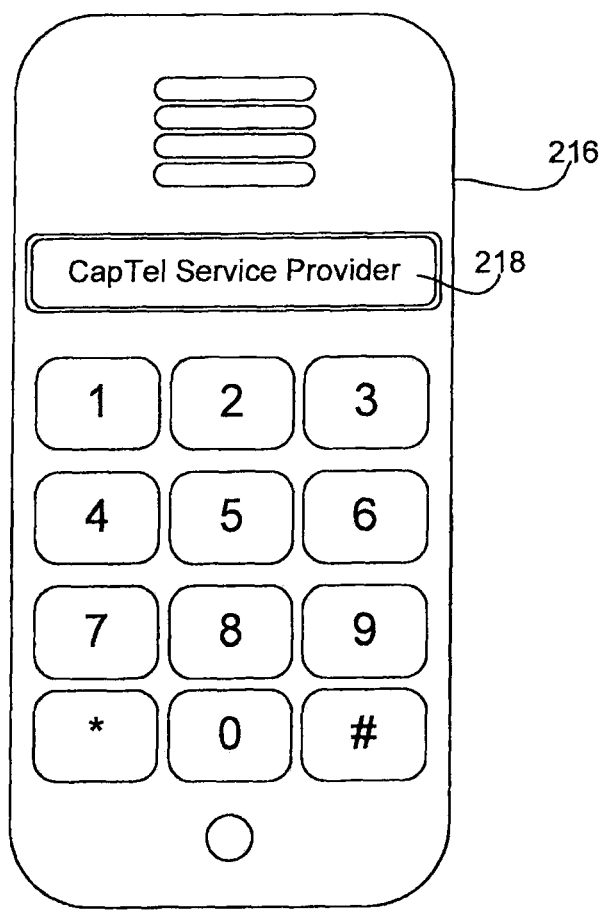
FIG. 17 is a schematic illustrating a telephone including a caller ID display and information displayed on the display during one of the process steps in FIG. 15.

Referring to FIG. 16, an exemplary browser web page 210 is illustrated that includes a caption 212 and second party identifying information provided in a field 214. The caption 212 indicates that "A CapTel call is arriving on your telephone from:" where the second party making the call is identified in field 214. Referring to FIG. 17, an exemplary cell phone 216 is illustrated including a caller ID display 218 where the relay service provider identifying information is provided on display 218. Thus, here, the first party receiving the call can identify that the call is via the relay service provider by viewing display 218 and can also identify the second party caller via field 214.

Figure 18:
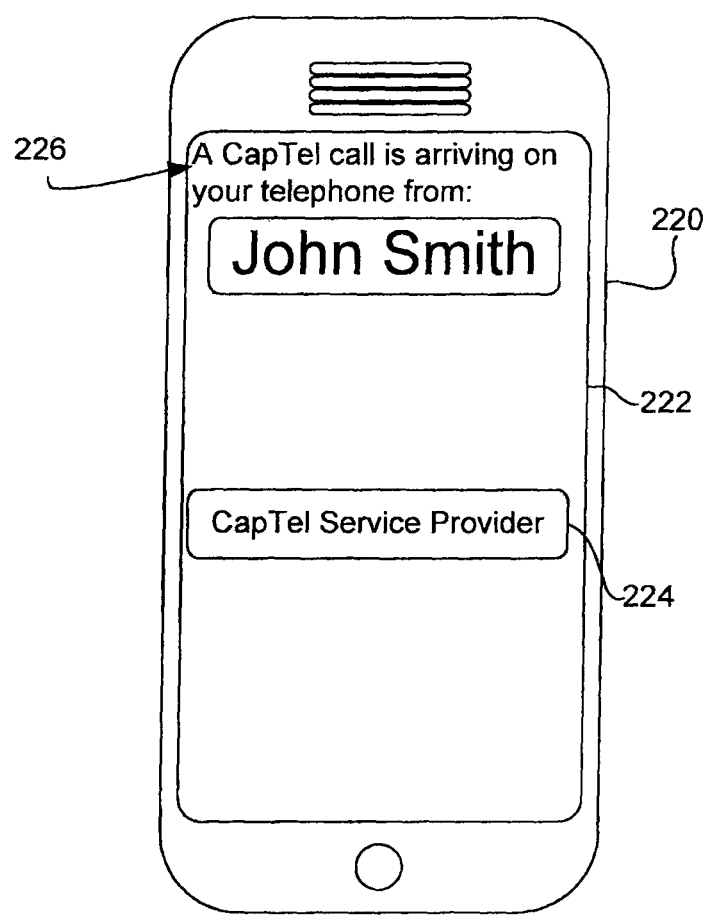
FIG. 18 is similar to FIG. 17, albeit showing a browser page displayed on a telephone/computer device and a caller ID window or display presented over the browser page.

In at least some embodiments it is contemplated that the flexible caller ID feature may be provided via a handheld computer that includes telephone service so that the relay service provider identifying information and the calling party information can be provided via a single display screen. To this end, referring to FIG. 18, an exemplary computer/telephone device 220 is illustrated that includes a large display screen 222. Here, the screen 222 may be used to present browser web pages. In addition, a separate caller ID window 224 may be opened on the screen 222 to present caller ID information when an incoming call is received by device 220. As shown in FIG. 18, when a call comes into device 220 and the device is linked to the relay server 54 for communication therewith, the calling party identifying information can be provided via the browser screen as shown at 226 and a separate caller ID window 224 can be opened up to identify the relay service provider identifying information.

Yet one other aspect or feature that may be implemented via the systems described above is referred to as a call back feature. The call back feature is particularly useful in the case of emergency calls that are facilitated via the systems described above.

Making telephone relay service (TRS) 911 calls over an IP network has been a problem for emergency service providers. The problem is that a user is connected to the emergency service provider via IP where the IP does not contain or imply any information about the caller's location. In addition, it is common for a 911 service provider to call back 911 callers to resolve any issues that develop while servicing a call. If the caller is using IP, the service provider cannot dial back to the caller because the caller does not have a dialable call back number. Complicating matters further, calls through a relay come from a relay center and not from the caller's home. Thus, an emergency service provider would have to know how to dial a relay center and to ask a relay employee to connect the service provider to the IP caller in order to complete a call back communication.

The call back feature works as follows. When a first party connects to a relay server 54 as described above and dials 911 or some other emergency number, the relay server 54 assigns a temporary relay telephone number to the first party. Here, the period of assignment is selected so as to be generally sufficient to ensure that emergency service issues are resolved (e.g., 24-28 hours). In addition, the relay server 54 stores the temporary telephone number along with any other information that can be used to establish communication with the caller such as, for instance, an IP address, the caller's telephone number, etc., in a correlated fashion.

When the relay server 54 contacts the emergency service provider to service a caller, the relay server 54 provides the temporary telephone number corresponding to the caller to the service provider call taker so that the call taker can, if necessary, use the temporary number to subsequently communicate with the caller. After the initial call is terminated, if the emergency call taker wants to call back the original caller for some reason, the call taker can simply dial the temporary telephone number that was provided. The temporary telephone number automatically routes to the relay server 54 and is automatically converted into information required to re-establish communication with the original caller. Thus, in at least some embodiments, the converted information includes an IP address and/or a dial back telephone number for the original caller and the call is completed to the user.

Figure 19:
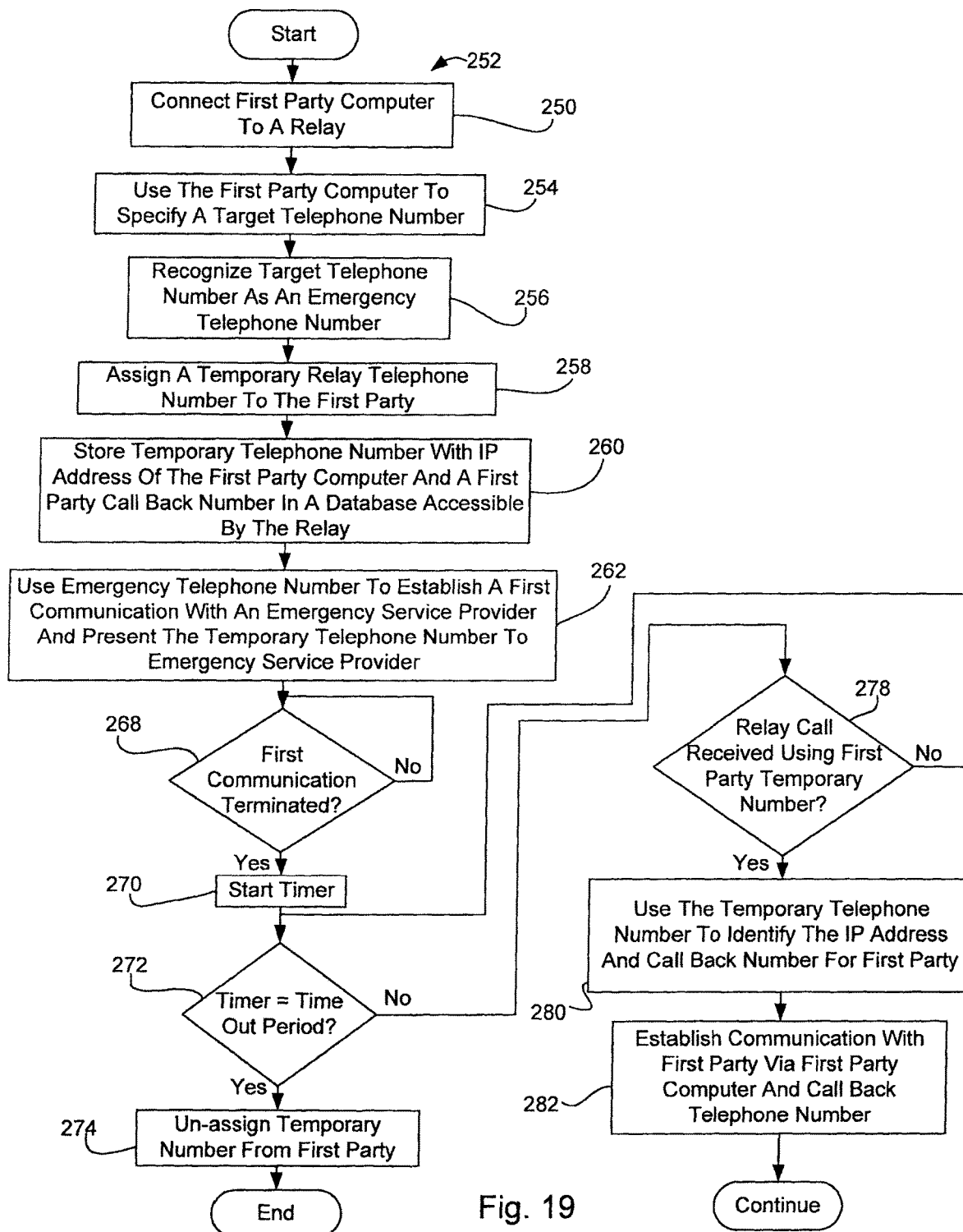
FIG. 19 is a flow chart illustrating a call back feature that is consistent with at least some aspects of the present invention.

Referring now to FIG. 19, an exemplary method 252 that is consistent with at least some embodiments of the call back feature described above is illustrated. Referring also to FIG. 5, at block 250, a first party uses the first party's computer 14 to connect to the relay server 54. At block 254, the first party uses computer 14 to specify a target telephone number to be called. At block 256, relay 54 recognizes the target telephone number as an emergency telephone number (e.g., 911). At block 258, server 54 assigns a temporary relay telephone number to the first party and at block 260 server 54 stores the temporary telephone number along with information that can be used to subsequently contact the first party caller if desired. At block 260 the exemplary information includes the caller's IP address as well as a first party call back telephone number. At block 262, relay server 54 uses the emergency telephone number to establish a first communication with the emergency service provider and presents the temporary telephone number to the emergency service provider (e.g., see phone 28 in FIG. 5). Thereafter, the first party and the service provider are linked via the relay 54 and the first communication commences.

In at least some embodiments a relay service may provide both the temporary telephone number but also the actual telephone number (if they have one) of the caller. The actual number may be of value for emergency call records. The PSAP would then know both the originating number and also how to call back to a user with communications support of a captioning relay. In addition, the relay may be able to identify a temporary call back number as an emergency call and to provide a higher priority for the call, thus providing a more rapid response for the call.

Referring still to FIGS. 5 and 19, at block 268 server 54 monitors the first communication to determine when the first communication was terminated. Once the first communication is terminated, server 54 starts a timer to time-out a period during which the temporary telephone number is assigned to the first caller. Here, for instance, an exemplary time-out period may include 24 hours, 48 hours, one week, etc. At block 272, server 54 determines whether or not the timer period is equal to the time-out period and, once the timer period is equal to the time-out period, control passes to block 274 where server 54 unassigns the temporary telephone number from the first party and the process ends.

At block 272, when the timer period has been shorter than the time-out period, control passes to block 278 where relay 54 monitors calls thereto to identify any calls routed to the relay using the first party's temporary telephone number. When relay 54 receives a call made using the first party's temporary telephone number, control passes to block 280 where the relay server 54 uses the temporary telephone number to identify the IP address and call back number for the first party. At block 282, relay server 54 establishes communication with the first party via the first party's computer and the call back telephone number and a second communication between the service provider and th original caller continues.

In at least some embodiments it is contemplated that, instead of assigning a temporary relay telephone number only when a target telephone number is recognized as an emergency number, temporary telephone number may be assigned to all calls through a relay server. Here, referring again to FIG. 19, process block 256 would be removed. Where temporary numbers are assigned to all relay calls, all emergency calls would have temporary numbers and the process as described in FIG. 19 would be similar.

After a temporary number is unassigned from a party, that temporary number can be reused by the relay server with a second party in the same manner described above.

One additional aspect or feature that may be implemented using the system described above is referred to as a call terminating feature. In this regard, a relay user can also receive a relay assisted call from a second party. To this end, a second party can call a relay user by dialing a toll-free relay service number and entering an area code and number of a person that they wish to contact via the relay service. The relay server user the "call to number" as an index into a database and finds an IP address for the relay user. The relay then sends a message to the relay user's browser screen (see again 14 in FIG. 5) to alert the user that a call is arriving and dials the user's call back number (i.e., the user's telephone 72). Here, the call continues the same way as if the relay user had placed the call to the second party.

In the above case, if a second party attempts to call a relay user and that user is not currently on-line or is not logged into the relay service for some reason, a problem exists in that there is currently no way to terminate the call. Here the call terminating feature is provided to allow relay users to select preferential call terminating functions.

To this end, exemplary call terminating features may include, when the relay user is not on-line or is not logged into the relay service, playing an announcement for the calling party informing the calling party that the party they are attempting to call is not available and that the call should be tried again at a later time. Another option may be for the relay server 54 to go ahead and dial the relay user's call back number and allow the user to either log in to the relay service via the user's browser and answer the call or let the user's telephone voicemail take a message. One additional option may be to have the relay server 54 provide a captioned voicemail function by playing a message to the caller asking the caller to leave a message, recording the voice of the caller, transcribing the message into text and, when the relay user next logs into the relay service, inform the user of the waiting voicemail. Here, when the relay user wants to retrieve voicemails, the relay server 54 would play the voice and text back to the user. This later method can operate as an accessible form of voicemail for hearing impaired relay users. In at least some embodiments the relay user can select how they prefer to handle calls when they are not logged into the service and their preferences are kept as part of a user's profile which can be changed whenever the user wishes.

Figure 20:
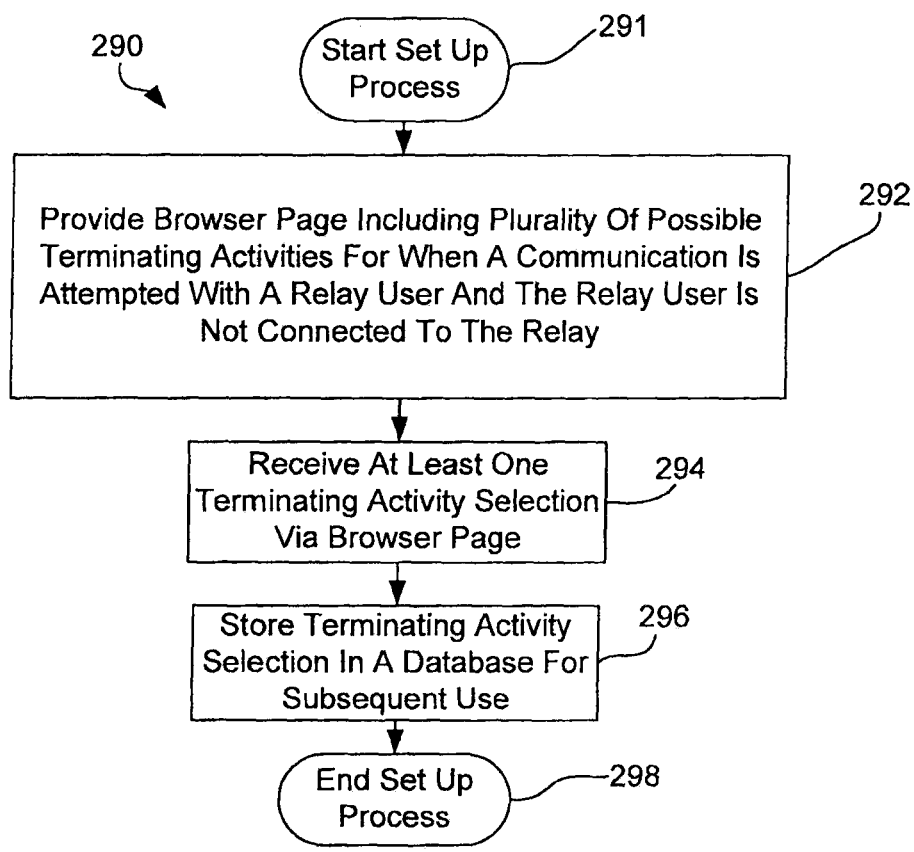
FIG. 20 is a flow chart illustrating a terminating feature set up process as consistent with at least some aspects of the present invention.

Referring now to FIG. 20, an exemplary method 290 for setting up or selecting one or a plurality of call terminating features is illustrated. At block 291 a set up process is started wherein a relay user is provided a browser web page via the user's computer 14 that includes a plurality of possible terminating activities that may be performed when a communication is attempted with the user and the user is not connected to the relay. Here, for instance, the possible terminating activities may include providing a message indicating that a call cannot be completed, placing a call to the first party's telephone or facilitating a voice to text transcription enabling the caller to leave a message for the relay user. At block 294 the relay user selects one of the terminating activities via the browser page and at block 296 the terminating activity that was selected by the user is stored in a database of user preferences for subsequent use. At block 298 the set up process ends.

Figure 21:
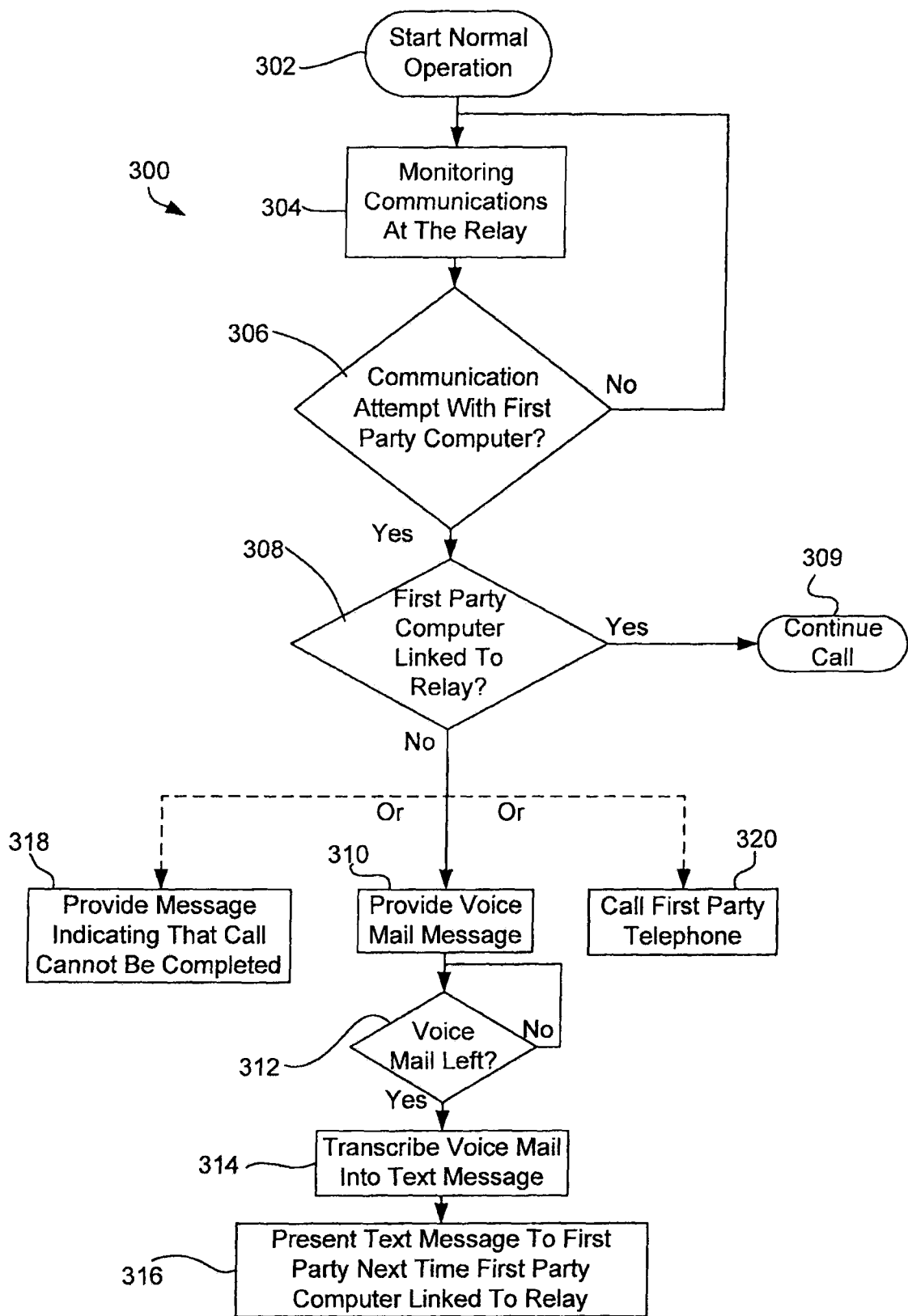
FIG. 21 is a flow chart illustrating implementation of a terminating feature that is consistent with at least some inventive embodiments.

Referring to FIG. 21, a method 300 for facilitating the call terminating feature is illustrated. At block 203, normal relay operation commences and at block 304, the relay server 54 monitors communications at the relay. At block 306, when a communication is attempted with the first party's computer, control passes to block 308. At block 308, relay server 54 determines whether or not the first party's computer is linked to the relay. Where the first party's computer is linked to the relay, control passes to block 309 where the call process continues in a manner described above. However, at block 308, where the first party's computer is not linked to the relay, control passes to the terminating function that was selected by the user at block 294 in FIG. 20. Here, three possible terminating selections are illustrated. A voice message to text transcription process corresponds to blocks 310, 312, 314 and 316. To this end, at block 310, a voicemail message is provided to the caller instructing the user to leave a voice message. At block 312, where a voice message is left, control passes to block 314 where the voice message is transcribed into a text message. At block 316, the text message is presented to the first party the next time the first party's computer is linked to the relay.

Referring still to FIG. 21, terminating feature 318 simply provides a message that indicates that a call cannot be completed and that the caller should try to call back at a later time. Terminating feature 320 dials the relay user's telephone even when the relay user's computer is not linked to the relay server 54 and allows a normal voicemail to be left or can be used to provide a prompt to the relay user to log into the service to complete an assisted call.

One additional aspect or feature that may be implemented using the systems described above is referred to as a Lock Call Back Feature. As described above, in at least some embodiments a relay user can easily specify any call back number to be used to facilitate a relay assisted call. The ability of a user to specify a call back number is particularly useful because it allows a user to use virtually any computer browser and telephone to place a relay assisted call.

While the ability to specify a call back number is advantageous for various reasons, there is some concern that relay users may provide others with their log in information and share their service privileges. The Lock Call Back Feature enables a relay service provider to lock a call back telephone number so that it cannot be changed easily by a relay user. When implemented, this feature essentially limits a relay user so that the user can only use a single telephone and a single telephone number associated therewith. Here the user cannot provide their log in information to another party unless that other party is using the same telephone as the user.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method to transcribe communications, the method comprising:
    obtaining, at a first communication device, first communication data during a communication session between the first communication device and a second communication device;
    transmitting the first communication data to the second communication device by way of a wireless local device that is locally coupled with the first communication device;
    receiving, at the first communication device, second communication data from the second communication device through the local device;
    transmitting the second communication data to a remote transcription system;
    receiving, at the first communication device, transcription data from the remote transcription system, the transcription data corresponding to a transcription of the second communication data, the transcription generated by the remote transcription system; and
    presenting, by the first communication device, the transcription of the second communication data.

2. The method of claim 1, wherein the second communication data includes audio data or the audio data and video data.

3. The method of claim 1, wherein the local wireless device includes a local wireless router device.

4. The method of claim 1, wherein the transcription data is received at the first communication device after routing the transcription data through the local device.

5. The method of claim 1, wherein transmitting the second communication data to the remote transcription system includes routing the second communication data through the local device.

6. The method of claim 1, wherein the second communication data is transmitted to the remote transcription system without routing the second communication data through the local device.

7. A system comprising:
    one or more processors;
    a microphone coupled to the one or more processors, the microphone configured to obtain audio of a user of the system and to generate first communication data based on the audio;
    one or more computer-readable media coupled to the one or more processors, the one or more computer-readable media configured to store instructions that when executed by the one or more processors cause the system to perform operations, the operation comprising:
    establish local wireless communication between the system and a wireless device;
    obtain an indication of a request for a communication session originating from a communication device by way of the wireless device;
    direct the first communication data to the communication device by way of the wireless device, the first communication data being part of the communication session between the system and the communication device;
    obtain, by way of the wireless device, second communication data of the communication session originating from the communication device;
    transmit the second communication data to a remote transcription system; and
    obtain transcription data originating from the remote transcription system, the transcription data corresponding to a transcription of the second communication data, the transcription generated by the remote transcription system;
    a speaker coupled to the one or more processors and configured to broadcast the second communication data; and
    an electronic display coupled to the one or more processors and configured to present the transcription of the second communication data.

8. The system of claim 7, wherein the second communication data includes audio data or the audio data and video data.

9. The system of claim 7, wherein the local wireless device includes a local wireless router device.

10. A system comprising:
    means for obtaining first audio data;
    means for transmitting the first audio data to a communication device by way of a wireless device, the first audio data being part of a communication session between the system and the communication device;
    means for receiving, by way of the wireless device, second communication data of the communication session originating from the communication device;

means for transmitting the second communication data to a remote transcription system;

means for receiving transcription data originating from the remote transcription system, the transcription data corresponding to a transcription of the second communication data, the transcription generated by the remote transcription system; and means for presenting the transcription of the second communication data.

11. The system of claim 10, further comprising means for receiving an indication of a request for the communication session originating from the communication device by way of the wireless device.

12. A method to transcribe communications, the method comprising:

obtaining, at a first communication device, first communication data during a communication session between the first communication device and a second communication device;

transmitting the first communication data to the second communication device by way of a wireless local device that is locally coupled with the first communication device;

receiving, at the first communication device, second communication data from the second communication device through the local device;

transmitting, by the local device, the second communication data to a remote transcription system;

receiving, at the local device, transcription data from the remote transcription system, the transcription data corresponding to a transcription of the second communication data, the transcription generated by the remote transcription system; and presenting the transcription of the second communication data.

13. The method of claim 12, wherein the second communication data includes audio data.

14. The method of claim 13, wherein when the second communication data includes the audio data and video data.

15. The method of claim 12, further comprising routing, by the local device, the transcription data to the first communication device, wherein the first communication device presents the transcription of the second communication data.

16. A method to transcribe communications, the method comprising:

establishing a communication session between a first device and a remote communication device;

obtaining, by the first device, first communication data;

transmitting, by the first device, the first communication data to the remote communication device during the communication session;

receiving, at the first device, second communication data from the remote communication device;

transmitting, from the first device, the second communication data to a remote transcription system;

receiving, at the first device, transcription data from the remote transcription system, the transcription data corresponding to a transcription, generated by the remote transcription system, of the second communication data;

transmitting the transcription data to a second device that is wirelessly and locally coupled with the first device; and presenting, by the second device, the transcription of the second communication data;

wherein the first device and the second device are locally coupled before the communication session is established between the first device and the remote communication device.

17. The method of claim 16, wherein the first device obtains the first communication data from the second device.

18. The method of claim 16, further comprising:

transmitting, from the first device, the second communication data to the second device; and presenting, by the second device, the second communication data.

19. The method of claim 16, wherein the second communication data includes audio data or the audio data and video data.

20. A method to transcribe communications, the method comprising:

establishing a local wireless communication between a first device and a second device;

establishing a communication session between the first device and a remote communication device;

receiving, at the first device, communication data from the remote communication device;

transmitting the communication data to a remote transcription system;

wirelessly transmitting the communication data to the second device;

presenting, by the second device, the communication data; and receiving, at the first device, transcription data from the remote transcription system, the transcription data corresponding to a transcription, generated by the remote transcription system, of the communication data;

further comprising presenting the transcription of the communication data, wherein the transcription of the communication data is presented by the second device.

21. The method of claim 20, wherein the communication data includes audio data or the audio data and video data.

22. The method of claim 20, wherein the communication session between the first device and the remote communication device is established after the local communication between a first device and a second device is established.

23. A method to transcribe communications, the method comprising:

obtaining, at a first communication device, first communication data during a communication session between the first communication device and a second communication device;

transmitting the first communication data to the second communication device by way of a wireless local device that is locally coupled with the first communication device;

receiving, at the first communication device, second communication data from the second communication device through the wireless local device;

transmitting the second communication data to a remote transcription system;

receiving, at the first communication device, transcription data from the remote transcription system via the wireless local device, the transcription data corresponding to a transcription of the second communication data, the transcription generated by the remote transcription system;

presenting, via a display screen of the first communication device, the transcription data as visible text; and broadcasting via a speaker at the first communication device, the second communication data as a voice signal.

\* \* \* \* \*